US012769335B2

(12) United States Patent
Aiken et al.

(10) Patent No.: US 12,769,335 B2
(45) Date of Patent: Oct. 20, 2026

(54) INTEGRATION OF UAV DELIVERY SERVICES IN THIRD-PARTY SYSTEMS

(71) Applicant: WING AVIATION LLC, Mountain View, CA (US)

(72) Inventors: Gavin Aiken, Mountain View, CA (US); Warren Choi, Santa Clara, CA (US); Joanna Karolina Janik, London (GB); Keith Sanders, Pacifica, CA (US)

(73) Assignee: Wing Aviation LLC, Palo Alto, CA (US)

( * ) Notice: Subject to any disclaimer, the term of this patent is extended or adjusted under 35 U.S.C. 154(b) by 216 days.

(21) Appl. No.: 18/429,015

(22) Filed: Jan. 31, 2024

(65) Prior Publication Data

US 2025/0244773 A1 Jul. 31, 2025

(51) Int. Cl.
*G05D 1/646* (2024.01)
*G05D 1/69* (2024.01)
(Continued)

(52) U.S. Cl.
CPC ............... *G05D 1/69* (2024.01); *G05D 1/646* (2024.01); *G06Q 10/0833* (2013.01); *G05D 2105/20* (2024.01); *G05D 2109/20* (2024.01)

(58) Field of Classification Search
CPC ............... G05D 1/646; G05D 2109/20; B64U 2101/64; B64U 10/13; G06Q 10/08355; G06Q 10/0833
See application file for complete search history.

(56) References Cited

U.S. PATENT DOCUMENTS 7,251,621 B1 * 7/2007 Weng ...................... G06Q 40/04 705/26.81
9,489,852 B1 * 11/2016 Chambers ............. B64C 39/024
(Continued)

OTHER PUBLICATIONS

Chen et al., "An Efficient Scheduling Scheme for Unmanned Aerial Vehicle Instant Delivery," ICC 2023—IEEE International Conference on Communications, Rome, Italy, 2023, pp. 4652-4657. (Year: 2023).*

(Continued)

*Primary Examiner* — Dino Kujundzic
(74) *Attorney, Agent, or Firm* — Christensen O'Connor Johnson Kindness PLLC

(57) ABSTRACT

In some embodiments, a method of managing deliveries of orders by a fleet of unmanned aerial vehicles (UAVs) from retail fulfillment locations to delivery locations is provided. A fleet management computing system receives a request for delivery of an order from a retailer ordering computing system. The fleet management computing system transmits one or more package identifiers to be associated with one or more packages for the order. The fleet management computing system receives a notification that a package of the one or more packages for the order is ready for pickup at a retail fulfillment location. The fleet management computing system determines a navigation route for a UAV to the delivery location via the retail fulfillment location. The fleet management computing system transmits the navigation route to the UAV for autonomous navigation of the navigation route to the delivery location via the retail fulfillment location to deliver the package.

16 Claims, 35 Drawing Sheets

(51) Int. Cl.

| | |
|---|---|
| ***G06Q 10/0833*** | (2023.01) |
| *G05D 105/20* | (2024.01) |
| *G05D 109/20* | (2024.01) |

(56) References Cited

U.S. PATENT DOCUMENTS

| | | | | |
|---|---|---|---|---|
| 10,535,036 | B2 | 1/2020 | Cantrell | |
| 11,176,630 | B2 * | 11/2021 | Prager | B64U 10/13 |
| 2016/0253908 | A1 | 9/2016 | Chambers et al. | |
| 2017/0011449 | A1 * | 1/2017 | Mueller | G06Q 30/0635 |
| 2017/0129603 | A1 | 5/2017 | Raptopoulos et al. | |
| 2018/0037322 | A1 | 2/2018 | Buchmueller et al. | |
| 2018/0090014 | A1 * | 3/2018 | Kline | G06Q 10/083 |
| 2018/0137454 | A1 | 5/2018 | Kulkarni et al. | |
| 2018/0174102 | A1 * | 6/2018 | Winkle | B64D 11/0624 |
| 2018/0197137 | A1 * | 7/2018 | High | G06Q 30/0641 |
| 2019/0033856 | A1 * | 1/2019 | Ferguson | A23L 5/00 |
| 2020/0349511 | A1 * | 11/2020 | Seaver | G06K 7/1413 |
| 2023/0316447 | A1 | 10/2023 | Prager et al. | |
| 2025/0172402 | A1 * | 5/2025 | Matsumoto | G01C 21/3461 |

OTHER PUBLICATIONS

International Search Report and Written Opinion mailed Feb. 27, 2025, in corresponding International Application No. PCT/US2024/060782, 16 pages.

"Integrate PayPal Checkout", PayPal Docs, https://developer.paypal.com/docs/checkout/standard/integrate/, Oct. 9, 2023, 17 pages.

"The Bin Packing Problem", Google for Developers, https://developers.google.com/optimization/pack/bin_packing, Jan. 18, 2023, 8 pages.

Lunden, I., "Flytrex raises $40M to build its drone-based delivery service across suburbs in the US", TechCrunch, https://techcrunch.com/2021/11/19/flytrex-raises-40m-to-build-its-drone-based-delivery-service-across-suburbs-in-the-u-s/, Nov. 19, 2021, 9 pages.

* cited by examiner

FIG. 9B
9:41
X
RetailCo uses Wing drones
to offer fast and safe deliveries.
Next, you'll set up a delivery spot
for the address you provided.
SET UP DELIVERY SPOT

FIG. 10B
9:41
wing.com
Preparing order
ETA
2:50 PM
Departing
RetailCo
Arriving
Delivery Spot
123 Wing St
Palo Alto, CA
Delivered by
Wing Flight 3345

INTEGRATION OF UAV DELIVERY SERVICES IN THIRD-PARTY SYSTEMS

TECHNICAL FIELD

This disclosure relates generally to unmanned aerial vehicles (UAVs), and in particular but not exclusively, relates to managing UAVs for autonomous delivery of products.

BACKGROUND

UAVs are becoming increasingly common for a wide variety of uses, including but not limited to collecting aerial imagery and delivery of products. While the physical act of transporting an individual package using a UAV is becoming more common, managing a fleet of UAVs to perform such deliveries is still a difficult technical problem. What is desirable are new technical infrastructures that allow parties that do not themselves manage fleets of UAVs to integrate their systems with the systems of parties that do manage fleets of UAVs in order to provide package delivery services using UAVs.

BRIEF SUMMARY

In some embodiments, a non-transitory computer-readable medium having logic stored thereon is provided. The logic, in response to execution by one or more processors of a fleet management computing system, cause the fleet management computing system to perform actions for managing deliveries of orders by a fleet of unmanned aerial vehicles (UAVs) from retail fulfillment locations to delivery locations. The actions comprise receiving, by the fleet management computing system, a request for delivery of an order from a retailer ordering computing system; transmitting, by the fleet management computing system, one or more package identifiers to be associated with one or more packages for the order; receiving, by the fleet management computing system, a notification that a package of the one or more packages for the order is ready for pickup at a retail fulfillment location; determining, by the fleet management computing system, a navigation route for a UAV to the delivery location via the retail fulfillment location; and transmitting, by the fleet management computing system, the navigation route to the UAV for autonomous navigation of the navigation route to the delivery location via the retail fulfillment location to deliver the package.

In some embodiments, a method of managing deliveries of orders by a fleet of unmanned aerial vehicles (UAVs) from retail fulfillment locations to delivery locations is provided. A fleet management computing system receives a request for delivery of an order from a retailer ordering computing system. The fleet management computing system transmits one or more package identifiers to be associated with one or more packages for the order. The fleet management computing system receives a notification that a package of the one or more packages for the order is ready for pickup at a retail fulfillment location. The fleet management computing system determines a navigation route for a UAV to the delivery location via the retail fulfillment location. The fleet management computing system transmits the navigation route to the UAV for autonomous navigation of the navigation route to the delivery location via the retail fulfillment location to deliver the package.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

In some embodiments of the present disclosure, a UAV provider provides UAV delivery services to one or more retailers. The UAV provider allows integration with its systems to varying extents in order to balance differently for different retailers between the technical difficulty in performing a full user interface integration and the desire for a seamless user interface experience.

Figure 1:
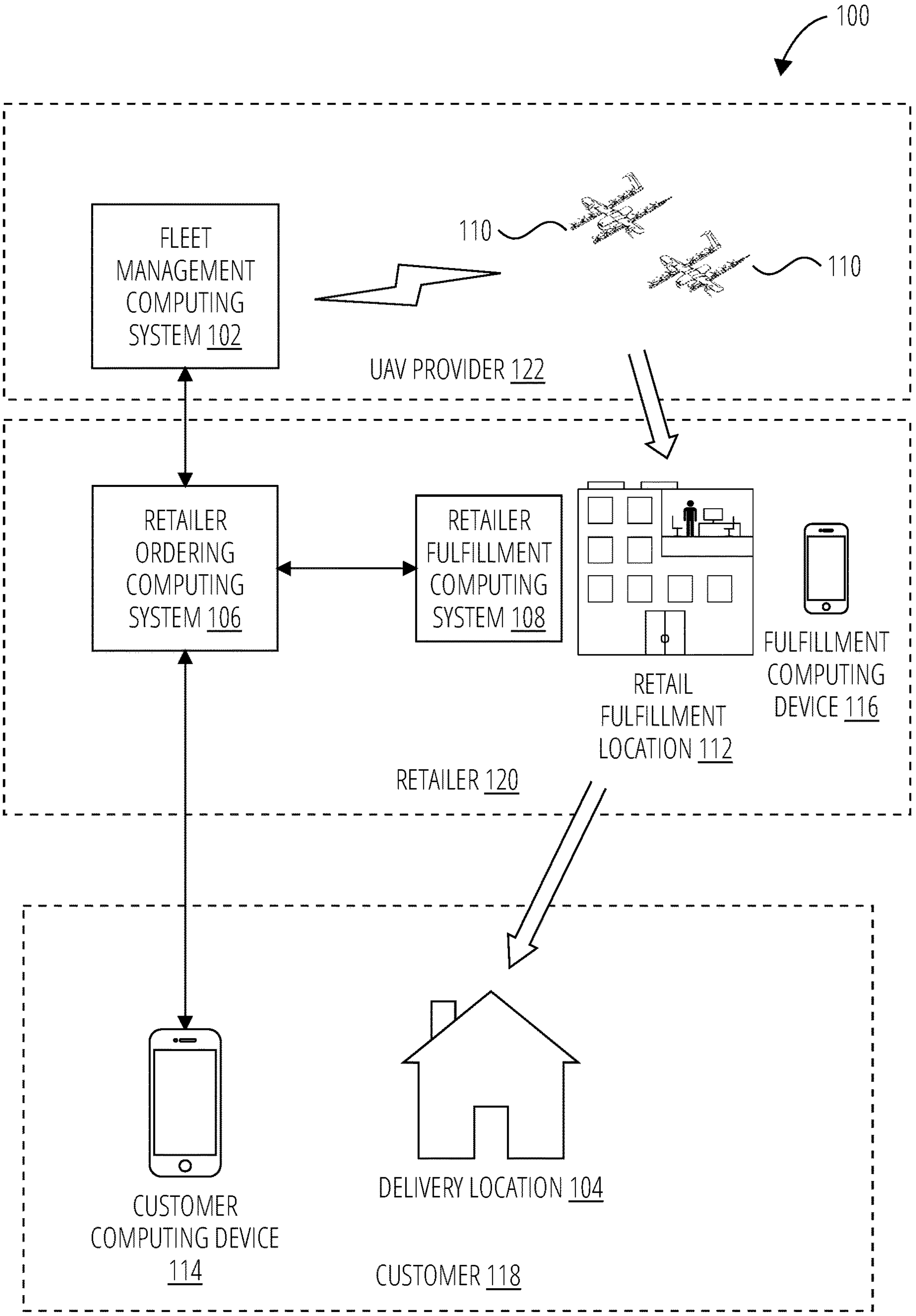
FIG. 1 illustrates a system for managing deliveries via UAVs according to various aspects of the present disclosure.

FIG. 1 is a schematic illustration of a UAV delivery system according to various aspects of the present disclosure. As shown, the system 100 includes a customer computing device 114 and a delivery location 104 associated with a customer 118; a retailer ordering computing system 106, a retailer fulfillment computing system 108, a retail fulfillment location 112, and a fulfillment computing device 116 associated with a retailer 120; and a fleet management computing system 102 and a fleet of UAVs 110 associated with a UAV provider 122.

The customer 118 is any party that orders products from a retailer 120. Though only a single customer 118 is illustrated in FIG. 1, it will be appreciated that in some embodiments, a plurality of customers 118 are present and participate in the system 100. The customer 118 is associated with a customer computing device 114 and a delivery location 104. The customer computing device 114 may be any type of computing device used by the customer 118 to browse offers from the retailer 120, including but not limited to a mobile computing device such as a smartphone or tablet, a desktop computing device, a laptop computing device, a console computing device, an augmented reality/virtual reality (AR/VR) computing device, or any other suitable type of computing device.

The delivery location 104 may be any location at which the customer 118 desires products ordered from the retailer 120 to be delivered. Traditionally, the delivery location 104 would be a house, apartment, office, or other mailing location referred to with a mailing address. In some embodiments of the present disclosure, since delivery is being completed via a UAV 110 to a location that may be specified by a latitude/longitude or in any other way, the delivery location 104 may be a mailing location referred to with a mailing address, or may be any other location to which the customer 118 wishes for an order to be delivered that can be specified by a geographic location, including but not limited to a parking lot (e.g., for a tailgate party), a field or clearing (e.g., for a camping trip), a hiking trail (e.g., for emergency delivery of supplies), or any other geographic location. Though a single delivery location 104 is illustrated for the customer 118, in some embodiments, a given customer 118 may specify different delivery locations 104 for different orders.

The retailer 120 may be any party that provides products to be delivered to customers 118. Though a single retailer 120 is illustrated, in some embodiments, a plurality of retailers 120 may be present in the system 100. The retailer 120 and products may be of any type. For instance, one non-limiting example of a retailer 120 is a "big-box store" that typically sells products online that are then delivered to the ordering customers 118. Another non-limiting example of a retailer 120 is a pharmacy that delivers medications to customers 118 who are either the patients who have been prescribed the medications, clinics that will dispense the medications, and so on. Though described herein as a "retailer," in some embodiments, the retailer 120 may not be a retail establishment, but may instead be another type of entity that distributes products to be delivered to customers 118. For example, the retailer 120 may be a governmental entity that distributes rapid COVID tests to customers 118 upon request.

The retailer 120 is associated with a retailer ordering computing system 106, a retailer fulfillment computing system 108, and one or more retail fulfillment locations 112. The retailer ordering computing system 106 may provide listings of products being offered, may generate a retail interface to allow the customer 118 to select products to be ordered, and may perform other traditional functions of an online retail system. Once an order for one or more products is obtained, the retailer ordering computing system 106 transmits the order information to a retailer fulfillment computing system 108, which manages the fulfillment of the order (e.g., obtaining the products, orchestrating the delivery of the products, etc.). In some embodiments, the retailer ordering computing system 106 and the retailer fulfillment computing system 108 may be a single computing system, but are illustrated as separate computing systems herein to clarify the different tasks performed by these systems. In some embodiments, multiple retailer fulfillment computing systems 108 may be present at the retailer 120, such as if separate retailer fulfillment computing systems 108 are present at separate retail fulfillment locations 112.

A retail fulfillment location 112 is a place from which a product offered by the retailer 120 can be picked up. For example, a brick-and-mortar location of a retailer 120 may be considered a retail fulfillment location 112. As another example, a fulfillment center or other warehouse may be considered a retail fulfillment location 112. Some retailers 120 may have a plurality of retail fulfillment locations 112 (e.g., multiple locations of a big-box store). While the retailer fulfillment computing system 108 manages orders and deliveries, the acts of pulling products from shelves, filling packages, and placing the packages for pickup may be performed by workers. In such cases, the workers may be guided by one or more fulfillment computing devices 116 that provide them instructions and allow the workers to interact with the retailer fulfillment computing system 108 and other portions of the system 100.

The UAV provider 122 is associated with a fleet management computing system 102 and a fleet of UAVs 110. The fleet management computing system 102 receives requests for deliveries, assigns UAVs 110 to execute the deliveries, provides navigation routes to the UAVs 110 for their autonomous navigation to pickup packages from retail fulfillment locations 112 and to drop off packages at delivery locations 104, and other actions for managing UAV deliveries. The fleet of UAVs 110 may include UAVs of any type, including but not limited to the UAV 200 illustrated in FIG. 2A, FIG. 2B, and FIG. 3. In some embodiments, when not executing a mission, the UAVs 110 may be positioned at a "nest," which is a location associated with the UAV provider 122 at which UAVs 110 may be serviced, charged, or otherwise stored when not in active use. In some embodiments, a given UAV provider 122 may have more than one nest distributed about a geographic area in order to reduce flight distances and increase the quality of the delivery service provided by the UAV provider 122.

In some embodiments, in order to utilize delivery services from the UAV provider 122, the retailer 120 may arrange a space at the retail fulfillment location 112 to be suitable for package pickups by UAV 110. In some embodiments, the retailer 120 may place a mat, a sign, or another indicator that can be identified with a camera of the UAV 110 in a clear area such as a roof, a parking lot, a field, or another clear area at the retail fulfillment location 112 to indicate pickup points at the retail fulfillment location 112. In some embodiments, the retailer 120 may install a structure that holds a package in a way that allows a UAV 110 to automatically pick up the package without further interaction, including but not limited to by using a payload coupling apparatus described in U.S. Pat. No. 11,104,438, issued Aug. 31, 2021 and entitled "Payload Coupling Apparatus," the entire disclosure of which is hereby incorporated by reference herein for all purposes. Such a pickup structure may also include visual features that allow a camera of the UAV 110 to identify the structure as a specific pickup point, such that multiple structures may be situated at the retail fulfillment location 112 to provide multiple pickup points for multiple packages.

Actions within the system 100 start with a traditional transaction, where the customer 118, using the customer computing device 114, selects products offered by the retailer 120 via the retailer ordering computing system 106. Once an order is completed, the retailer ordering computing system 106 informs the retailer fulfillment computing system 108 of the order, and the products of the order are made available by the retail fulfillment location 112.

In a traditional transaction, at this point the products would either be delivered via ground-based delivery (e.g., a delivery truck or other ground-based vehicle) from the retail fulfillment location 112 to the delivery location 104, or made available at the retail fulfillment location 112 for pickup by the customer 118. Such traditional transactions are subject to delays caused by traffic, topography, and other inconveniences. As such, it is desired to replace such traditional delivery techniques with deliveries of the products via the fleet of UAVs 110.

Accordingly, in the system 100, once an order is completed, the retailer ordering computing system 106 requests UAV delivery services from the fleet management computing system 102. The fleet management computing system 102 plans the UAV-based delivery of the products for the order, and informs the retailer ordering computing system 106 when the UAV provider 122 is ready to provide the delivery service. The retailer ordering computing system 106 provides the order information to the retailer fulfillment computing system 108, which uses a fulfillment computing device 116 to guide preparation of packages that contain the products of the order. The fulfillment computing device 116 may be used to notify the fleet management computing system 102 when a given package is ready to be picked up, and the fleet management computing system 102 then provides a navigation route to a UAV of the fleet of UAVs 110 to autonomously travel to the retail fulfillment location 112, pick up the package, travel to the delivery location 104, and deliver the package.

Further details of the configuration of each of the components of the system 100 are provided below. It should be noted that though FIG. 1 illustrates a system 100 that includes a single UAV provider 122, a single retailer 120, and a single customer 118 for the sake of simplicity, this should not be seen as limiting. In some embodiments, any number of UAV providers 122, retailers 120, and customers 118 may participate in the system 100. Usually, a plurality of customers 118 will participate in the system 100. In some embodiments, more than one retailer 120 may be present in the system 100 and utilize the services of the UAV provider 122. In some embodiments, the system 100 may include more than one UAV provider 122, and a single retailer 120 may use a first UAV provider 122 to service some orders and may use a second UAV provider 122 to service other orders.

Figure 2A:
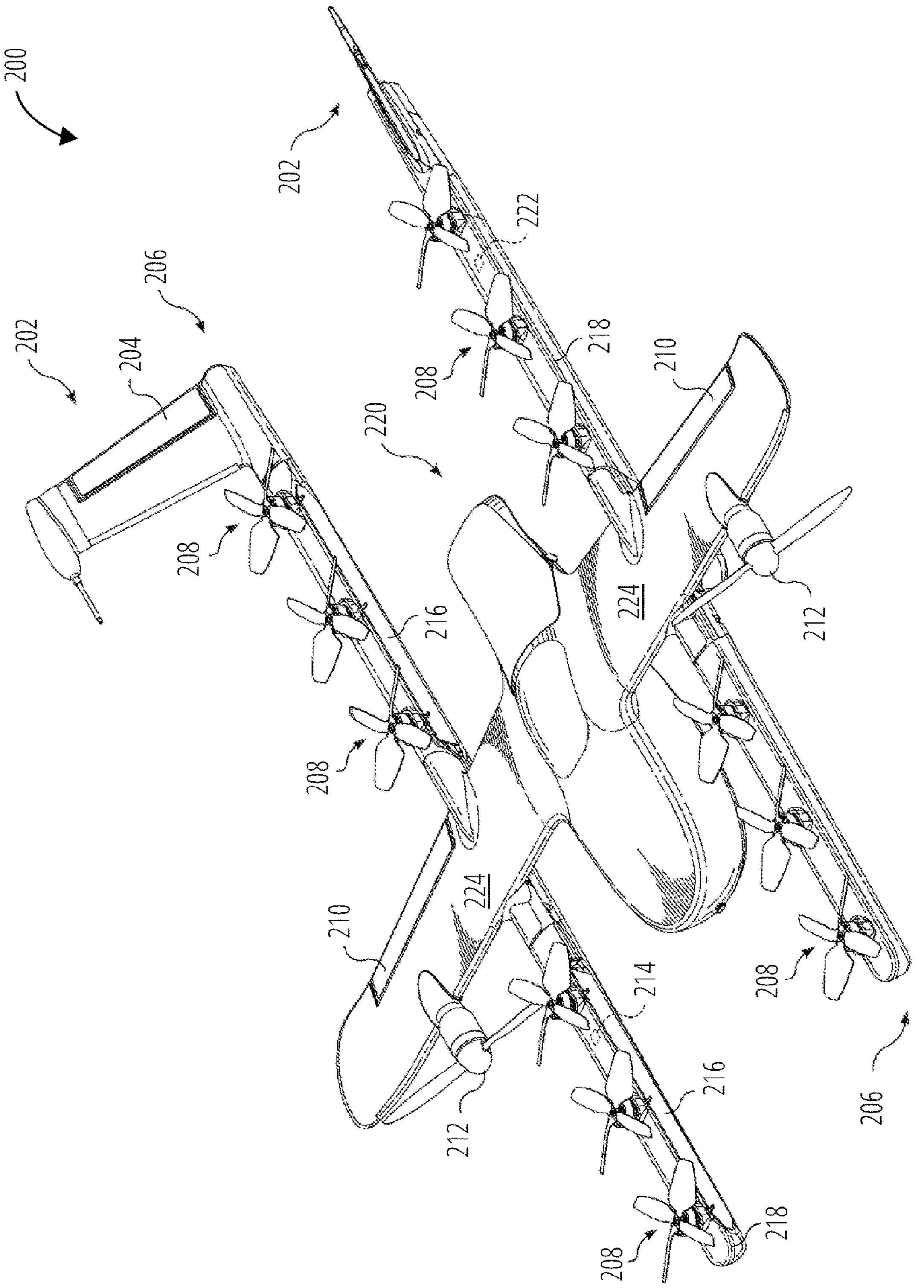
FIG. 2A and FIG. 2B illustrate an aerial vehicle or UAV, in accordance with various embodiments of the present disclosure.
Figure 2B:
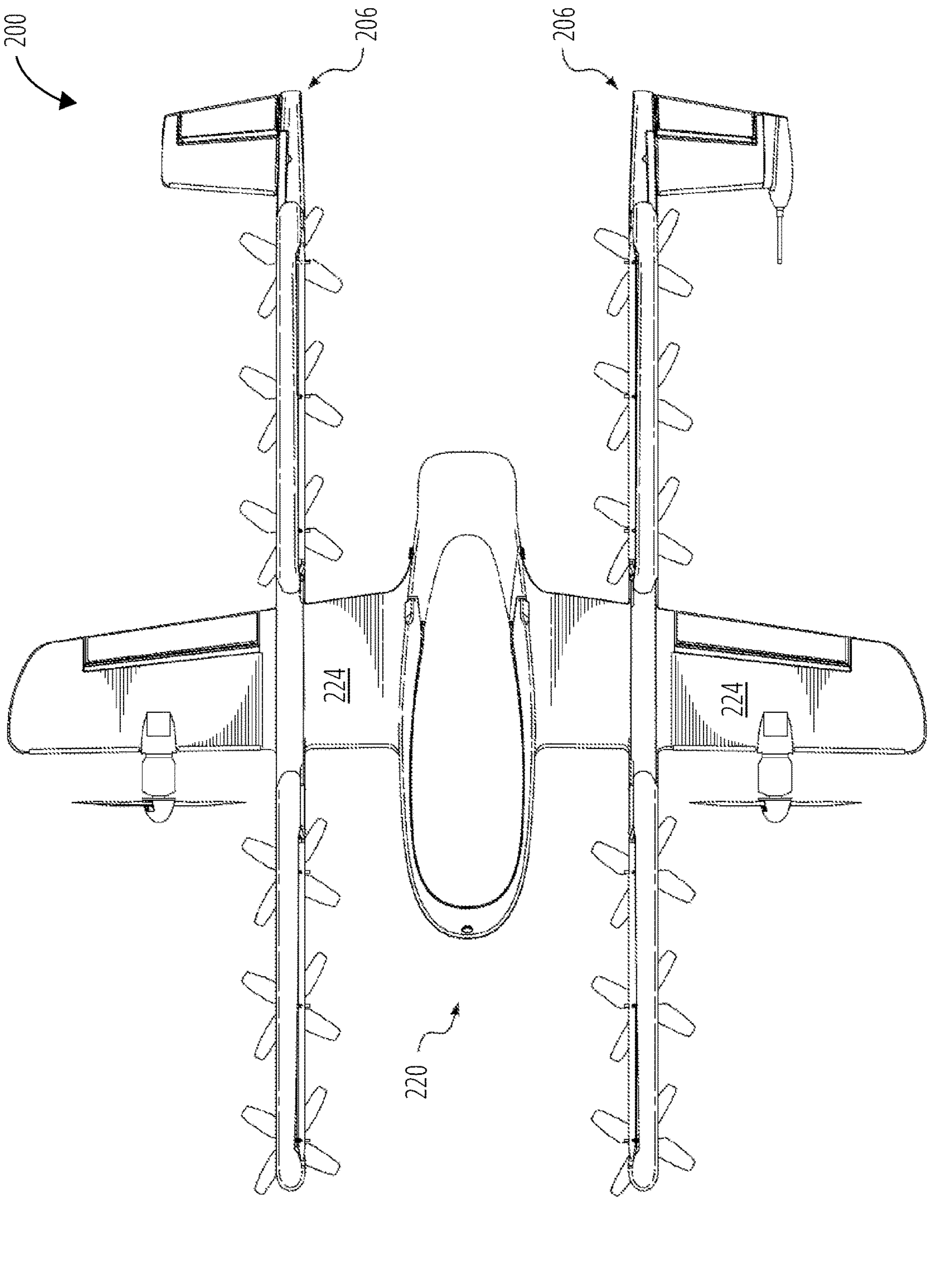

FIG. 2A and FIG. 2B illustrate an aerial vehicle or UAV 200, in accordance with an embodiment of the present disclosure. The UAV 200 is a non-limiting example of a UAV 110 suitable for use within the fleet of UAVs 110 in the system 100 illustrated in FIG. 1. The illustrated embodiment of UAV 200 is a vertical takeoff and landing (VTOL) unmanned aerial vehicle (UAV) that includes separate propulsion units 212 and propulsion units 208 for providing horizontal and vertical propulsion, respectively. UAV 200 is a fixed-wing aerial vehicle, which as the name implies, has a wing assembly 224 that can generate lift based on the wing shape and the vehicle's forward airspeed when propelled horizontally by propulsion units 212. FIG. 2A is a perspective top view illustration of UAV 200 while FIG. 2B is a bottom side plan view illustration of UAV 200.

The illustrated embodiment of UAV 200 includes a fuselage 220. In one embodiment, fuselage 220 is modular and includes a battery module, an avionics module, and a mission payload module. These modules are detachable from each other and mechanically securable to each other to contiguously form at least a portion of the fuselage 220 or UAV main body.

Figure 3:
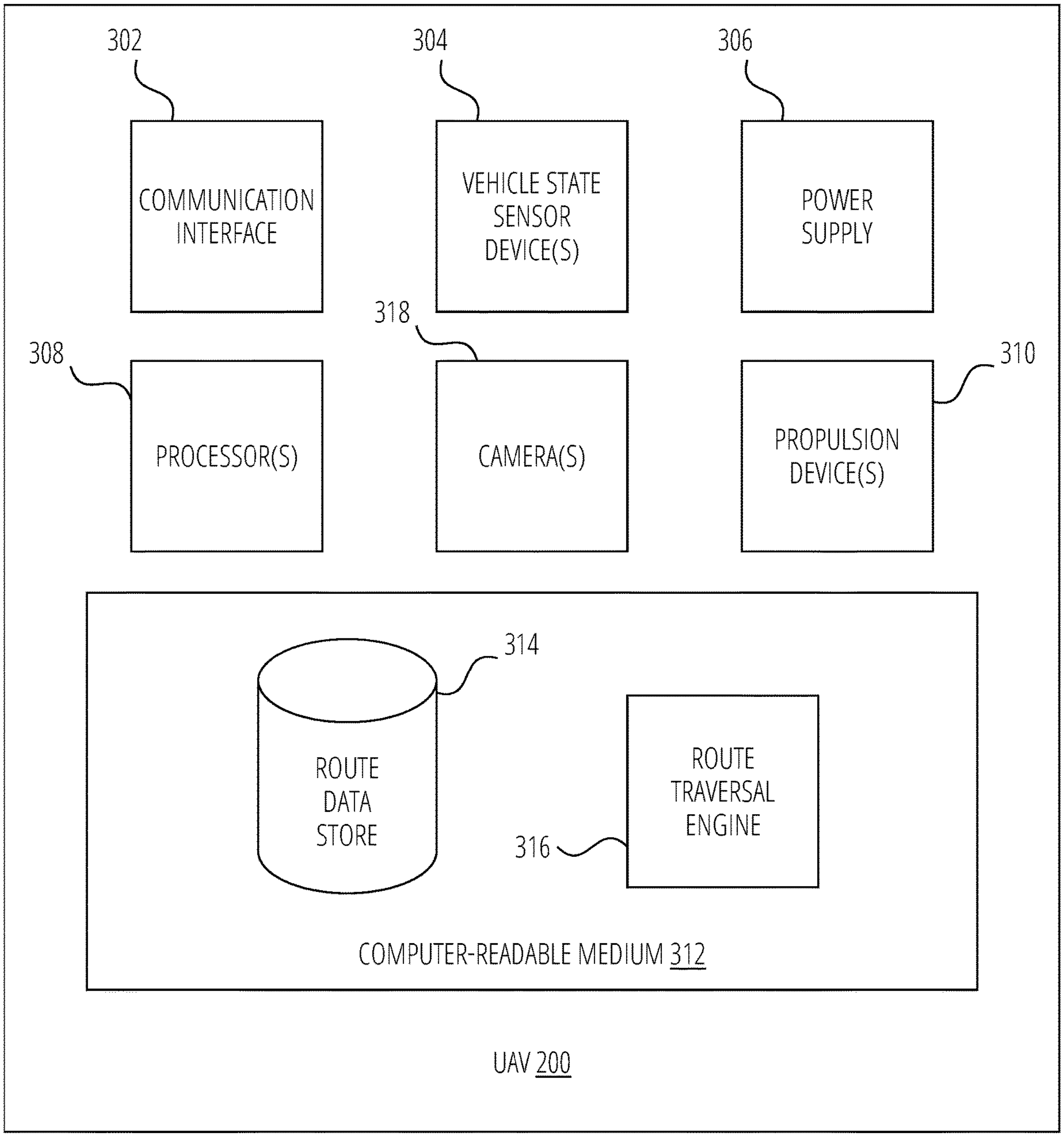
FIG. 3 is a block diagram that illustrates additional components of a non-limiting example embodiment of a UAV according to various aspects of the present disclosure.

The battery module includes a cavity for housing one or more batteries for powering UAV 200. The avionics module houses flight control circuitry of UAV 200, which may include a processor and memory, communication electronics and antennas (e.g., cellular transceiver, Wi-Fi transceiver, etc.), and various sensors (e.g., global positioning sensor, an inertial measurement unit (IMU), a magnetic compass, etc.). The mission payload module houses equipment associated with a mission of UAV 200. For example, the mission payload module may include a payload actuator for holding and releasing an externally attached payload. In another embodiment, the mission payload module may include a camera/sensor equipment holder for carrying camera/sensor equipment (e.g., camera, lenses, radar, LIDAR, pollution monitoring sensors, weather monitoring sensors, etc.). Other components that may be carried by some embodiments of the UAV 200 are illustrated in FIG. 3.

The illustrated embodiment of UAV 200 further includes horizontal propulsion units 212 positioned on wing assembly 224, which can each include a motor, shaft, motor mount, and propeller, for propelling UAV 200. The illustrated embodiment of UAV 200 includes two boom assemblies 206 that secure to wing assembly 224.

The illustrated embodiments of boom assemblies 206 each include a boom housing 218 in which a boom is disposed, vertical propulsion units 208, printed circuit boards 216, and stabilizers 202. Vertical propulsion units 208 can each include a motor, shaft, motor mounts, and propeller, for providing vertical propulsion. Vertical propulsion units 208 may be used during a hover mode where UAV 200 is descending (e.g., to a delivery location) or ascending (e.g., following a delivery). Stabilizers 202 (or fins) may be included with UAV 200 to stabilize the UAV's yaw (left or right turns) during flight. In some embodiments, UAV 200 may be configured to function as a glider. To do so, UAV 200 may power off its propulsion units and glide for a period of time.

During flight, UAV 200 may control the direction and/or speed of its movement by controlling its pitch, roll, yaw, and/or altitude. For example, the stabilizers 202 may include one or more rudders 204 for controlling the UAV's yaw, and wing assembly 224 may include elevators for controlling the UAV's pitch and/or ailerons 210 for controlling the UAV's roll. As another example, increasing or decreasing the speed of all the propellers simultaneously can result in UAV 200 increasing or decreasing its altitude, respectively. The UAV 200 may also include components for sensing the environment around the UAV 200, including but not limited to audio sensor 222 and audio sensor 214. Further examples of sensor devices are illustrated in FIG. 3 and described below.

Many variations on the illustrated fixed-wing aerial vehicle are possible. For instance, aerial vehicles with more wings (e.g., an "x-wing" configuration with four wings), are also possible. Although FIG. 2A and FIG. 2B illustrate one wing assembly 224, two boom assemblies 206, two horizontal propulsion units 212, and six vertical propulsion units 208 per boom assembly 206, it should be appreciated that other variants of UAV 200 may be implemented with more or fewer of these components. It should also be appreciated that in some embodiments of the system 100, UAVs of multiple different types may be used within the fleet of UAVs 110, including UAVs that do not include fixed wings (e.g., UAVs with four vertical propulsion units 208 (quadcopters), eight vertical propulsion units 208 (octocopters), or other numbers of rotors with or without fixed wings), or UAVs that do not include vertical propulsion units 208.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

FIG. 3 is a block diagram that illustrates additional components of a non-limiting example embodiment of a UAV according to various aspects of the present disclosure.

As shown, the UAV 200 includes a communication interface 302, one or more vehicle state sensor devices 304, a power supply 306, one or more processors 308, one or more cameras 318 one or more propulsion devices 310, and a computer-readable medium 312. As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the communication interface 302 includes hardware and software to enable any suitable communication technology for communicating with the fleet management computing system 102 and/or other components of the system 100. In some embodiments, the communication interface 302 includes multiple communication interfaces, each for use in appropriate circumstances. For example, the communication interface 302 may include a long-range wireless interface such as a 4G or LTE interface, or any other type of long-range wireless interface (e.g., 2G, 3G, 5G, or WiMAX), to be used to communicate with the fleet management computing system 102 while traversing a route. The communication interface 302 may also include a medium-range wireless interface such as a Wi-Fi interface to be used when the UAV 200 is at an area near a start location or an endpoint where Wi-Fi coverage is available. The communication interface 302 may also include a short-range wireless interface such as a Bluetooth interface to be used when the UAV 200 is in a maintenance location or is otherwise stationary and waiting to be assigned a route. The communication interface 302 may also include a wired interface, such as an Ethernet interface or a USB interface, which may also be used when the UAV 200 is in a maintenance location or is otherwise stationary and waiting to be assigned a route.

In some embodiments, the vehicle state sensor devices 304 are configured to detect states of various components of the UAV 200, and to transmit signals representing those states to other components of the UAV 200. Some non-limiting examples of vehicle state sensor device 304 include a battery state sensor and a propulsion device health sensor. The vehicle state sensor devices 304 may also include a GNSS sensor, one or more accelerometers (and/or other devices that are part of an inertial navigation system), LIDAR devices, and/or other sensor devices for sensing an environment of the UAV 200.

In some embodiments, the power supply 306 may be any suitable device or system for storing and/or generating power. Some non-limiting examples of a power supply 306 include one or more batteries, one or more solar panels, a fuel tank, and combinations thereof. In some embodiments, the propulsion devices 310 may include any suitable devices for causing the UAV 200 to travel along the path. For an aircraft, the propulsion device 310 may include devices such as, but not limited to, one or more motors, one or more propellers, and one or more flight control surfaces.

In some embodiments, the processor 308 may include any type of computer processor capable of receiving signals from other components of the UAV 200 and executing instructions stored on the computer-readable medium 312, including but not limited to general purpose processors, special purpose processors (e.g., graphical processing units (GPUs), tensor processing units (TPUs), etc), or application-specific integrated circuits (ASICs). In some embodiments, the computer-readable medium 312 may include one or more devices capable of storing information for access by the processor 308. In some embodiments, the computer-readable medium 312 may include one or more of a hard drive, a flash drive, an EEPROM, and combinations thereof.

In some embodiments, the one or more cameras 318 may include any suitable type of camera for capturing imagery from the point of view of the UAV 200. For example, the cameras 318 may include one or more of a downward-facing camera or an angled-view camera. In some embodiments, the one or more cameras 318 may include one or more cameras of any type, including but not limited to a visible light camera, an infrared camera, a light-field camera, a laser camera, and a time-of-flight camera.

As shown, the computer-readable medium 312 has stored thereon a route data store 314 and a route traversal engine 316. In some embodiments, the route traversal engine 316 is configured to cause the propulsion devices 310 to propel the UAV 200 through navigation routes received from the fleet management computing system 102 and stored in the route data store 314. The route traversal engine 316 may use signals from other devices, such as vehicle state sensor devices 304, cameras 318, GPS sensor devices, vision-based navigation devices, accelerometers, LIDAR devices, and/or other devices that are not illustrated or described further herein, to assist in positioning and navigation as is typical for a UAV 200.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 4:
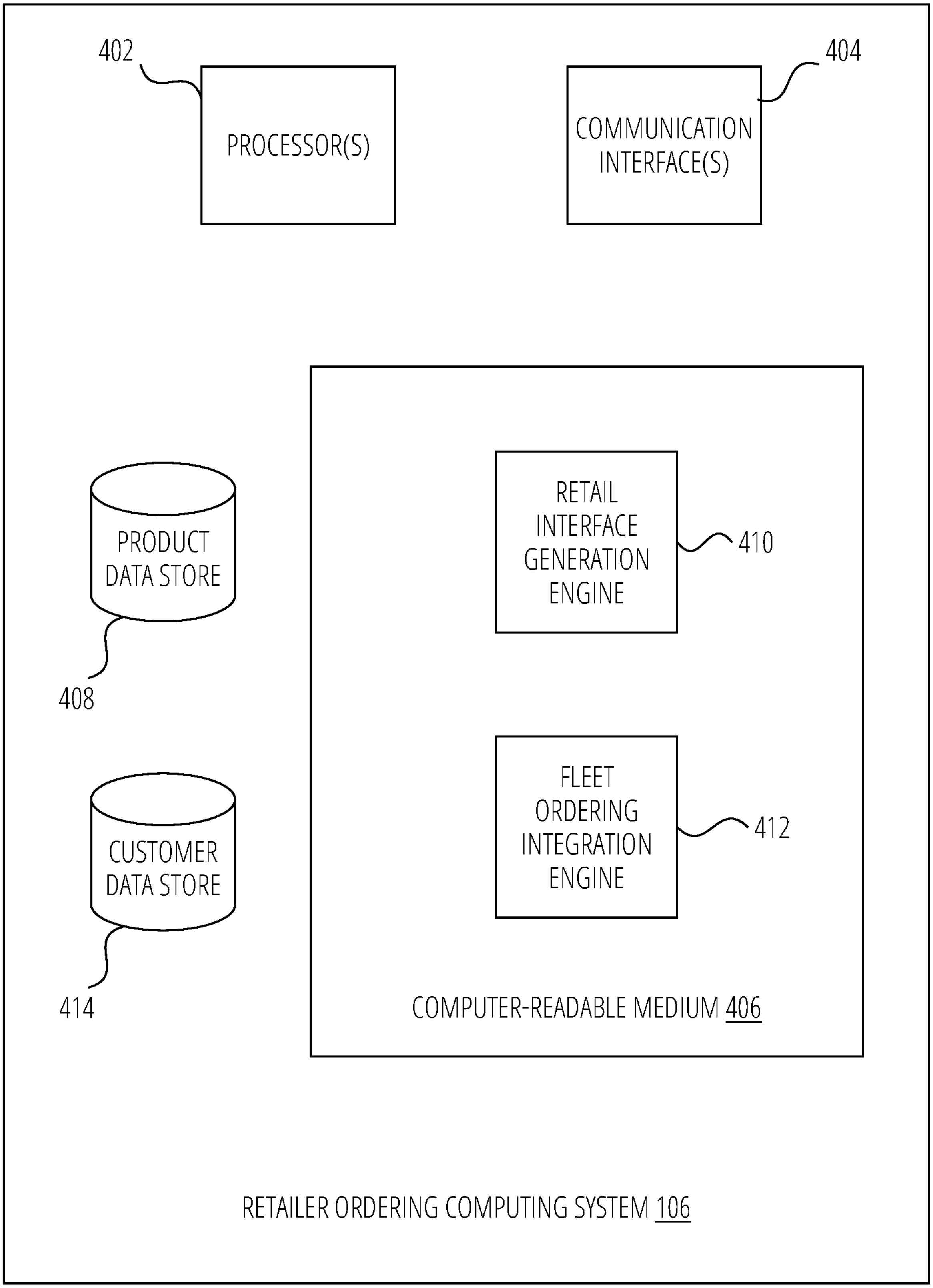
FIG. 4 is a block diagram that illustrates aspects of a non-limiting example embodiment of a retailer ordering computing system according to various aspects of the present disclosure.

FIG. 4 is a block diagram that illustrates aspects of a non-limiting example embodiment of a retailer ordering computing system according to various aspects of the present disclosure. The illustrated retailer ordering computing system 106 may be implemented by any computing device or collection of computing devices, including but not limited to one or more desktop computing devices, laptop computing devices, mobile computing devices, server computing devices, computing devices of a cloud computing system, and/or combinations thereof. The retailer ordering computing system 106 is configured to provide ordering interfaces to customers 118, to transmit order information to retail retailer fulfillment computing systems 108, and to integrate with the fleet management computing system 102 so the UAV provider 122 can provide delivery services for the orders.

As shown, the retailer ordering computing system 106 includes one or more processors 402, one or more communication interfaces 404, a product data store 408, a customer data store 414, and a computer-readable medium 406.

In some embodiments, the processors 402 may include any suitable type of general-purpose computer processor. In some embodiments, the processors 402 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 404 include one or more hardware and or software interfaces suitable for providing communication links between components. The communication interfaces 404 may support one or more wired communication technologies (including but not limited to Ethernet, Fire Wire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 406 has stored thereon logic that, in response to execution by the one or more processors 402, cause the retailer ordering computing system 106 to provide a retail interface generation engine 410 and a fleet ordering integration engine 412.

In some embodiments, the retail interface generation engine 410 is configured to generate a retail interface. The retail interface may be presented by the customer computing device 114, and may allow the customer 118 to review and select products from the product data store 408 to be included in an order. The retail interface may also allow the customer 118 to choose between multiple delivery type options, including UAV delivery. The retail interface may also allow the customer 118 to track orders while they are en route. In some embodiments, the fleet ordering integration engine 412 is configured to access functionality of the fleet management computing system 102 used by the retailer ordering computing system 106.

In some embodiments, the retail interface generation engine 410 may be configured to provide a deep integration with the fleet management computing system 102, such that the retail interface generation engine 410 provides interfaces for the functionality of the fleet management computing system 102, and accesses the functionality using the fleet ordering integration engine 412 through one or more application programming interface (API) endpoints exposed by the fleet management computing system 102. In some embodiments, the retail interface generation engine 410 may be configured to use a looser integration with the fleet management computing system 102, and the retail interface generation engine 410 may cause interfaces provided by the fleet management computing system 102 to be presented by the customer computing device 114 to access at least some of the functionality of the fleet management computing system 102.

In some embodiments, the product data store 408 may store one or more items of product information relevant to generating the retail interface (e.g., product names, descriptions, stock numbers, etc.). In some embodiments, the product data store 408 may also store one or more items product information relevant to completing a delivery via UAV (e.g., product dimensions, product weight, special packing instructions such as not allowing stacking and/or a required orientation, etc.). In some embodiments, the customer data store 414 may store information that identifies customers 118 for retail order fulfillment (e.g., name, payment information, etc.), and may also store information for customers 118 to help facilitate delivery via UAV (e.g., a customer identifier for use with the UAV provider 122, a delivery location, stored onboarding information, etc.).

Further description of the configuration of each of these components is provided below. One will recognize that retailer ordering computing systems 106 typically have more components than those illustrated and described here, but since those components do not help illuminate the novel portions of the present disclosure, detailed description of those components has been omitted for the sake of brevity.

Figure 5:
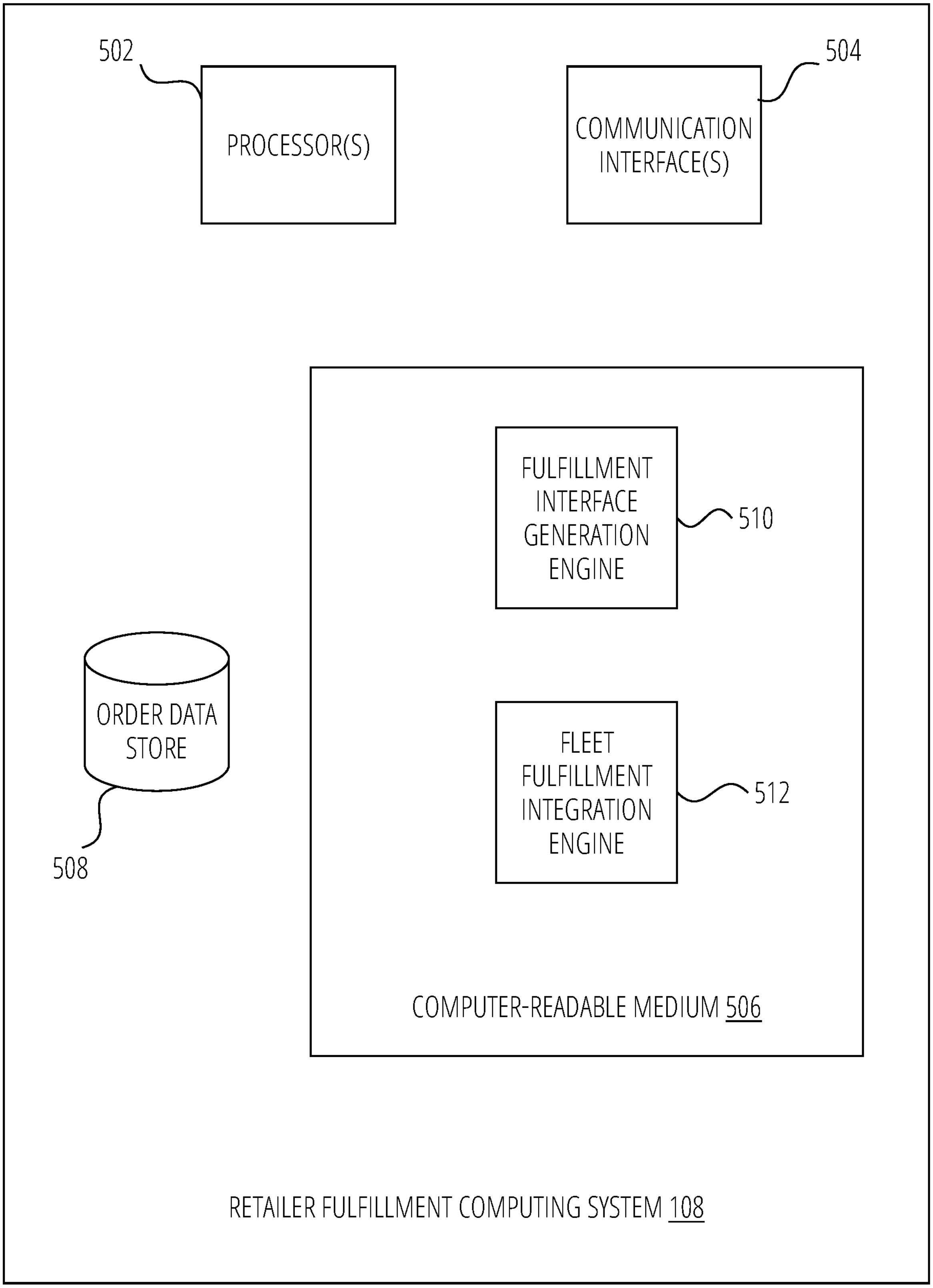
FIG. 5 is a block diagram that illustrates aspects of a non-limiting example embodiment of a retailer fulfillment computing system according to various aspects of the present disclosure.

FIG. 5 is a block diagram that illustrates aspects of a non-limiting example embodiment of a retailer fulfillment computing system according to various aspects of the present disclosure. The illustrated retailer fulfillment computing system 108 may be implemented by any computing device or collection of computing devices, including but not limited to one or more desktop computing devices, laptop computing devices, mobile computing devices, server computing devices, computing devices of a cloud computing system, and/or combinations thereof. The retailer fulfillment computing system 108 is configured to receive order information from the retailer ordering computing system 106, to guide preparation of orders based on the order information, and notify the fleet management computing system 102 when packages for orders are ready for pickup.

As shown, the retailer fulfillment computing system 108 includes one or more processors 502, one or more communication interfaces 504, an order data store 508, and a computer-readable medium 506.

In some embodiments, the processors 502 may include any suitable type of general-purpose computer processor. In some embodiments, the processors 502 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 504 include one or more hardware and or software interfaces suitable for providing communication links between components. The communication interfaces 504 may support one or more wired communication technologies (including but not limited to Ethernet, Fire Wire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 506 has stored thereon logic that, in response to execution by the one or more processors 502, cause the retailer fulfillment computing system 108 to provide a fulfillment interface generation engine 510 and a fleet fulfillment integration engine 512.

In some embodiments, the fulfillment interface generation engine 510 is configured to generate a fulfillment interface to be presented by a fulfillment computing device 116 that guides preparation of packages to be picked up by UAVs 110. In some embodiments, the fleet fulfillment integration engine 512 is configured to access functionality of the fleet management computing system 102. As with the fleet ordering integration engine 412, the fleet fulfillment integration engine 512 and fulfillment interface generation engine 510 may access the functionality of the fleet management computing system 102 using different levels of integration. For example, in some embodiments, the fulfillment interface provided by the fulfillment interface generation engine 510 may include interface elements that allow an indication that given packages are ready for pickup, and the fleet fulfillment integration engine 512 may be used to notify the fleet management computing system 102 that the indications have been received via an API provided by the fleet management computing system 102. In less integrated embodiments, the fulfillment interface provided by the fulfillment interface generation engine 510 may pass control to a loader interface provided by the fleet management computing system 102 through which notifications may be provided to the fleet management computing system 102 that packages are ready for pickup.

Further description of the configuration of each of these components is provided below.

Figure 6:
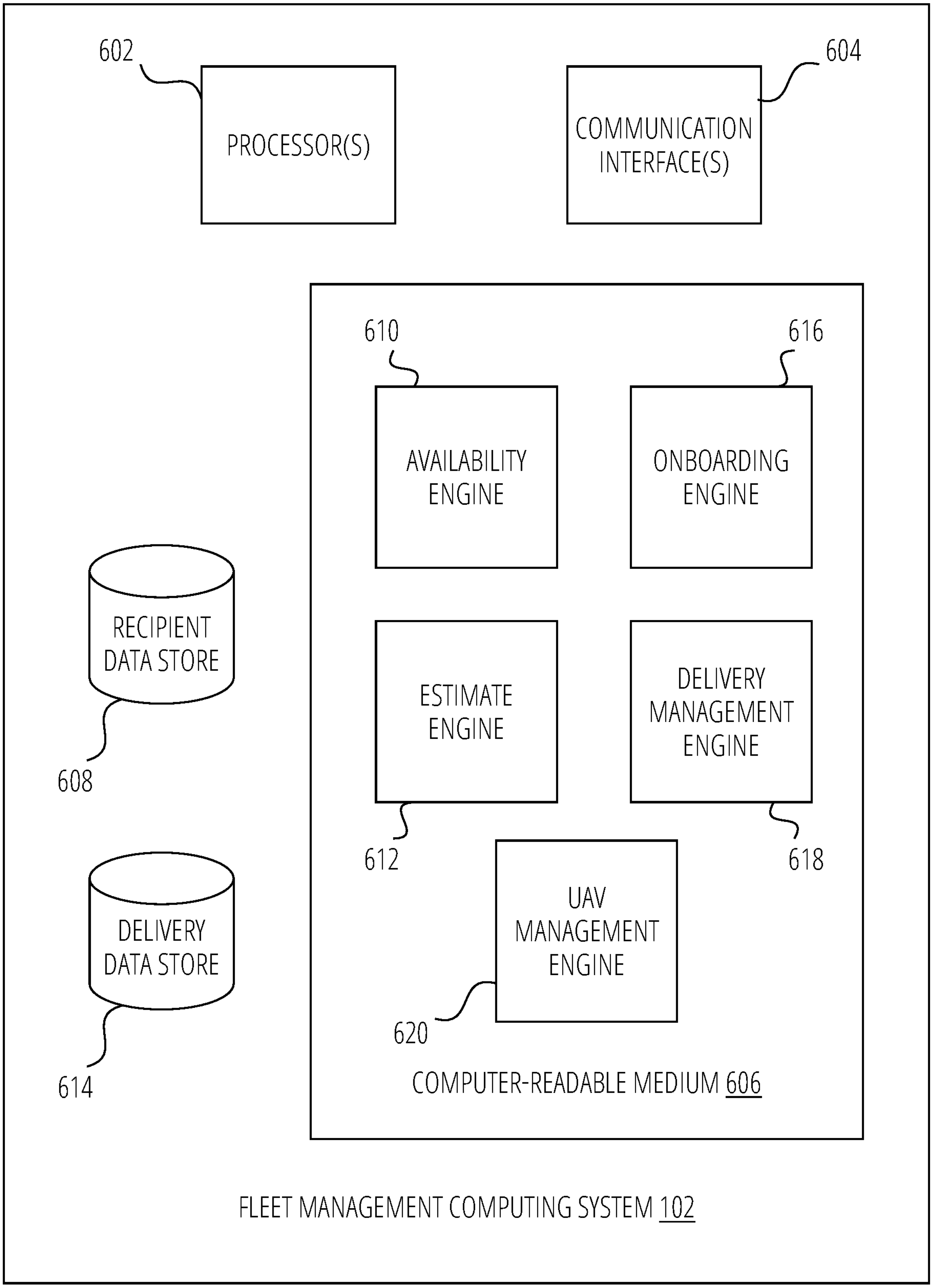
FIG. 6 is a block diagram that illustrates aspects of a non-limiting example embodiment of a fleet management computing system according to various aspects of the present disclosure.
Figure 7A:
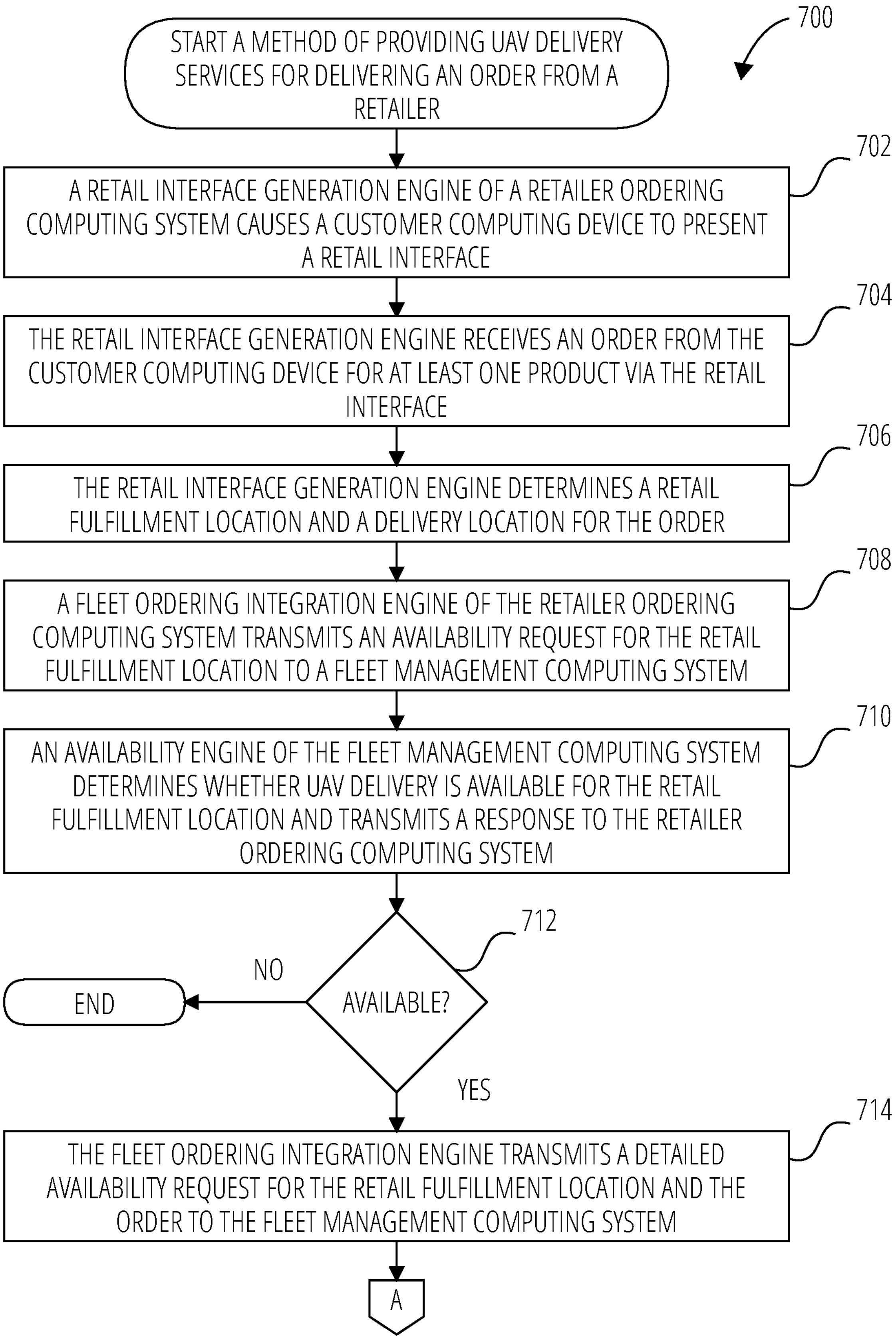
FIG. 7A-FIG. 7D are a flowchart that illustrates a non-limiting example embodiment of a method of providing UAV delivery services for delivering an order from a retailer according to various aspects of the present disclosure.
Figure 7B:
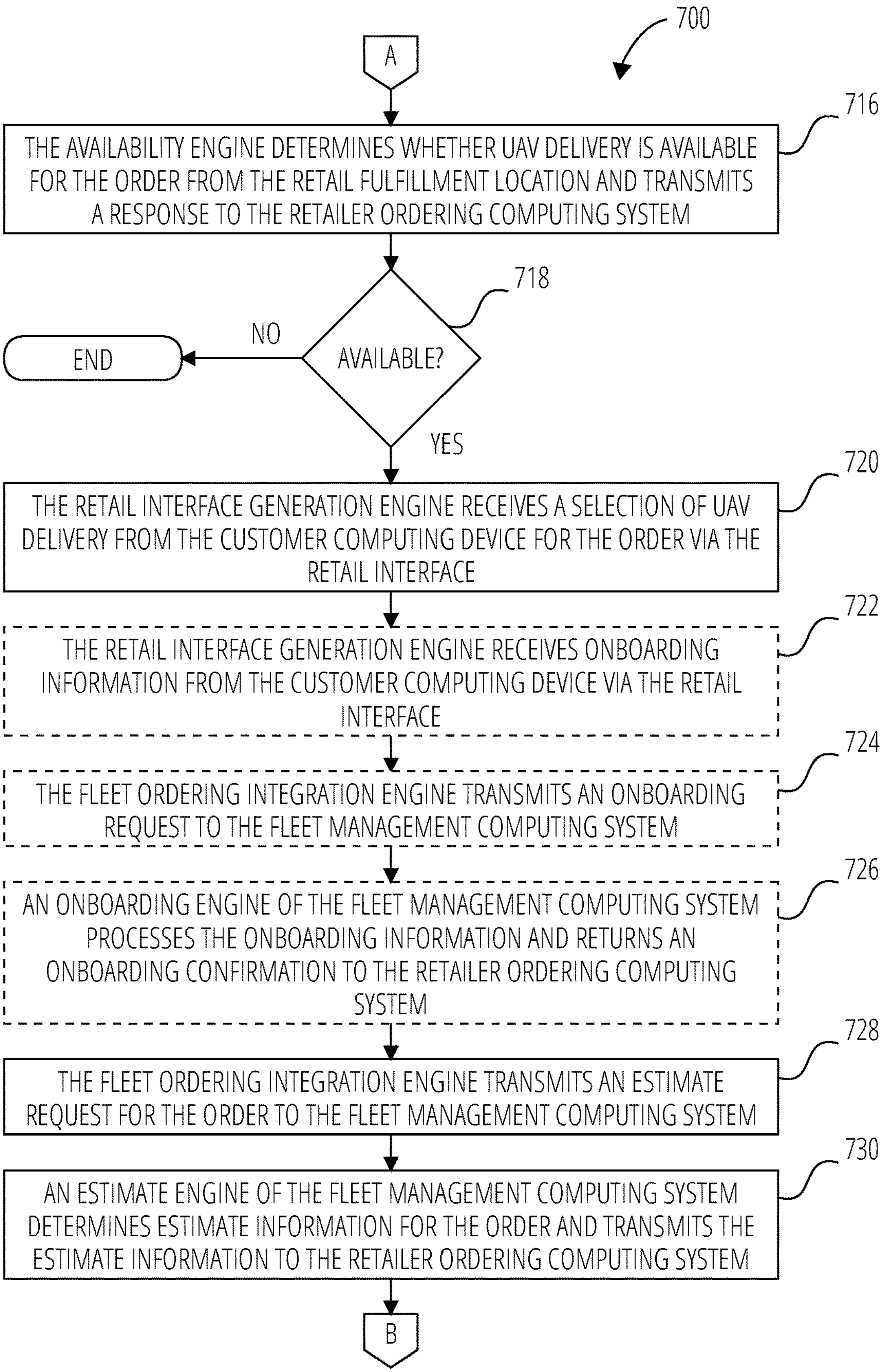
Figure 7C:
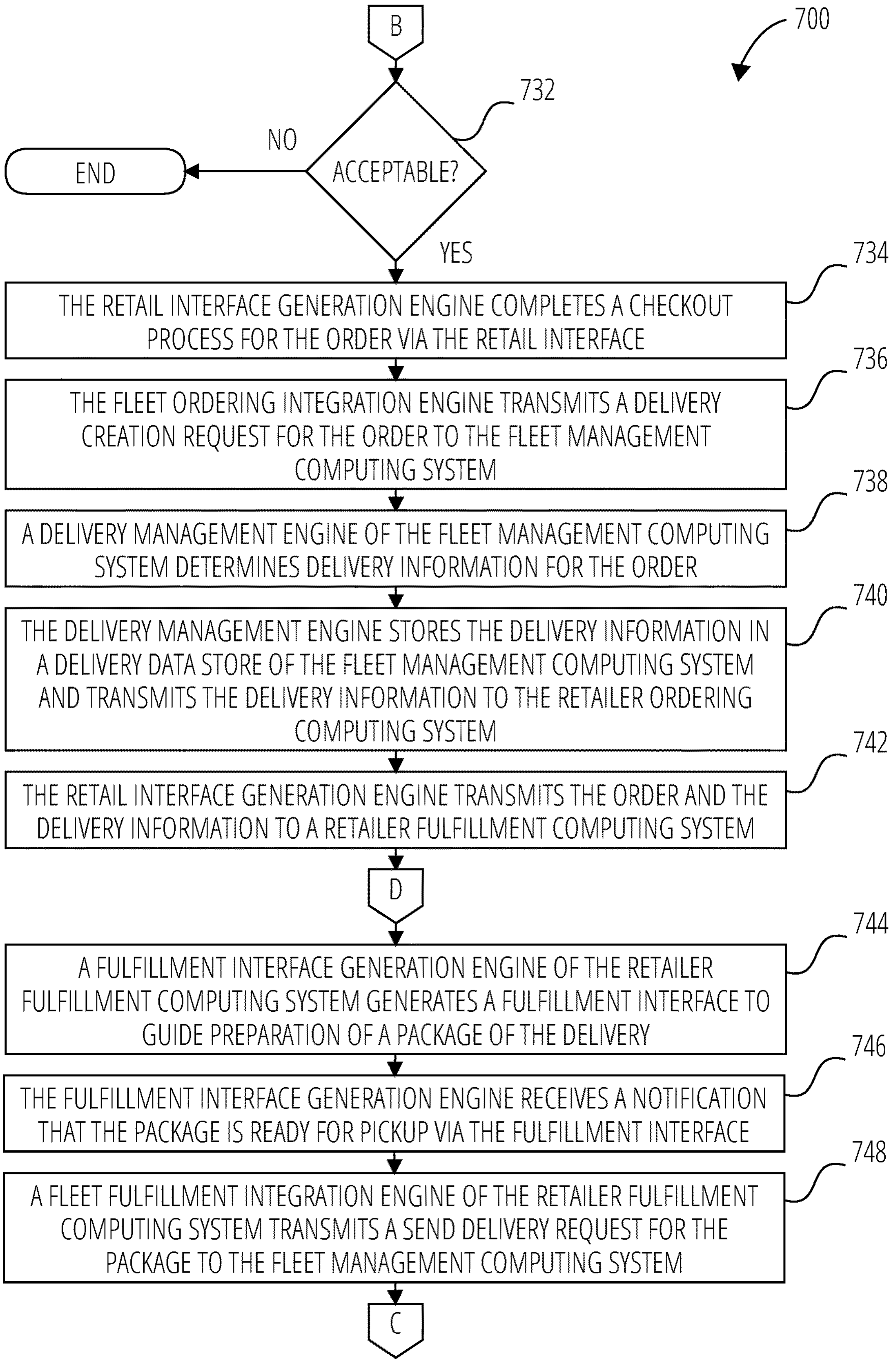
Figure 7D:
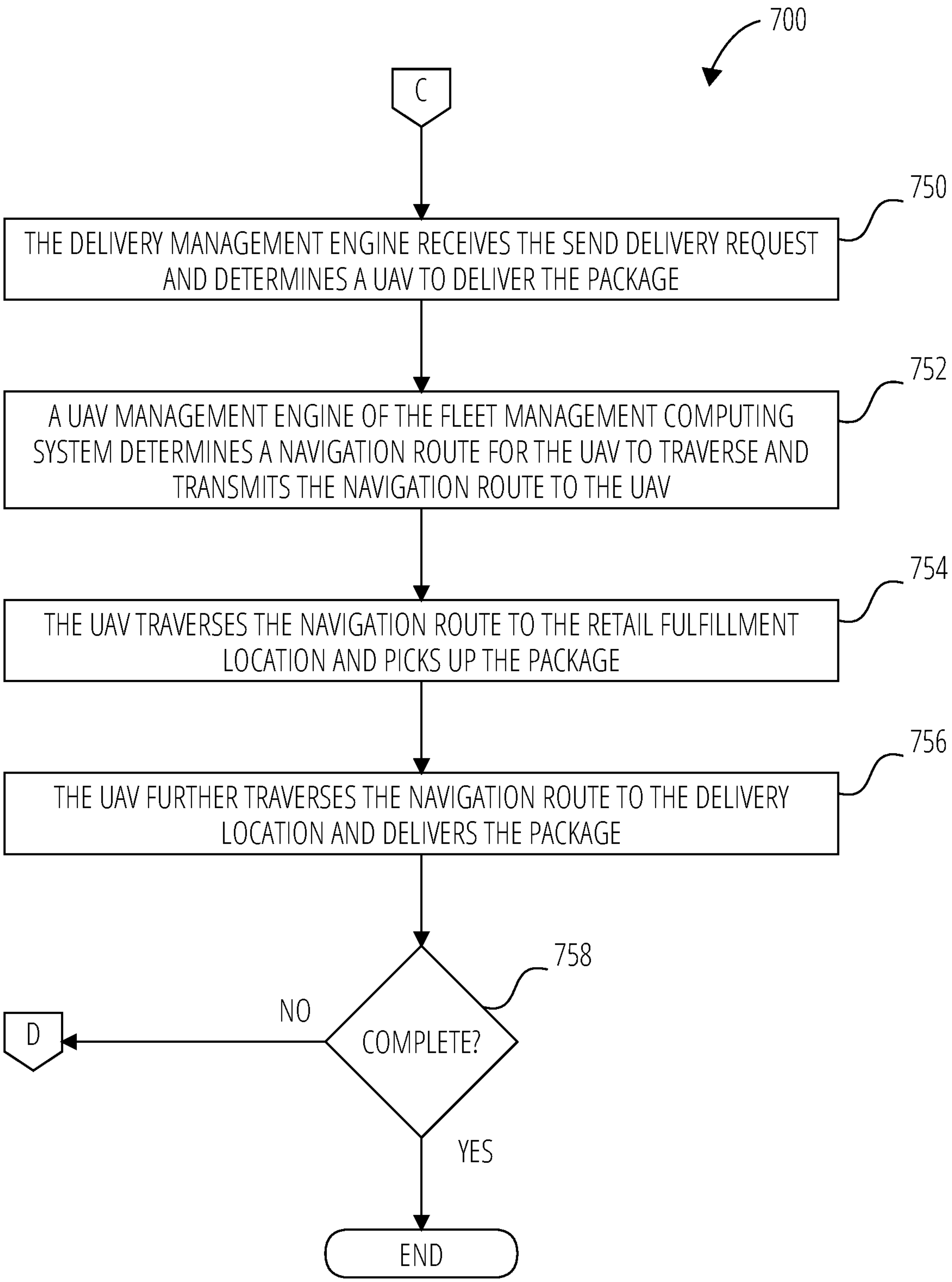

FIG. 6 is a block diagram that illustrates aspects of a non-limiting example embodiment of a fleet management computing system according to various aspects of the present disclosure. The illustrated fleet management computing system 102 may be implemented by any computing device or collection of computing devices, including but not limited to one or more desktop computing devices, laptop computing devices, mobile computing devices, server computing devices, computing devices of a cloud computing system, and/or combinations thereof. The fleet management computing system 102 is configured to provide services to retailer ordering computing systems 106 for creating and managing deliveries of orders using UAVs. The fleet management computing system 102 also is configured to manage a fleet of UAVs 110, including providing navigation routes to UAVs 110 to cause the UAVs 110 to autonomously accomplish missions including package deliveries.

As shown, the fleet management computing system 102 includes one or more processors 602, one or more communication interfaces 604, a recipient data store 608, a delivery data store 614, and a computer-readable medium 606.

In some embodiments, the processors 602 may include any suitable type of general-purpose computer processor. In some embodiments, the processors 602 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 604 include one or more hardware and or software interfaces suitable for providing communication links between components of the system 100, such as between the fleet management computing system 102 and the retailer ordering computing system 106, between the fleet management computing system 102 and the retailer fulfillment computing system 108, and between the fleet management computing system 102 and the UAVs 110. The communication interfaces 604 may support one or more wired communication technologies (including but not limited to Ethernet, Fire Wire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 606 has stored thereon logic that, in response to execution by the one or more processors 602, cause the fleet management computing system 102 to provide an availability engine 610, an onboarding engine 616, an estimate engine 612, a delivery management engine 618, and a UAV management engine 620.

In some embodiments, the availability engine 610 is configured to determine whether the fleet of UAVs 110 is capable of successfully servicing a given retail fulfillment location 112 and/or servicing an order to be delivered to a given delivery location 104 from a given retail fulfillment location 112. In some embodiments, the onboarding engine 616 is configured to set up a delivery location 104 within the fleet management computing system 102 for future deliveries. In some embodiments, the estimate engine 612 is configured to, for a given proposed delivery, provide a prediction of a number of packages to be used, an estimated time window in which the delivery could be serviced and/or completed, and/or other predictions related to the given proposed delivery. In some embodiments, the delivery management engine 618 is configured to receive a request for a delivery, to await notifications that packages of the delivery are ready for pickup, and to assign one or more UAVs 110 to service the delivery. In some embodiments, the UAV management engine 620 is configured to plan navigation routes to service deliveries, to transmit the planned navigation routes to UAVs 110 assigned to service the delivery, and to receive telemetry data from the UAVs 110 to allow for delivery tracking. In some embodiments, one or more of these engines provided by the fleet management computing system 102 may expose its functionality via one or more API endpoints that are accessible by other devices and systems within the system 100, to allow interoperation with the fleet management computing system 102 using varying degrees of integration with other custom systems.

Further description of the configuration of each of these components is provided below.

FIG. 7A-FIG. 7D are a flowchart that illustrates a non-limiting example embodiment of a method of providing UAV delivery services for delivering an order from a retailer according to various aspects of the present disclosure. The method 700 is an example that uses a high level of integration between the retailer 120 and the UAV provider 122, in that the retailer 120 has updated its retail interface and fulfillment interface to directly invoke functionality made available by the fleet management computing system 102 via one or more API endpoints instead of incorporating user interfaces provided by the UAV provider 122 into its ordering or fulfillment processes.

From a start block, the method 700 advances to block 702, where a retail interface generation engine 410 of a retailer ordering computing system 106 causes a customer computing device 114 to present a retail interface. The retail interface may allow a customer using the customer computing device 114 to search or browse for product information stored in the product data store 408, may provide product recommendations to the customer, may provide a shopping cart for collecting selected products to be added to an order, and/or provide other functionality commonly offered by online retailers.

At block 704, the retail interface generation engine 410 receives an order from the customer computing device 114 for at least one product via the retail interface. In some embodiments, the order may be received by the customer selecting a “checkout” interface element in a shopping cart, a “buy now” interface element on a product page, or another interface element of the retail interface that indicates that one or more selected products are desired to be ordered. After the order has been initiated at block 704, the retail interface may present a variety of different delivery modalities, including but not limited to ground delivery to the delivery location 104, customer pick-up at the retail fulfillment location 112, and UAV delivery.

In order to streamline the experience for the customer 118, it is desirable to refrain from providing delivery via UAV 110 as an option unless such a delivery would be possible. Accordingly, the retail interface generation engine 410 performs a sequence of steps to determine whether UAV delivery will be possible and/or feasible for the order prior to presenting a variety of options for delivery modalities. At block 706, the retail interface generation engine 410 determines a retail fulfillment location 112 and a delivery location 104 for the order. The delivery location 104 may be determined via entry by the customer 118 into the retail interface, by retrieving a previously saved delivery location 104 from the customer data store 414, or using any other suitable technique.

The retail fulfillment location 112 may be determined by retrieving information from the product data store 408 for each of the products in the order that indicates one or more retail fulfillment locations 112 from which the products may be obtained. In some embodiments, all of the products in the order may be available from a single retail fulfillment location 112, and the single retail fulfillment location 112 may be chosen as the retail fulfillment location 112. In some embodiments, some products of the order may be available from a first retail fulfillment location 112, and other products of the order may be available from a second retail fulfillment location 112. In such embodiments, the retail interface generation engine 410 may treat the products available from the separate retail fulfillment locations 112 as separate orders in the remainder of the method 700.

In some embodiments, a given product may be available from more than one retail fulfillment location 112. In such embodiments, the retail interface generation engine 410 may choose an optimal retail fulfillment location 112 to provide the given product. For example, the retail interface generation engine 410 may choose a retail fulfillment location 112 closest to the delivery location 104, may choose a retail fulfillment location 112 from which one or more other products of the order are also available, may choose a retail fulfillment location 112 based on staffing, stock levels, or other aspects of the retail fulfillment locations 112, or may choose an optimal retail fulfillment location 112 based on any other suitable factor.

At block 708, a fleet ordering integration engine 412 of the retailer ordering computing system 106 transmits an availability request for the retail fulfillment location 112 to a fleet management computing system 102. The availability request is a facility-level query that is intended to determine whether the UAV provider 122 is capable of providing delivery services from the retail fulfillment location 112. At block 710, an availability engine 610 of the fleet management computing system 102 determines whether UAV delivery is available for the retail fulfillment location 112 and transmits a response to the retailer ordering computing system 106.

In processing the availability request, the availability engine 610 may consider a plurality of factors related to whether the UAV provider 122 can provide UAVs 110 to service deliveries from the retail fulfillment location 112. In some embodiments, the availability engine 610 may consider the geographic area of the retail fulfillment location 112, and may consider whether it is reachable given one or more airspace restrictions in the region of the retail fulfillment location 112. In some embodiments, the availability engine 610 may consider a distance between the retail fulfillment location 112 and a nest or other location in which idle UAVs 110 are present, and whether a UAV 110 would have sufficient range to travel from its idle location to the retail fulfillment location 112, complete a delivery, and then travel back to an idle location. In some embodiments, in considering range, the availability engine 610 may consider the shortest distance between points, or may consider the shortest path between points that avoids restricted airspace. In some embodiments, the availability engine 610 may consider whether any UAVs 110 are presently available to service deliveries, and may find that delivery is not available if all UAVs 110 are currently either already servicing deliveries or are not currently in service. In some embodiments, if all UAVs 110 are currently servicing deliveries, the availability engine 610 may not use this as a signal that delivery is not available, but may consider a predicted time when the UAVs 110 will be available for a subsequent delivery in determining an estimated delivery duration for a given delivery.

In some embodiments, the availability engine 610 may retrieve mapping information, airspace restriction information, and other information for making the availability determination on-demand once the availability request is received. In some embodiments, the availability engine 610 may precompute locations near nests or other idle areas at which UAVs 110 are disposed at which retail fulfillment locations 112 could be serviced, and may respond to the availability request based on the precomputed information.

As discussed above, the availability engine 610 determines availability in response to the availability request at block 710 under ideal conditions (i.e., is delivery possible at all). In some embodiments, the availability engine 610 may determine at block 710 whether delivery is possible under the instant conditions, while in other embodiments, the availability engine 610 may wait to analyze the instant conditions until a more detailed availability request is submitted and analyzed at block 716. The analysis of instant conditions will be discussed in further detail below.

Figure 8A:
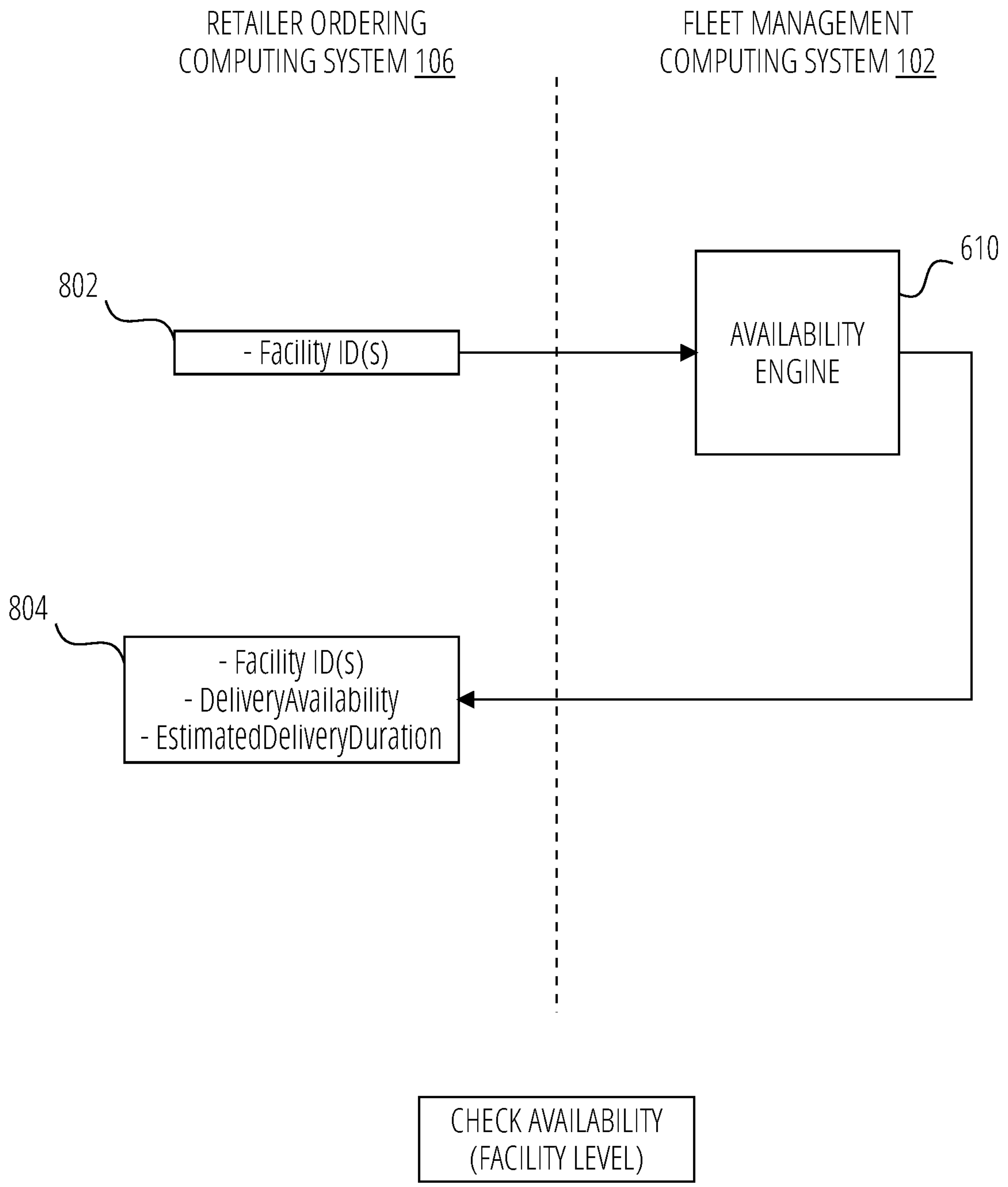
FIG. 8A-FIG. 8G illustrate non-limiting examples of API endpoints exposed by the fleet management computing system to provide access to various functionality according to various aspects of the present disclosure.

As the method 700 is using a higher level of integration with the UAV provider 122, the fleet ordering integration engine 412 transmits the availability request to an API endpoint exposed by the fleet management computing system 102, and receives the response from the API. FIG. 8A illustrates a non-limiting example of a call to an API endpoint exposed by the fleet management computing system 102 for a facility-level check availability method, according to various aspects of the present disclosure.

In FIG. 8A, the API endpoint exposed by the availability engine 610 is illustrated as accepting input parameters 802 that include one or more facility IDs that identify the retail fulfillment locations 112 of the retailer 120. In some embodiments, in addition to the facility IDs, the input parameters 802 may include addresses and/or latitude/longitude information to accompany the facility ID for each retail fulfillment location 112. In some embodiments, the address and/or latitude/longitude of each retail fulfillment location 112 may have previously been configured by the retailer 120 with the fleet management computing system 102, and the facility ID may identify this previously provided information. Once the availability is determined, the availability engine 610 provides a set of output parameters 804 that include one or more facility IDs, delivery availability for each of the one or more facility IDs (e.g., whether delivery is possible for each of the one or more facility IDs), and an estimated delivery duration for each of the one or more facility IDs (e.g., how long it would take to dispatch a UAV 110 for a pickup for each of the one or more facility IDs).

Returning to FIG. 7A, the method 700 proceeds to a decision block 712, where a determination is made based on whether the response indicates that UAV delivery is available for the retail fulfillment location 112. In some embodiments, the response may simply indicate whether or not UAV delivery is available, and the determination may be simply based on the indication in the response. In some embodiments, the response may include a forecast of how long a delivery would take, and the determination of whether UAV delivery is available may be based on whether the length of time is less than a threshold length of time.

If it is determined at decision block 712 that UAV delivery is not available for the retail fulfillment location 112, then the result of decision block 712 is NO, and the method 700 proceeds to an end block and terminates. At this end block (as well as the end blocks connected to decision block 718 and decision block 732), the method 700 is described as ending, but the retailer ordering computing system 106 may continue to process the order using another form of product fulfillment (e.g., traditional ground-based delivery, customer pickup, etc.). Even though the ordering process may continue in these cases, the actions related to these other forms of product fulfillment are not relevant to the UAV-based delivery described herein, and so the method 700 does not describe these actions further for the sake of brevity.

Otherwise, if it is determined at decision block 712 that UAV delivery is available for the retail fulfillment location 112, then the result of decision block 712 is YES, and the method 700 advances to block 714, wherein the fleet ordering integration engine 412 transmits a detailed availability request for the retail fulfillment location 112 and the order to the fleet management computing system 102. The detailed availability request is a query that is intended to determine whether the UAV provider 122 is capable of completing a delivery of packages from the retail fulfillment location 112 to the delivery location 104. The method 700 then advances to a continuation terminal ("terminal A").

From terminal A (FIG. 7B), the method 700 advances to block 716, where the availability engine 610 determines whether UAV delivery is available for the order from the retail fulfillment location 112 and transmits a response to the retailer ordering computing system 106.

In some embodiments, the availability engine 610 uses multiple separate determinations in determining whether delivery of packages from the retail fulfillment location 112 to the delivery location 104 is available. One non-limiting example of a determination made by the availability engine 610 is whether delivery to the delivery location 104 is possible. The delivery location 104 may specify a mailing address, a latitude/longitude, a parcel identifier, or other identifier of the location for the delivery. The availability engine 610 may retrieve aerial imagery that depicts the delivery location 104, and may use computer vision techniques for semantic segmentation (e.g., neural networks such as a U-Net, or other techniques) to label objects in the imagery. For example, the availability engine 610 may label lawns, patios, driveways, sidewalks, porches, and other clear areas as areas in which a delivery spot could be located, and may label trees, power lines, antennas, shelters, and other objects as areas which would obstruct a delivery. The availability engine 610 may determine whether the areas in which a delivery spot could be located are large enough for a UAV 110 to access, and whether a UAV 110 could access the areas without conflicting with an obstructing object. If there is enough clear area for a delivery spot to be located and a UAV 110 would be able to reach the delivery spot, then this determination would find that delivery via UAV 110 would be possible. Otherwise, this determination would find that delivery via UAV 110 would not be possible.

Another non-limiting example of a determination made by the availability engine 610 is whether the delivery location 104 is within an authorized delivery area. The range of the UAVs 110 managed by the UAV provider 122 may be larger than an area in which the UAV provider 122 is authorized to provide deliveries per governmental regulation, permitting, or other reasons. As such, the availability engine 610 may compare the delivery location 104 to the authorized areas, and may determine whether delivery via UAV 110 to the delivery location 104 is possible based on this authorization.

Yet another non-limiting example of a determination made by the availability engine 610 is whether there are airspace restrictions that affect the delivery location 104. The fleet management computing system 102 may receive varying temporary flight restrictions based on transitory events (e.g., flights restricted near a stadium during events at the stadium, etc.), and may also receive records of more permanent airspace restrictions (e.g., no UAV operations allowed within certain areas near an airport, national parks, national security areas, etc.). The availability engine 610 may determine whether the delivery location 104 lies within restricted airspace at the expected time of the delivery, and may make a determination of whether delivery via UAV 110 would be possible based on that. The availability engine 610 may also plan a navigation route for a UAV 110 to the retail fulfillment location 112 and the delivery location 104 that avoids any restricted airspace to determine whether the navigation route is still within the range of the UAV 110 after any detours for avoiding airspace restrictions have been taken into account.

Another non-limiting example of a determination made by the availability engine 610 is whether the customer submitting the order has completed an onboarding process, as described in further detail below. In some embodiments, the onboarding process may be performed outside of the method 700, and accordingly, the availability engine 610 may use the completion of onboarding as another prerequisite for the availability of delivery for an order to a customer.

One more non-limiting example of a determination made by the availability engine 610 is whether instant conditions would allow a delivery to be completed. For example, the availability engine 610 may determine a time of day (e.g., day, twilight, night), a wind condition, a precipitation condition, a temperature, and/or other environmental factors to determine whether a UAV 110 can safely traverse the navigation route for the delivery. The availability engine 610 may determine whether delivery via UAV 110 is available based on whether each of the instant conditions satisfies an appropriate threshold for safe UAV operation.

Yet another non-limiting example of a determination made by the availability engine 610 is whether the products included in the order may be delivered via UAV 110. In some embodiments, the determination may be based on dimensions, weight, and/or other aspects of the product that affect whether the UAV 110 is capable of carrying the product. In some embodiments, the determination may be made based on whether the product includes hazardous materials (e.g., explosives, infectious materials, flammable liquids or solids, radioactive materials, gases or aerosols, etc.). If any of the products in the order constitute hazardous materials, the availability engine 610 may determine that delivery via UAV 110 is not available. While described as being performed by the availability engine 610, in some embodiments, the determination of whether ineligible products (particularly, but not necessarily limited to hazardous materials) are included in the order is performed by the retail interface generation engine 410 without involving the fleet management computing system 102, and the retail interface generation engine 410 may refrain from any further communication with the fleet management computing system 102 for a given order (other than potentially cleaning up any consumed resources that will not be needed) upon determining that ineligible products are present in the order.

As noted above, in some embodiments, the availability engine 610 may use all of these determinations to determine an overall answer regarding whether UAV delivery is available for the order from the retail fulfillment location 112 to the delivery location 104.

Figure 8B:
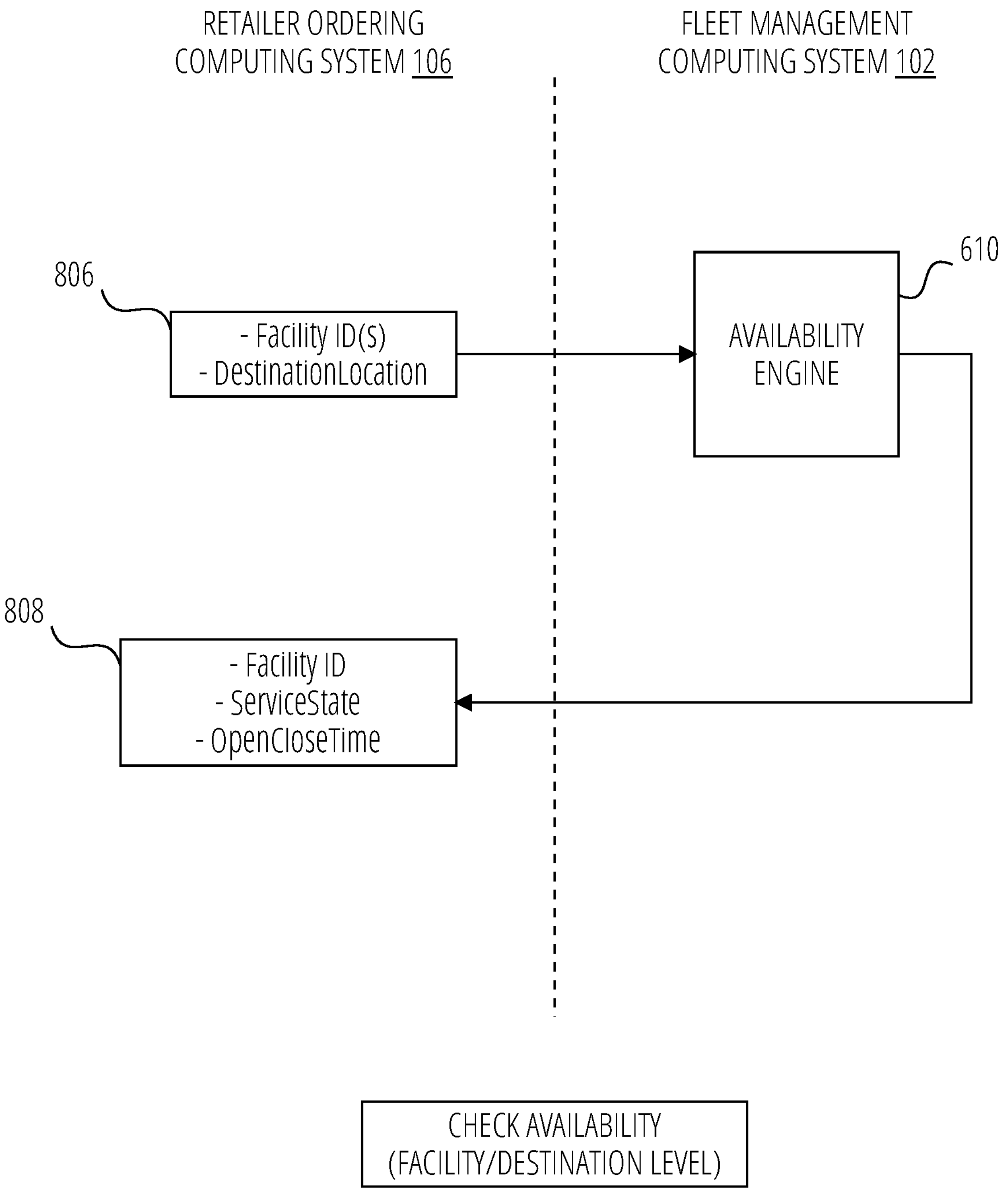

Again, since the method 700 is using the higher level of integration with the UAV provider 122, the fleet ordering integration engine 412 transmits the detailed availability request to an API endpoint exposed by the fleet management computing system 102, and receives the response from the API. FIG. 8B illustrates a non-limiting example of a call to an API endpoint exposed by the fleet management computing system 102 for a detailed availability request method, according to various aspects of the present disclosure.

In FIG. 8B, the API endpoint exposed by the availability engine 610 is illustrated as accepting input parameters 806 that include one or more facility IDs that identify one or more retail fulfillment locations 112 of the retailer 120, and a DestinationLocation that identifies the delivery location 104. The facility IDs may be specified similarly to the facility IDs in FIG. 8A. The delivery location 104 may be specified as a mailing address, a latitude/longitude, or using any other suitable location identifier. Once the detailed availability is determined, the availability engine 610 provides a set of output parameters 808 that include delivery availability to the delivery location 104 for each of the one or more facility IDs, a current overall state of the delivery service, and an OpenCloseTime that specifies time periods during which the availability determination is valid (e.g., time periods during which the UAV provider 122 is actively providing services).

Returning to FIG. 7B, the method 700 proceeds to decision block 718, where a determination is made based on whether the response indicates that UAV delivery is available for the retail fulfillment location 112 and the order. In some embodiments, the response may simply indicate whether or not UAV delivery is available, and the determination may simply be based on the indication in the response. In some embodiments, the response may include information such as availability times, estimated wait times, etc., and the determination may be based on whether the availability times, wait times, etc., coincide with availability of the retail fulfillment location 112, or whether the information is otherwise acceptable.

If it is determined at decision block 718 that UAV delivery is not available for the retail fulfillment location 112 and the order, then the result of decision block 718 is NO, and the method 700 proceeds to an end block and terminates. Otherwise, if it is determined that UAV delivery is available for the retail fulfillment location 112 and the order, then the result of decision block 718 is YES, and the method 700 advances to block 720, where a plurality of delivery modalities (including delivery via UAV 110) are presented to the customer 118, and the retail interface generation engine 410 receives a selection of UAV delivery from the customer computing device 114 for the order via the retail interface.

The facility-level and detailed checking of availability prior to the customer 118 being presented with UAV delivery as an option is an example embodiment only, and should not be seen as limiting. In some embodiments, the facility-level and detailed checking of availability may occur after the customer 118 selects a UAV delivery modality, and the availability checking may be performed afterwards to ensure that the delivery may be completed. This would raise awareness of the availability of UAV delivery in general, even if not available for a given order. By using the high amount of integration between the retailer 120 and the UAV provider 122, the retailer 120 can adapt its retail interface to react to the availability of the UAV provider 122 as it desires (either by hiding UAV delivery in cases where it is not available, or showing UAV delivery even if it is not available), thus improving the flexibility of the interaction between the retailer ordering computing system 106 and the fleet management computing system 102, and improving the functionality of the retail interface.

At optional block 722, the retail interface generation engine 410 receives onboarding information from the customer computing device 114 via the retail interface. Currently, the acceptance of deliveries via UAVs 110 is more highly regulated than traditional deliveries via ground transport or hand delivery, and an onboarding process is undertaken for each new customer 118 and delivery location 104 to be used. The onboarding information may include any information collected during the onboarding process. For example, during the onboarding process, the customer 118 may agree to a terms of use agreement. Accordingly, the onboarding information may include a record of the agreement of the customer 118 to the terms of use, and may also include either a reference to the version of the terms of use agreed to, or the full terms of use themselves. As another example, during the onboarding process, the customer 118 may be asked to specify a specific dropoff spot to be used at the delivery location 104. The retail interface may present aerial imagery of the delivery location 104, which may include indications of areas that were determined above to be valid locations for a dropoff spot by the availability engine 610, and may accept an input from the customer 118 of a specific dropoff spot to be used. The indicated dropoff spot may be included with the onboarding information. As yet another example, during the onboarding process, the customer 118 may be presented with various educational materials regarding how to successfully receive a delivery via a UAV 110 (e.g., making sure that the area around the dropoff spot is clear, agreeing not to touch the tether, agreeing to contact the UAV provider 122 if the UAV 110 has to conduct an emergency landing, etc). Confirmation that the customer 118 has reviewed the educational materials, and in some embodiments the educational materials themselves (or indications of the versions presented), may also be included in the onboarding information.

Figure 9A:
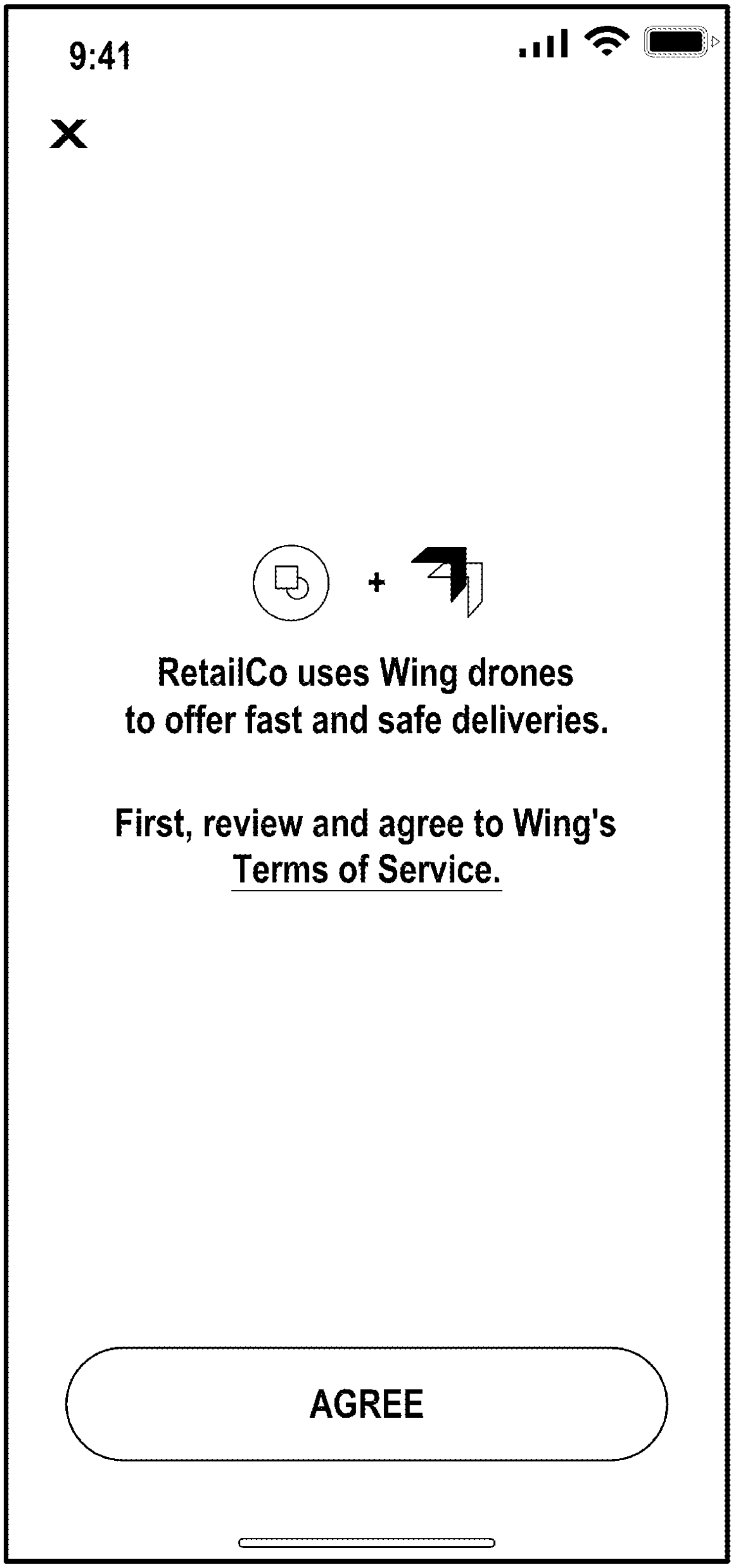
FIG. 9A-FIG. 9E are screenshots that illustrate a non-limiting example embodiment of a retail interface adapted to collect onboarding information according to various aspects of the present disclosure
Figure 9B:
Figure 9C:
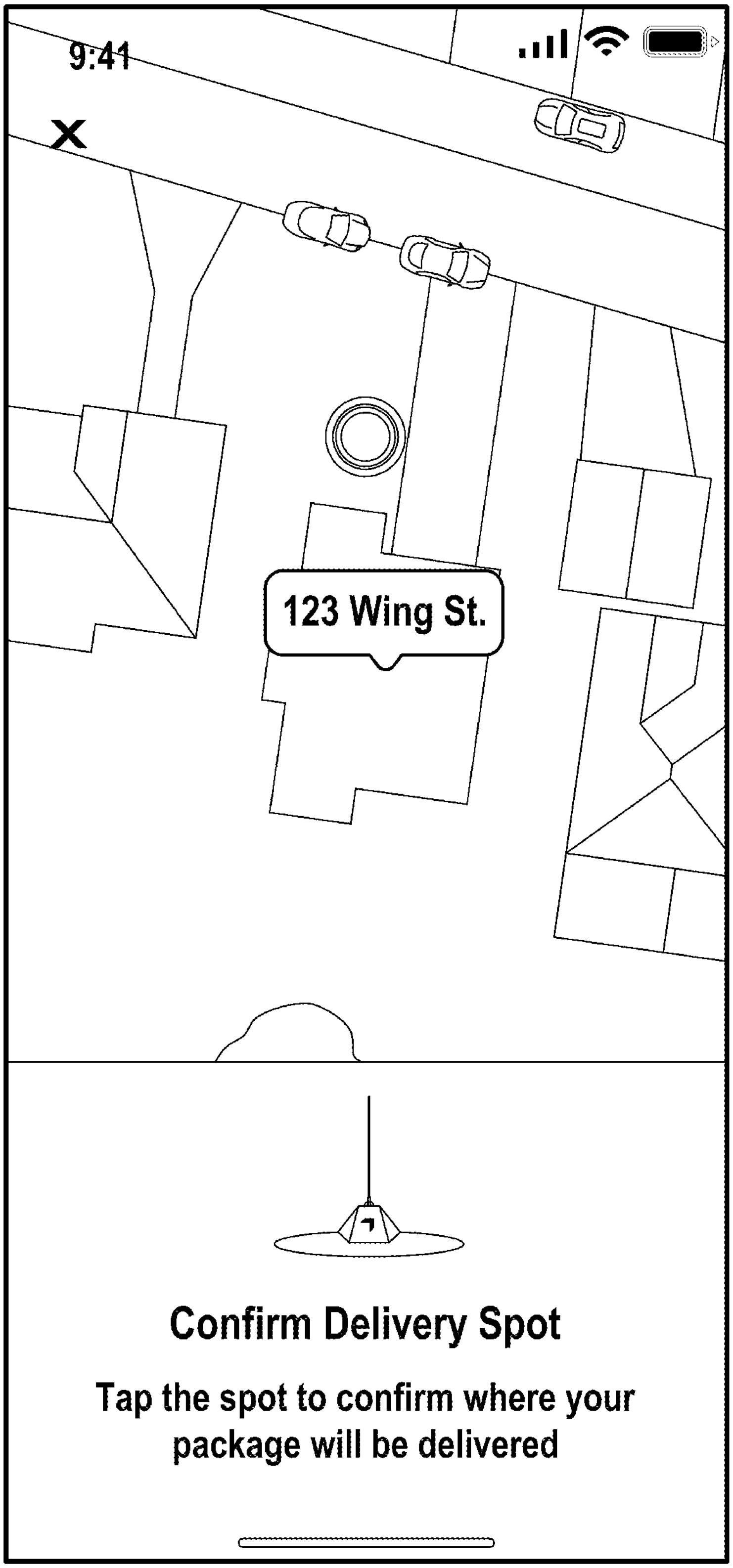
Figure 9D:
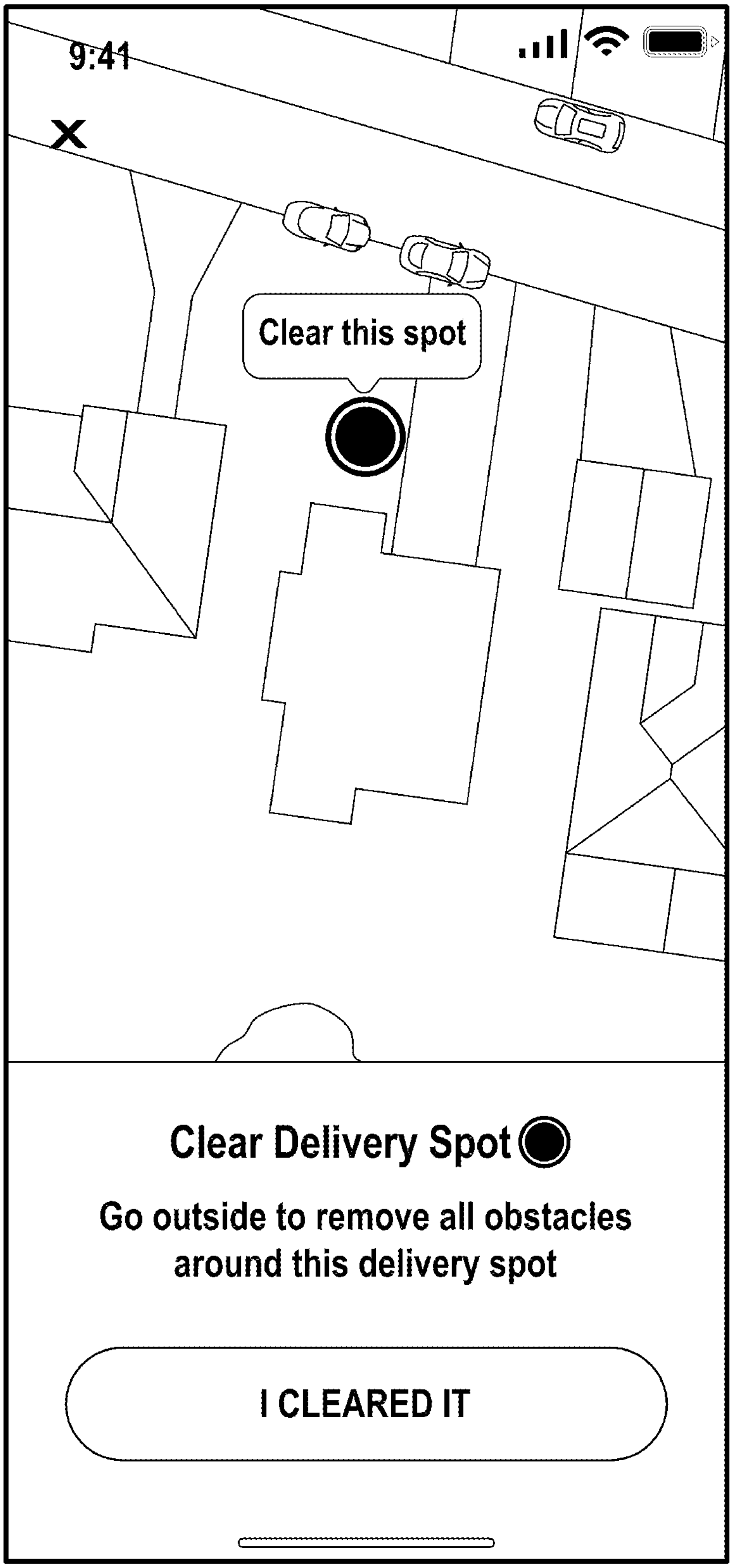
Figure 9E:
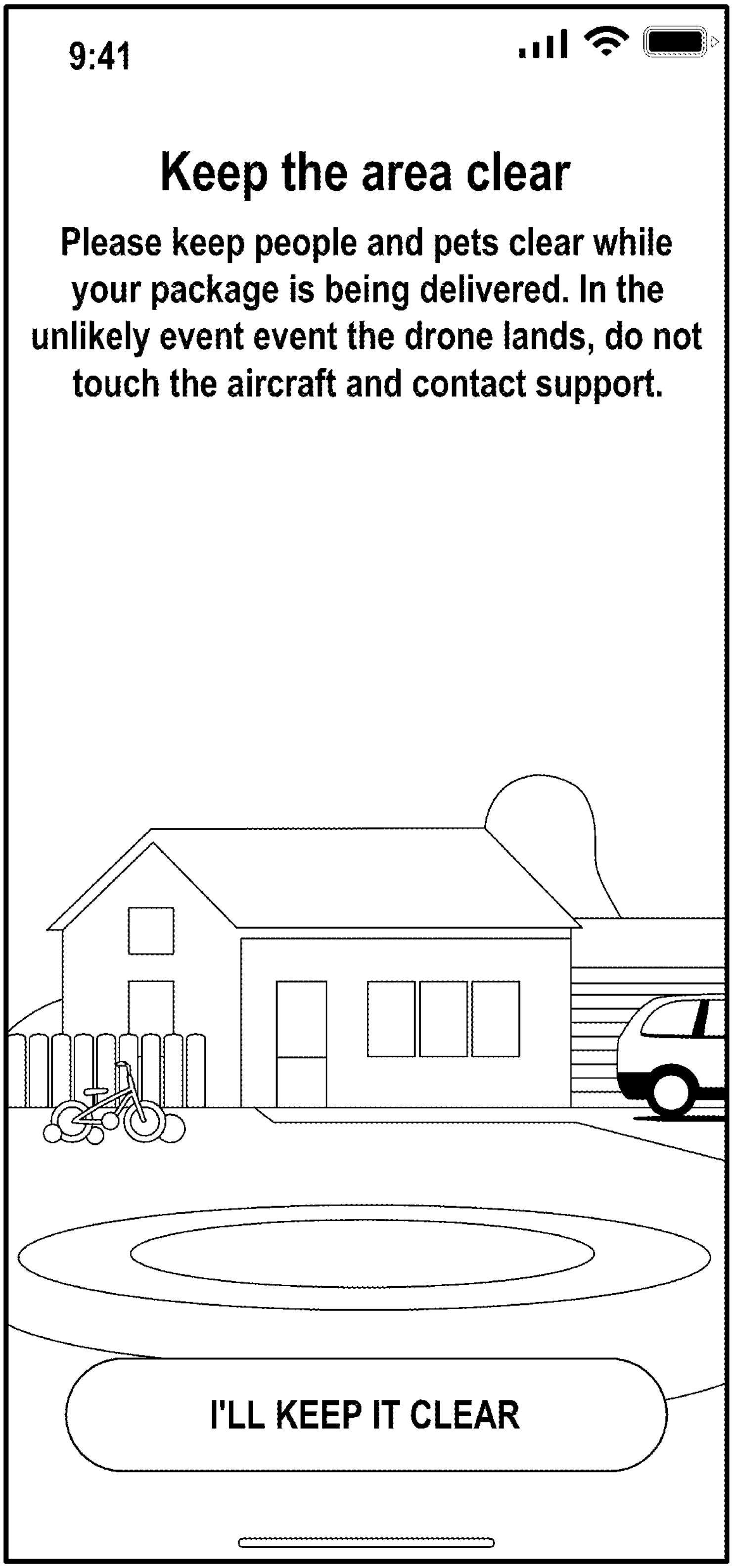

In method 700, a high level of integration between the operations of the retailer 120 and the UAV provider 122 is being used, and so the retailer 120 has adapted the retail interface to collect the onboarding information. FIG. 9A-FIG. 9E are screenshots that illustrate a non-limiting example embodiment of a retail interface adapted to collect onboarding information according to various aspects of the present disclosure. In FIG. 9A, the retail interface is being presented on the customer computing device 114, and is presenting the terms of service of the UAV provider 122 along with an interface element allowing the customer 118 to 10A agree to the terms of service. In FIG. 9B and FIG. 9C, the retail interface presents aerial imagery of the delivery location 104, and accepts a tap from the customer 118 on a desired delivery spot. In some embodiments, the retail interface may only accept taps in delivery spots that would be valid. In some embodiments, the retail interface may present one or more valid delivery spots, and the customer 118 may tap on the desired one of the valid delivery spots. In FIG. 9D and FIG. 9E, the retail interface presents educational materials (instructing the customer 118 to clear the delivery spot, and instructing the customer not to touch the UAV 110) and accepts confirmations that the educational materials have been reviewed and followed.

Returning to FIG. 7B, at optional block 724 the fleet ordering integration engine 412 transmits an onboarding request to the fleet management computing system 102. The onboarding request may include the onboarding information collected via the retail interface. At optional block 726, an onboarding engine 616 of the fleet management computing system 102 processes the onboarding information and returns an onboarding confirmation to the retailer ordering computing system 106. Processing of the onboarding information may include storing the onboarding information in a recipient data store 608 of the fleet management computing system 102. Processing of the onboarding information may include other processing, including but not limited to verifying the validity of the onboarding information.

Figure 8C:
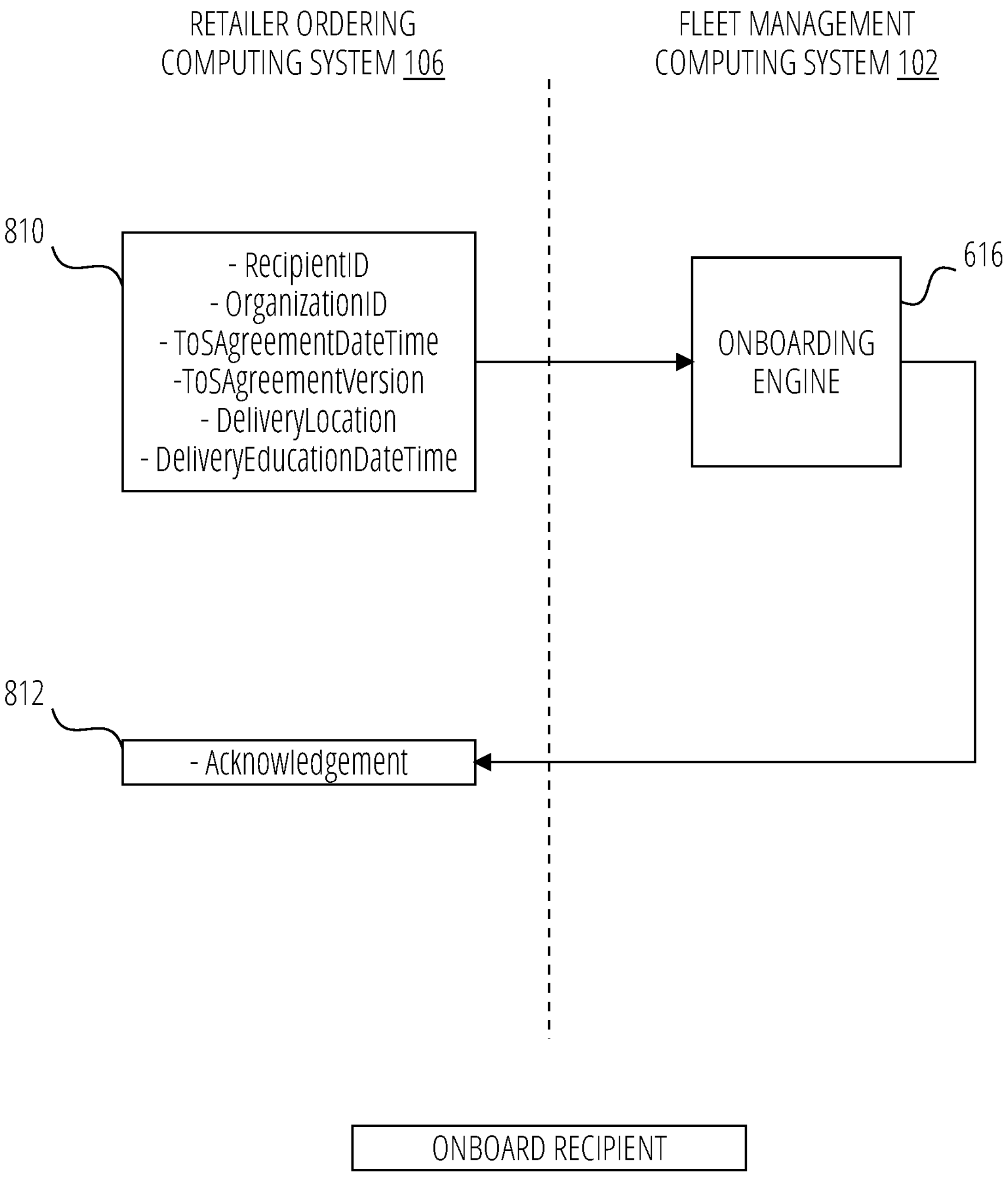

As the method 700 is using a higher level of integration with the UAV provider 122, the fleet ordering integration engine 412 transmits the onboarding request to an API endpoint exposed by the fleet management computing system 102, and receives the response from the API. FIG. 8C illustrates a non-limiting example of a call to an API endpoint exposed by the fleet management computing system 102 for an onboarding method, according to various aspects of the present disclosure.

In FIG. 8C, the API endpoint exposed by the onboarding engine 616 is illustrated as accepting input parameters 810 that include a recipient ID (an anonymized identifier assigned to the customer 118 by the retailer 120); an organization ID (an identifier of the retailer 120, such that the recipient ID+organization ID uniquely identifies the customer 118 to the fleet management computing system 102); a ToSAgreementDateTime that indicates at least the date and potentially also the time at which the customer 118 agreed to the terms of service; a ToSAgreement Version that indicates the version of the terms of service to which the customer 118 agreed (potentially including the text of the terms themselves); a DeliveryLocation that indicates the location of the selected dropoff spot using a latitude/longitude or any other suitable location identifier; and a DeliveryEducationDateTime that indicates at least the date and potentially also the time at which the customer 118 viewed and confirmed completion of the educational materials. Once the onboarding information is processed, the onboarding engine 616 returns output parameters 812 to the retailer ordering computing system 106 that may include an acknowledgement regarding successful receipt of the onboarding information. In some embodiments, the output parameters 812 may include copies of the onboarding information for use by the retailer ordering computing system 106.

The actions of optional block 722, optional block 724, and optional block 726 are described as optional because, in some embodiments, the retailer ordering computing system 106 and fleet management computing system 102 may have obtained the onboarding information in another way, such as by having saved the onboarding information for the customer 118 during processing of a previous order, or by the customer 118 providing the onboarding information to the fleet management computing system 102 as part of a separate process. In some embodiments, at least some of the actions of optional block 722, optional block 724, and optional block 726 are performed for every order, even if they have been performed previously by the customer 118. For example, the fleet management computing system 102 may desire the customer 118 to perform at least one of verifying the latest terms of service, reviewing the delivery education materials, and/or choosing a delivery spot for every order. As another example, the actions of optional block 722, optional block 724, and optional block 726 may be performed again even if they have been previously performed by the customer 118 if any of the onboarding information has changed (e.g., an updated terms of use agreement, updated delivery education materials, etc.).

Returning to FIG. 7B, the method 700 advances to block 728, where the fleet ordering integration engine 412 transmits an estimate request for the order to the fleet management computing system 102, and at block 730, an estimate engine 612 of the fleet management computing system 102 determines estimate information for the order and transmits the estimate information to the retailer ordering computing system 106. The estimate request causes the fleet management computing system 102 to plan one or more deliveries associated with the order, and the planned details are returned to the retailer ordering computing system 106.

To determine the planned details, the estimate engine 612 determines at least one potential UAV 110 for servicing the delivery. The estimate engine 612 may determine the at least one potential UAV 110 based on proximity of a nest (or other location of idle UAVs 110) to the retail fulfillment location 112, and selecting an idle UAV 110 from the nest. Once one or more potential UAVs 110 for servicing the delivery are identified, the estimate engine 612 determines an estimate of when the UAVs 110 would be available to perform the pickup and when the UAVs 110 would be expected to deliver each of the packages, which may be determined by planning a navigation route from the idle location of the UAVs 110 to the delivery location 104 via the retail fulfillment location 112. The estimate engine 612 may then compile all of the estimate information (e.g., the estimated times of pickup and delivery, a cost for the delivery based on factors such as the route distance, etc.) and provide it back to the retailer ordering computing system 106.

Figure 8D:
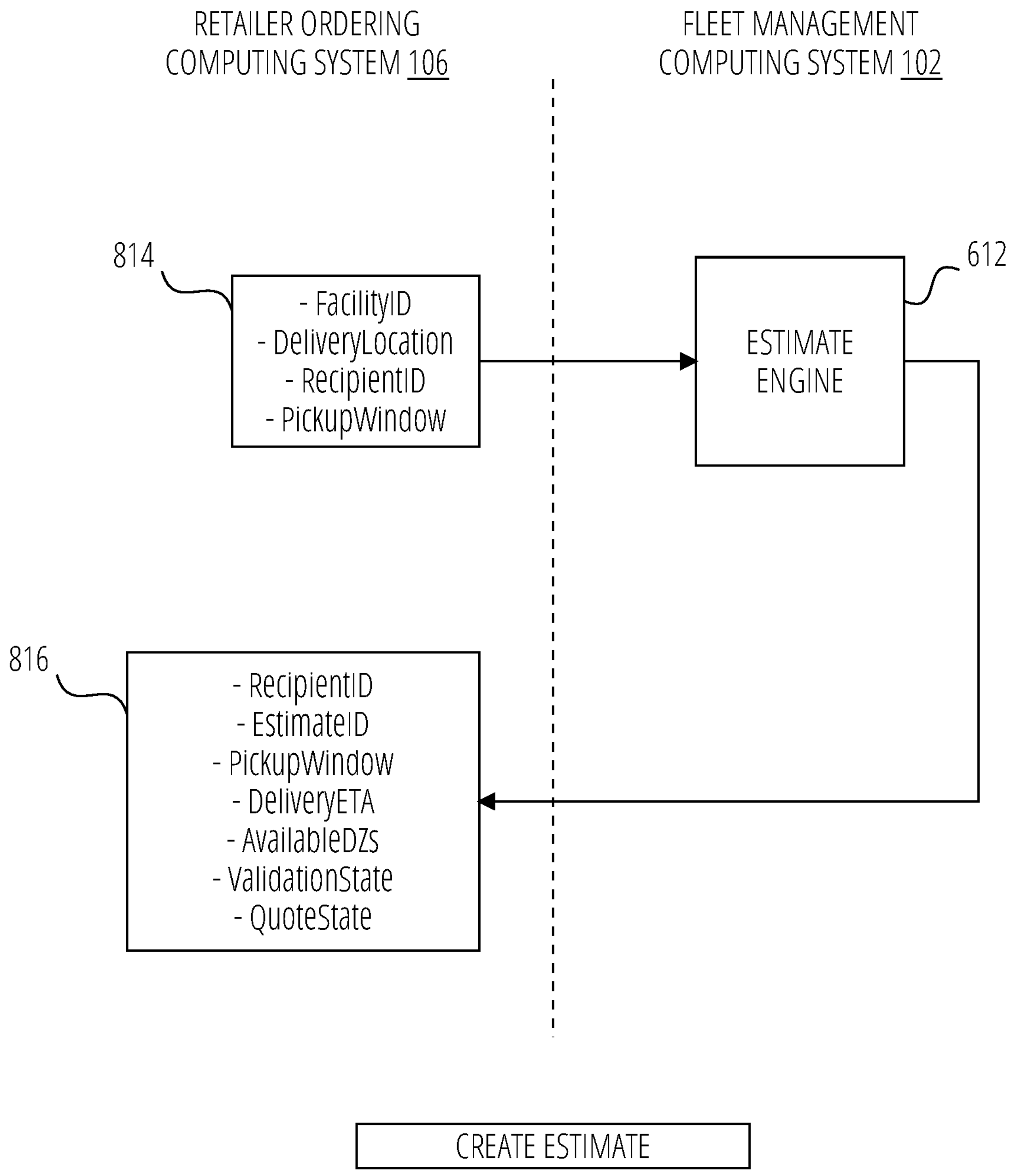

In the illustrated embodiment of the method 700, the retailer ordering computing system 106 transmits the estimate request and receives the response via an API endpoint of the fleet management computing system 102. FIG. 8D illustrates a non-limiting example of a call to an API endpoint exposed by the fleet management computing system 102 for an estimate request method, according to various aspects of the present disclosure.

In FIG. 8D, the API endpoint exposed by the estimate engine 612 is illustrated as accepting input parameters 814 that include one or more facility IDs, a DeliveryLocation, a recipient ID, and a PickupWindow. The facility ID identifies the retail fulfillment location 112, from which the estimate engine 612 may retrieve further stored information, such as a latitude/longitude, a number of pickup spots, etc. The DeliveryLocation value identifies the delivery location 104 to be used for the delivery. The recipient ID identifies the customer 118 in a way that is unique to the retailer 120. In some embodiments, the input parameters 814 may also include an organization ID to help identify the customer 118 in a globally unique way, while in other embodiments, the organization ID may be derived from the facility ID that identifies the retail fulfillment location 112. The PickupWindow specifies an earliest time and a latest time at which the package being estimated may be made available for pickup at the retail fulfillment location 112.

Once the estimate is determined, the estimate engine 612 provides a set of output parameters 816 that provide the estimate information back to the retailer ordering computing system 106. As illustrated, the output parameters 816 include the recipient ID to help the retailer ordering computing system 106 identify the order associated with the estimate, an estimate ID to help uniquely identify the estimate information, a PickupWindow that identifies an earliest time and a latest time at which the package may be made available for pickup for a successful delivery according to the estimate, a DeliveryETA with an estimated time that the delivery could be completed, one or more AvailableDZs that indicate available drop zones for the package at the delivery location 104, a ValidationState (e.g., an indication of whether the products assigned to the package have a size that can be carried by the UAV 110, whether the products do not contain hazardous materials that may not be carried by the UAV 110, etc.), and a QuoteState that indicates whether the estimate succeeded or failed (e.g., due to a lack of service availability that was not detected during the previous availability checks). In some embodiments, the estimate engine 612 may store the estimate information so that it may be referenced when a delivery request is received, such that the estimate information does not have to be recalculated.

Returning to FIG. 7B, after the retailer ordering computing system 106 receives the estimate information, the method 700 then advances to a continuation terminal ("terminal B"). From terminal B (FIG. 7C), the method 700 advances to decision block 732, where a determination is made regarding whether the estimate was found to be acceptable. In some embodiments, the determination may be based on whether one or more aspects of the estimate (e.g., an estimated delivery time, a cost, etc.) meet a threshold value. In some embodiments, the determination may be made by presenting at least some of the estimate information to the customer 118 via the retail interface and receiving either a confirmation or rejection of the estimate from the customer 118.

If the estimate was not found to be acceptable, then the result of decision block 732 is NO, and the method 700 proceeds to an end block and terminates. Otherwise, if the estimate was found to be acceptable, then the result of decision block 732 is YES, and the method 700 proceeds to block 734. At block 734, the retail interface generation engine 410 completes a checkout process for the order via the retail interface. The checkout process may include receiving a confirmation from the customer 118 that the customer 118 finds the order and delivery terms acceptable, receiving payment information from the customer 118, and/or other actions typically included in a checkout process.

At block 736, in response to the completion of the checkout process, the fleet ordering integration engine 412 transmits a delivery creation request for the order to the fleet management computing system 102, and at block 738, a delivery management engine 618 of the fleet management computing system 102 determines delivery information for the order. In some embodiments, the delivery creation request may include a reference to the estimate ID previously generated by the fleet management computing system 102 so that certain information, such as the planned navigation route, the pickup window, etc., does not have to be determined again by the delivery management engine 618.

In some embodiments, the delivery creation request may include detailed order information, such as information identifying the products to be delivered. As part of determining the delivery information, the delivery management engine 618 may determine how many packages will be used to carry the products of the order, and if more than one package is to be used, the delivery management engine 618 may assign specific products to each of the packages.

In some embodiments, the packages may be of a standardized package type designed to be picked up by the UAV 110. One non-limiting example of such a package is illustrated and described in commonly owned U.S. Pat. No.

10,308,360, granted Jun. 4, 2019, and entitled "Aerodynamic Tote Package," the entire disclosure of which is hereby incorporated by reference herein for all purposes. Such a package may have a predetermined interior volume, a predetermined weight limit, and/or other constraints to what may be loaded therein. The delivery management engine 618 may take the product information (e.g., the product volumes and weights obtained from the order information) and use a bin-packing heuristic (e.g., an online heuristic including but not limited to Next-k-Fit, First-Fit, Best-Fit, etc.; an offline heuristic including but not limited to First-fit-decreasing, Next-fit-decreasing, etc.; or any other suitable heuristic), a integer programming technique with an optimizer such as an MP Solver, a CP-SAT solver, or another solver, or any other suitable technique to determine an optimal packing of the products into one or more packages. In some embodiments, the delivery management engine 618 may optimize the packing based on one or more optimization goals, including but not limited to one or more of minimizing the total number of packages, minimizing the difficulty of arranging the products into the packages, or minimizing differences in weight or utilized volume between multiple packages.

In some embodiments, the product information may include detailed shape information about the shape of the product, and the delivery management engine 618 may use this detailed shape information to ensure that little space is wasted within each package. In some embodiments, the product information may include simple volume information (e.g., height, width and depth values) in order to simplify the solution to the bin packing problem. In some embodiments, the product information may specify a smallest of a predetermined number of simple shapes (e.g., a rectangular prism, a cylinder, a cone, etc.) that can contain the product and a size for the simple shape in order to provide a balance between ease of computation and quality of the bin packing solution.

In some embodiments, in addition to considering the dimensions and weight of the products in determining the number of packages to be used, the delivery management engine 618 may also consider other constraints. For example, the product information may specify that a particular product must be loaded in a specific orientation (e.g., a cup of coffee must be loaded upright and so may only be rotated around a vertical axis). As another example, the product information may specify that a particular product may not be loaded in a package with other types of items (e.g., items that should stay hot, like a cup of coffee, may not be loaded in a package with items that should stay cold, like a pint of ice cream). As yet another example, the product information may specify that a particular product may not have another product loaded on top of it within the package.

At block 740, the delivery management engine 618 stores the delivery information in a delivery data store 614 of the fleet management computing system 102 and transmits the delivery information to the retailer ordering computing system 106. The delivery information is stored in the delivery data store 614 for other components of the fleet management computing system 102 to access and manage completion of the delivery or deliveries associated with the order.

Figure 8E:
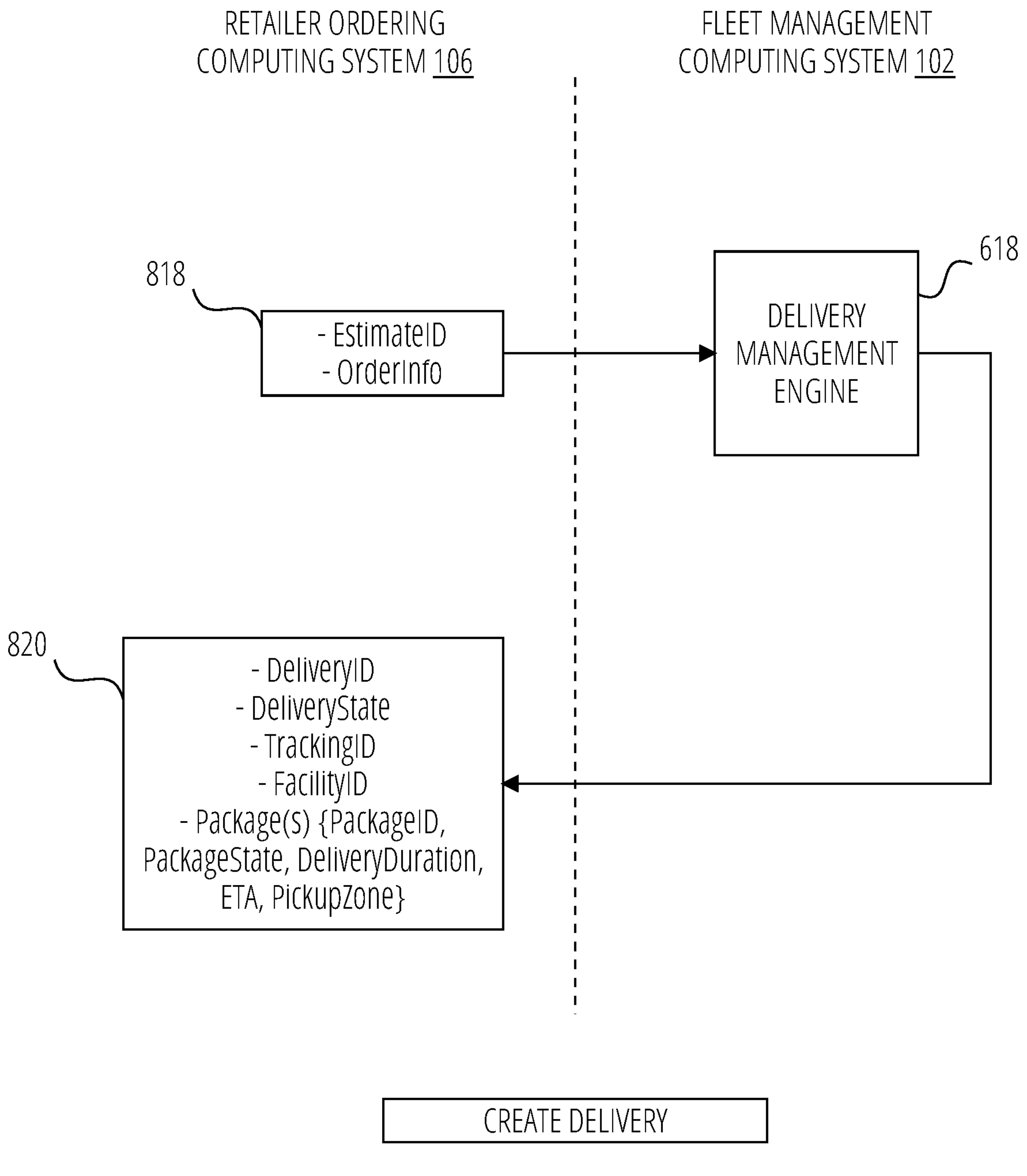

In some embodiments, the communication of the delivery creation request and the delivery information between the fleet ordering integration engine 412 and the fleet management computing system 102 is via an API endpoint exposed by the fleet management computing system 102. FIG. 8E illustrates a non-limiting example of a call to an API endpoint exposed by the fleet management computing system 102 for a delivery creation request method, according to various aspects of the present disclosure.

In FIG. 8E, the API endpoint exposed by the delivery management engine 618 is illustrated as accepting input parameters 818 that include an estimate ID that refers to the estimate information that was previously created at block 730 and stored by the fleet management computing system 102, and OrderInfo that includes at least information about the products to be included in the delivery. In some embodiments, the OrderInfo may have been provided to during the creation of the estimate (such that the estimate may have been based on a number of packages for servicing the delivery), and so the OrderInfo may not need to be included in the input parameters 818 if it is already stored as part of the estimate information. Once the delivery management engine 618 plans the delivery, the delivery management engine 618 provides a set of output parameters 820 that include a Delivery ID for the delivery, a DeliveryState value that indicates a state of the delivery (e.g., awaiting pickup preparation, UAV en route to pickup, UAV en route to dropoff, etc.), a TrackingID value to allow real-time tracking of the delivery, a FacilityID value associated with the retail fulfillment location 112 being used, and one or more package objects. Each package object represents a package to be included in the delivery, and may include information such as a package ID, a package state (e.g., in prep, ready for pickup, in transit, delivered, etc.), a delivery duration (e.g., an estimated amount of time from pick up to drop off of the package), an ETA (e.g., an earliest estimated point in time at which the delivery of the package may occur), and/or a pickup point at which the package is expected to be positioned for pickup. In some embodiments, each package object may also include product information or other information identifying the products to be loaded into the identified package.

Returning to FIG. 7C, at block 742, the retail interface generation engine 410 transmits the order and the delivery information to a retailer fulfillment computing system 108. The method 700 then passes through a continuation terminal ("terminal D") and proceeds to block 744, where a fulfillment interface generation engine 510 of the retailer fulfillment computing system 108 generates a fulfillment interface to guide preparation of a package of the delivery. In some embodiments, the fulfillment interface may present a list of products to be included in a package, and a worker at the retail fulfillment location 112 may pull the products from storage and place them in the package according to the instructions provided by the fulfillment interface. The fulfillment interface may be as complex as the retailer 120 desires, such as guiding the worker to specific storage locations for the products in an order determined to be efficient and allowing the worker to scan products once they are pulled to confirm that the proper product has been obtained, or as simple as the retailer 120 desires, such as simply presenting the list of products to be added to the package and relying on the worker to confirm that the correct products have been obtained. In some embodiments, the fulfillment interface may also guide the worker to position the package at the pickup point (e.g., on a particular autoloader) assigned to the package by the delivery information received from the fleet management computing system 102.

At block 746, the fulfillment interface generation engine 510 receives a notification that the package is ready for pickup via the fulfillment interface. The notification may be generated by the worker actuating a notification interface element once the package has been prepared and placed for pickup by a UAV. In some embodiments, instead of a pickup point being assigned to the package by the delivery information, the worker may specify a pickup point (e.g., a particular autoloader) on which the package was placed when generating the notification that the package is ready for pickup.

At block 748, a fleet fulfillment integration engine 512 of the retailer fulfillment computing system 108 transmits a send delivery request for the package to the fleet management computing system 102. The send delivery request indicates to the fleet management computing system 102 that the package has been placed at the pickup point and is ready for to be picked up by a UAV 110.

One will note that the description above of the fulfillment process describes the use of workers to manually pull products from storage and place them in packages prior to placing the package at the pickup point. This description should not be seen as limiting, and in some embodiments, some or all of these actions may be automated. For example, one or more robots may be used to automatically pull products from storage, place products in the package, place the package at the pickup point, and/or transmit the send delivery request without departing from the scope of the present disclosure. In such embodiments, the fulfillment interface may not be generated, but instead the tasks through which the fulfillment interface guides the worker may instead be performed automatically by the one or more robots or other automation devices.

The method 700 then advances to a continuation terminal ("terminal C"). From terminal C (FIG. 7D), the method 700 proceeds to block 750, where the delivery management engine 618 receives the send delivery request and determines a UAV 110 to deliver the package. In some embodiments, the delivery management engine 618 may choose a UAV 110 that is not currently assigned to a delivery, and that has a condition (e.g., a battery state-of-charge, an available range before a subsequent maintenance operation, etc.) that is suitable for completing the delivery. If the fleet management computing system 102 is responsible for managing UAVs 110 in multiple nests, the delivery management engine 618 may choose a UAV 110 from a nest that is closest to the retail fulfillment location 112. In some embodiments, the delivery management engine 618 may choose a UAV 110 that is currently delivering a package or is otherwise executing a mission, if such a UAV 110 is particularly appropriate for delivering the package (e.g., an end point of its current navigation route is close to the retail fulfillment location 112, and a battery state-of-charge and/or other aspects of the condition of the UAV 110 are adequate to complete the delivery after completing its current navigation route). In some embodiments, the delivery management engine 618 may select a UAV 110 that is currently executing a low-priority mission without a payload, such as an aerial imagery capture mission or a hover-and-wait mission, to interrupt its current mission to be reassigned to the delivery.

At block 752, a UAV management engine 620 of the fleet management computing system 102 determines a navigation route for the UAV 110 to traverse and transmits the navigation route to the UAV 110. The navigation route passes from a current location of the UAV 110 to the retail fulfillment location 112, and then from the retail fulfillment location 112 to the delivery location 104. In some embodiments, the navigation route may include a detailed path for the UAV 110 to follow to a pickup point at the retail fulfillment location 112, and/or a detailed path for the UAV 110 to follow to the dropoff point at the delivery location 104. In some embodiments, the navigation route may guide the UAV 110 to the rough location of the pickup point and/or the dropoff point, and the UAV 110 may autonomously navigate to the exact pickup point and/or dropoff point using computer vision techniques. Determining the navigation route may include determining a route that avoids one or more other previously determined navigation routes to avoid conflicts between UAVs 110, that avoids one or more areas of restricted airspace, or otherwise finds an acceptable route that is not necessarily the most direct route between the original location of the UAV 110, the retail fulfillment location 112, and the delivery location 104. In some embodiments, the navigation route may include a time of departure and one or more time waypoints at which the UAV 110 is intended to be present during traversal of the navigation route, in order to further aid deconfliction of multiple UAVs 110 concurrently performing delivery missions.

Figure 8F:
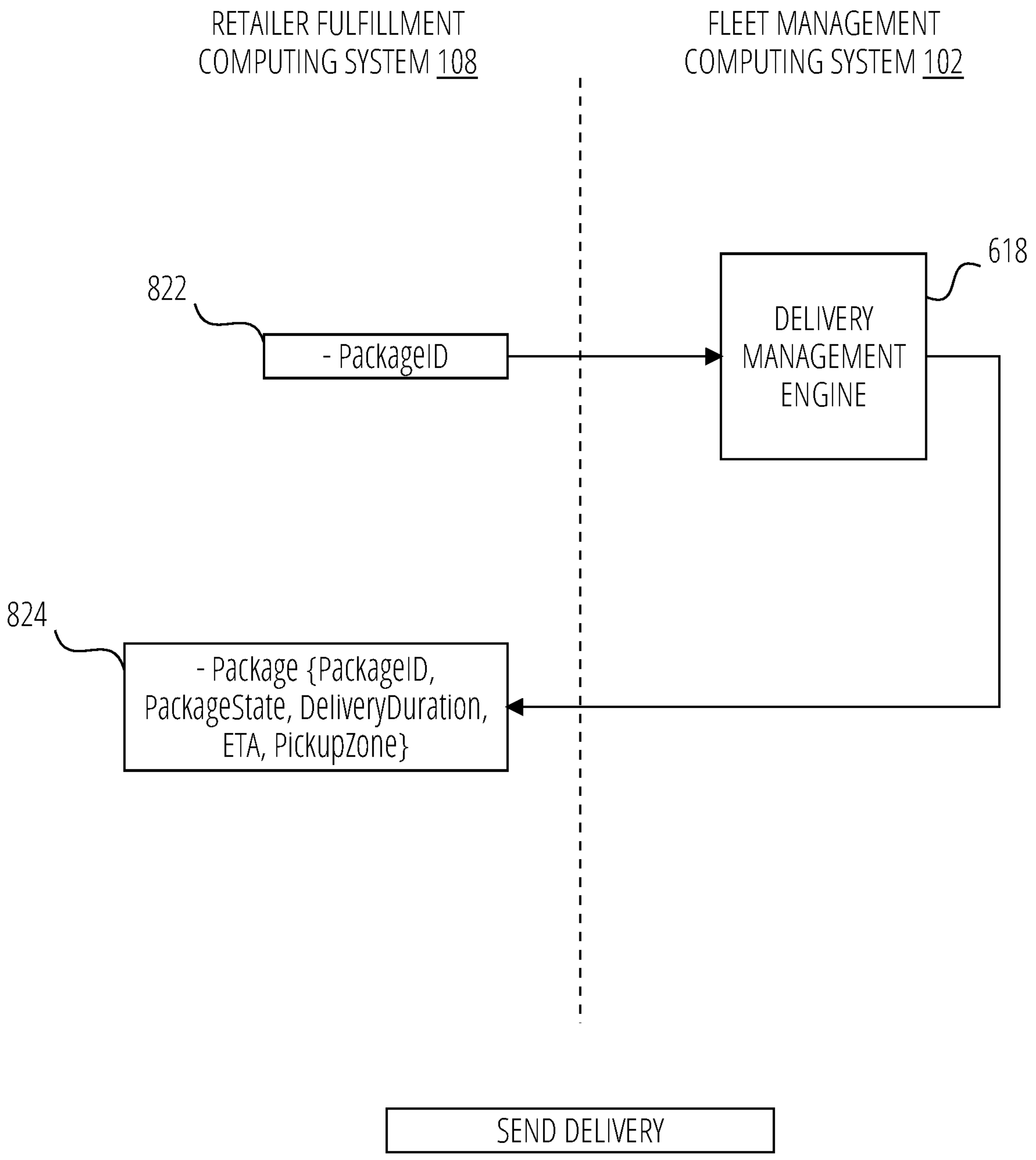

In some embodiments, the communication of the send delivery request between the fleet fulfillment integration engine 512 and the fleet management computing system 102 is via an API endpoint exposed by the fleet management computing system 102. FIG. 8F illustrates a non-limiting example of a call to an API endpoint exposed by the fleet management computing system 102 for a send delivery request method, according to various aspects of the present disclosure.

In FIG. 8F, the API endpoint exposed by the delivery management engine 618 is illustrated as accepting input input parameters 822 that include a package ID that identifies the package to be picked up. The package ID matches the package ID that had been transmitted by the fleet management computing system 102 in response to the delivery creation request. In some embodiments, after receiving the delivery creation request at block 750 via receiving the input parameters 822, the delivery management engine 618 may immediately respond with output parameters 824 that include a package object as described above with respect to the delivery creation request, before proceeding to assign a UAV 110 at block 750 and/or determine a navigation route at block 752. In such embodiments, the retailer fulfillment computing system 108 may query the fleet management computing system 102 to determine up-to-date status of when the UAV 110 is assigned. In some embodiments, after receiving the input parameters 802, the delivery management engine 618 may perform the other actions of block 750 and block 752 to assign a UAV 110 and plan a navigation route prior to replying with the output parameters 824.

Returning to FIG. 7D, at block 754, the UAV 110 traverses the navigation route to the retail fulfillment location 112 and picks up the package. In some embodiments, the UAV 110 may descend towards or land at the retail fulfillment location 112 so that the package may be affixed to the UAV 110 by personnel at the retail fulfillment location 112. In some embodiments, the package may be placed on a device that allows the UAV 110 to automatically pickup up the package without landing. For example, an autoloader device may hold the package, and the UAV 110 may use computer vision techniques to orient itself to the autoloader. The UAV 110 may extend a tether to capture the package, and may retract the tether to bring the package close to the UAV 110 before further traversing the navigation route. In some embodiments, the navigation route may include an identifier of an autoloader or other pickup point amongst a plurality of autoloaders or other pickup points at the retail fulfillment location 112. The UAV 110 may use computer vision techniques to identify the correct autoloader or other pickup point from which to retrieve the package.

At block 756, the UAV 110 further traverses the navigation route to the delivery location 104 and delivers the package. In some embodiments, once arriving near the delivery location 104, the UAV 110 may use computer vision techniques to identify the dropoff spot specified by the onboarding information, and may position itself so that the package will be delivered at the dropoff spot. In some embodiments, the UAV 110 may land at the dropoff spot so that the package may be removed from the UAV 110. In some embodiments, the UAV 110 may hover near the dropoff spot and extend a tether that is coupled to the package until the package is automatically released on the dropoff spot without the UAV 110 landing. Once the UAV 110 delivers the package, the UAV 110 may autonomously return to its nest, or may receive another navigation route to be traversed from the UAV management engine 620 to deliver another package. In some embodiments, the navigation route originally provided to the UAV 110 may include a portion of the route to be traversed after the package is delivered (e.g., a return trip to a nest).

The method 700 then proceeds to decision block 758, where a determination is made regarding whether all of the packages for the order have been delivered, or whether further packages remain. If further packages remain to be delivered, then the result of decision block 758 is NO, and the method 700 returns to block 744 via terminal D to process the next package. Otherwise, if all of the packages have been delivered, then the result of decision block 758 is YES, and the method 700 proceeds to an end block and terminates.

Though the method 700 is illustrated as serially processing the packages, in some embodiments, the method 700 may process more than one package at a time. In other words, the fulfillment interface may guide preparation of multiple packages for an order at once, and multiple packages may be made ready for pickup at once before any UAVs 110 have been assigned. Such embodiments operate similarly to the illustrated embodiment, though the UAV management engine 620 may make allowances to avoid UAVs 110 arriving at or near either the retail fulfillment location 112 or the delivery location 104 at the same time to avoid conflicts between UAVs 110.

Further, although the method 700 is illustrated with some optional steps, in some embodiments, other steps of the method 700 may also be optional even though they have not been illustrated as optional in FIG. 7A-FIG. 7D. For example, the actions involving retrieval of an estimate and obtaining confirmation that the estimate is acceptable as described in block 728-decision block 732 may be performed to enrich the user experience. In some embodiments, these actions may not be performed, and the method 700 may proceed directly from optional block 726 to block 734.

In some embodiments, after the delivery creation request has been received by the fleet management computing system 102 and the fleet management computing system 102 responds with a Tracking ID, the Tracking ID may be used to follow progress of the delivery. Since UAVs 110 may communicate telemetry information to the fleet management computing system 102, and since the fleet management computing system 102 tracks which UAVs 110 are assigned to which packages, highly specific information may be provided in real time in order to allow customers 118 to track the progress of their deliveries.

Figure 8G:
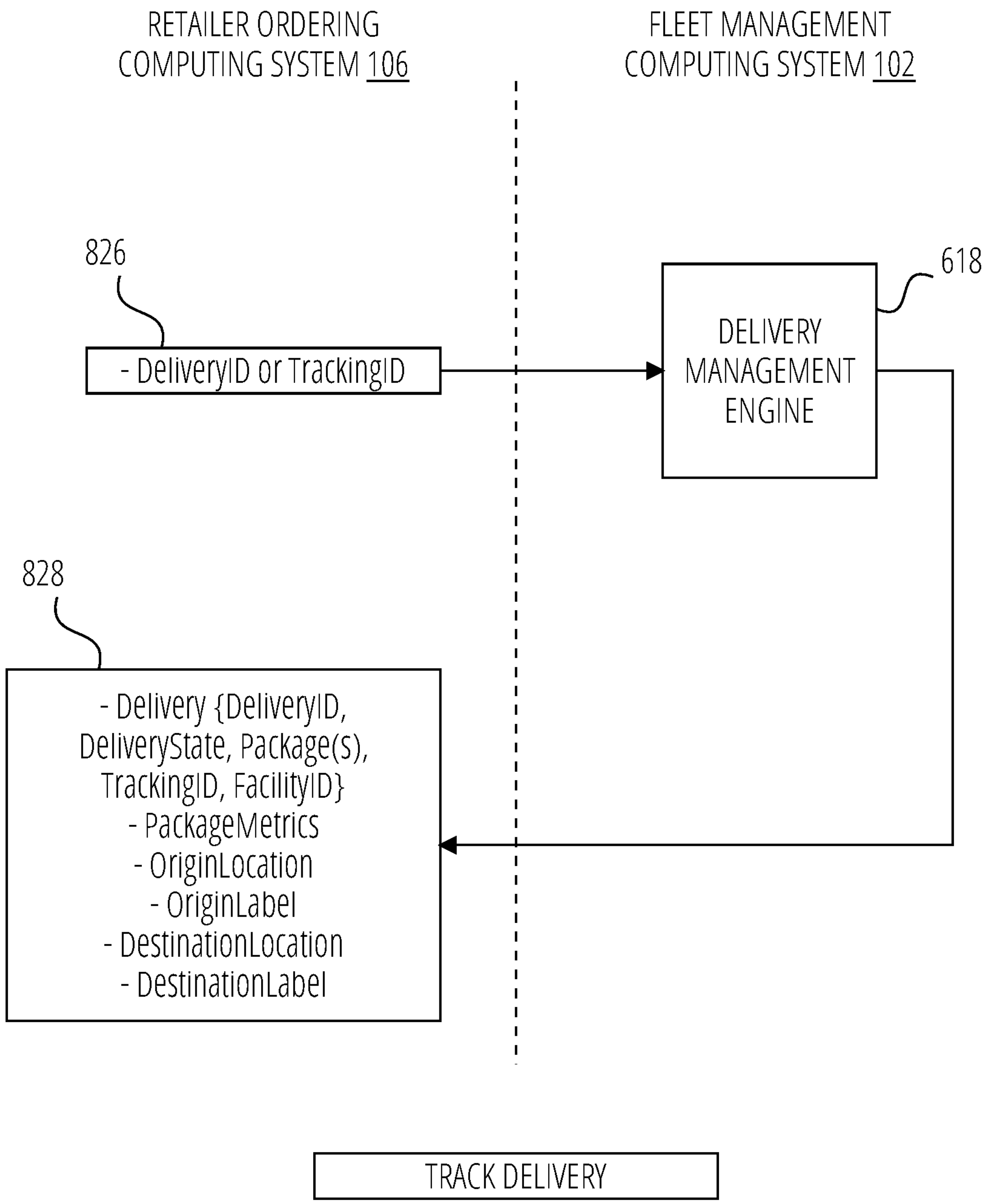

FIG. 8G illustrates a non-limiting example of a call to an API endpoint exposed by the fleet management computing system 102 for a delivery tracking method, according to various aspects of the present disclosure. In FIG. 8G, the API endpoint exposed by the delivery management engine 618 is illustrated as accepting input parameters 826 that include a DeliveryID or a TrackingID. The TrackingID is intended to match the TrackingID provided by the fleet management computing system 102 in response to the delivery creation request. In some embodiments, if a DeliveryID is provided instead, the DeliveryID may be translated into the corresponding TrackingID once it is received.

Upon receiving the input parameters 826, the delivery management engine 618 determines status information for one or more packages of the delivery, which may include obtaining telemetry information received by the UAV management engine 620. The delivery management engine 618 then transmits a response to the retailer ordering computing system 106 having output parameters 828 that include one or more of a Delivery object and a PackageMetrics object. The Delivery object may include the DeliveryID, a DeliveryState value (e.g., In Prep, Waiting for UAV, In Transit to Pickup, In Transit to Delivery, Delivered, etc.), a Package object as discussed above for each package, the tracking ID, and the facility ID. The PackageMetrics object may include estimated and actual times at which the package was ready for pickup, when the package was picked up, and when the package was delivered. The PackageMetrics object may also include real-time telemetry (e.g., heading, speed, location, etc.) for the UAVs 110 assigned to the delivery. The output parameters 804 may also include other information that may assist in creating tracking interfaces, including but not limited to a label and a latitude/longitude for the origin of the UAV 110, and/or a label and a latitude/longitude for the delivery location 104.

Figure 10A:
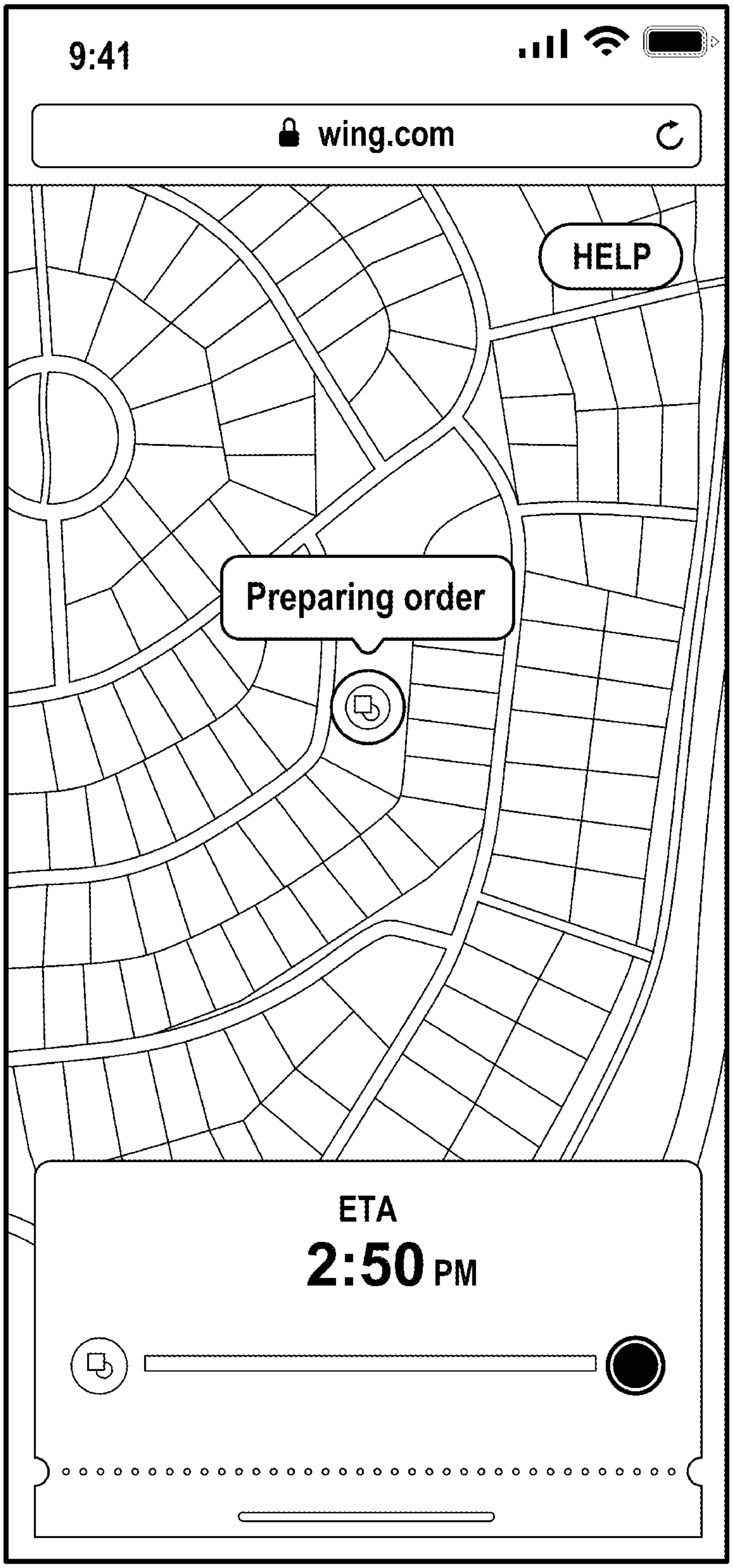
FIG. 10A-FIG. 10F illustrate a non-limiting example embodiment of a tracking interface that may be generated based on the tracking information provided by the fleet management computing system, according to various aspects of the present disclosure.
Figure 10B:

FIG. 10A-FIG. 10F illustrate a non-limiting example embodiment of a tracking interface that may be generated based on the tracking information provided by the fleet management computing system 102, according to various aspects of the present disclosure. FIG. 10A illustrates a map view that presents the OrderStatus value and the estimated ETA when the package is still being prepared and the send delivery request has not yet been sent. FIG. 10B illustrates a view with more detailed OrderStatus information. In FIG. 10B, the send delivery request has been received by the fleet management computing system 102 because a UAV 110 has been assigned to the delivery, but an estimated ETA is still being presented. In this situation, telemetry information may not have yet been received from the UAV 110.

Figure 10C:
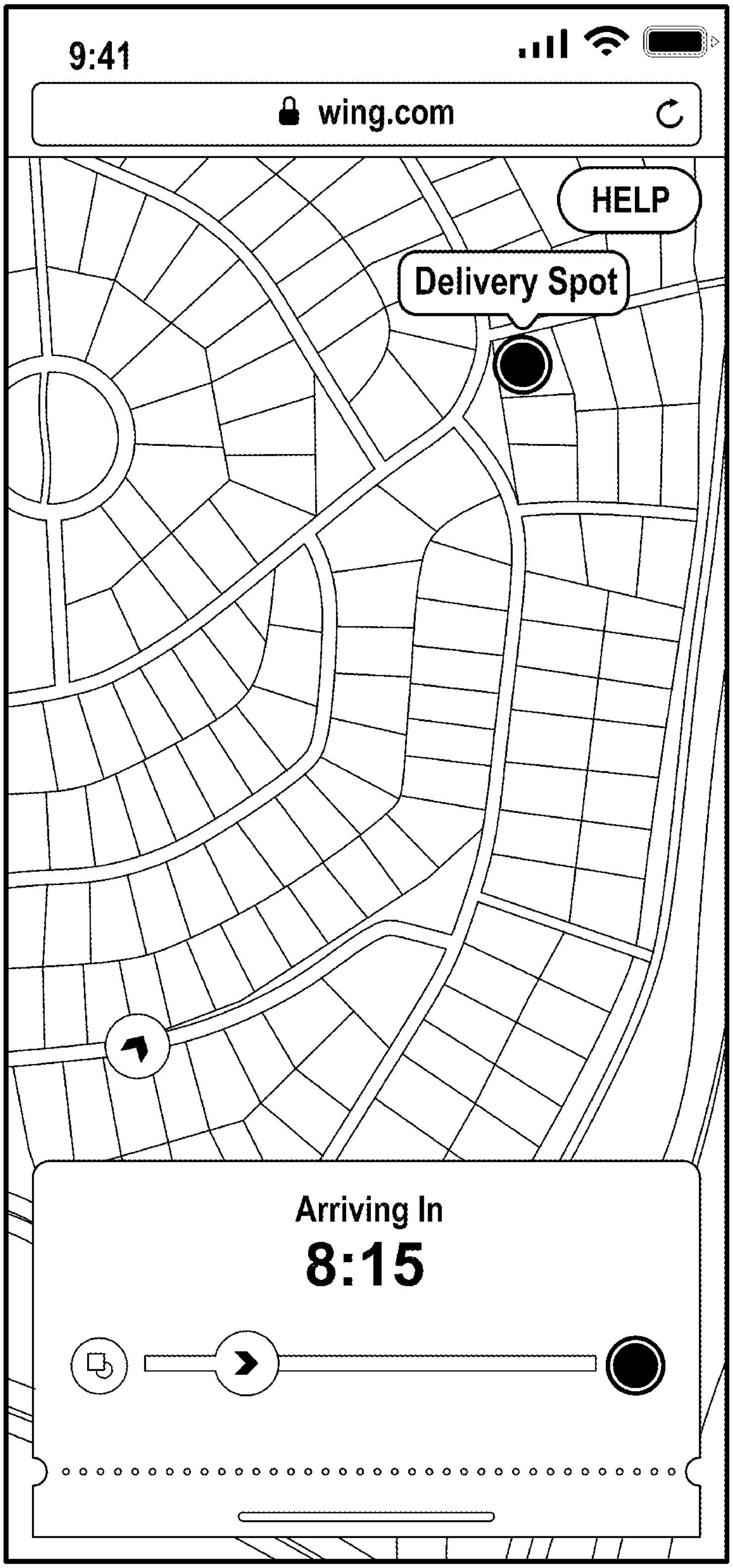
Figure 10D:
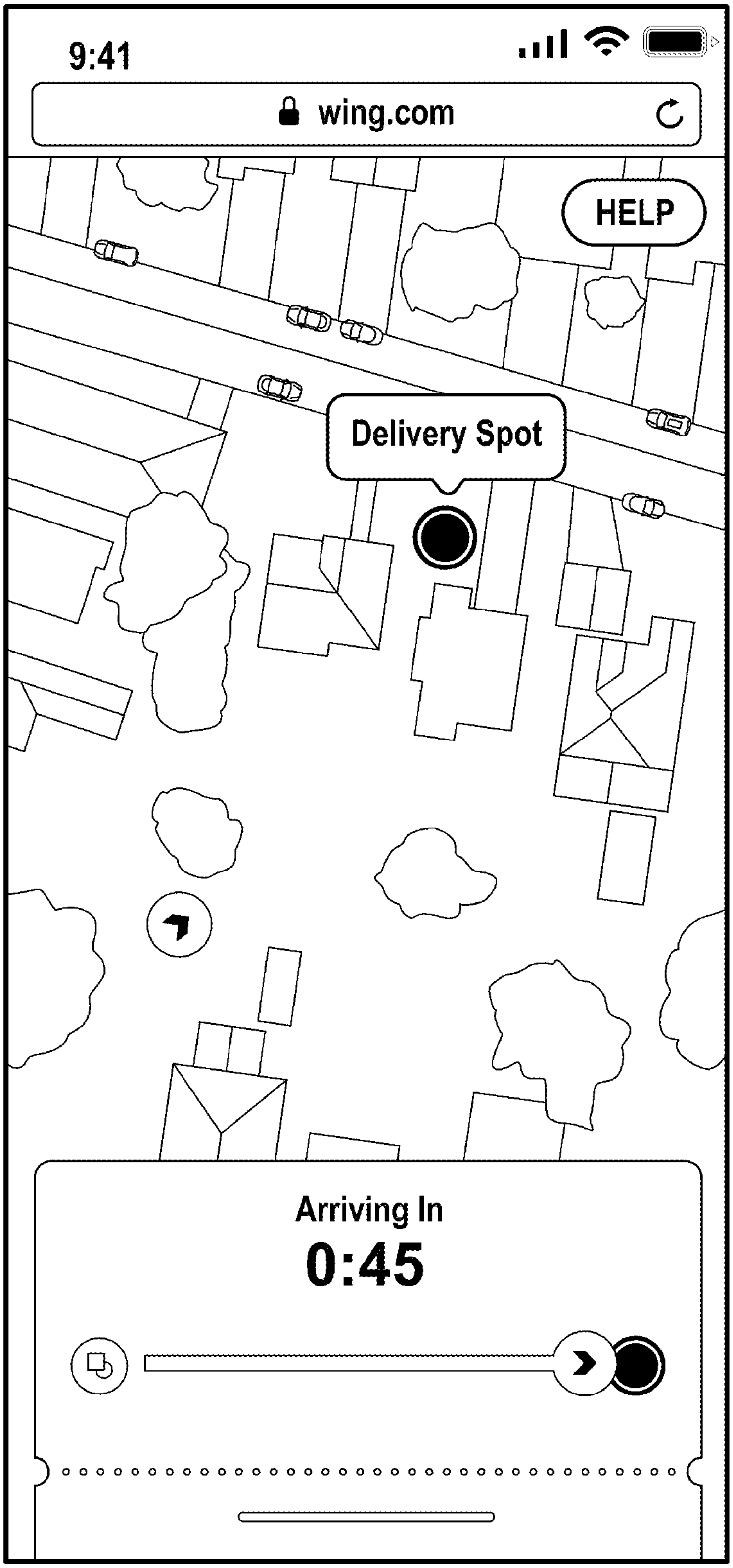
Figure 10E:
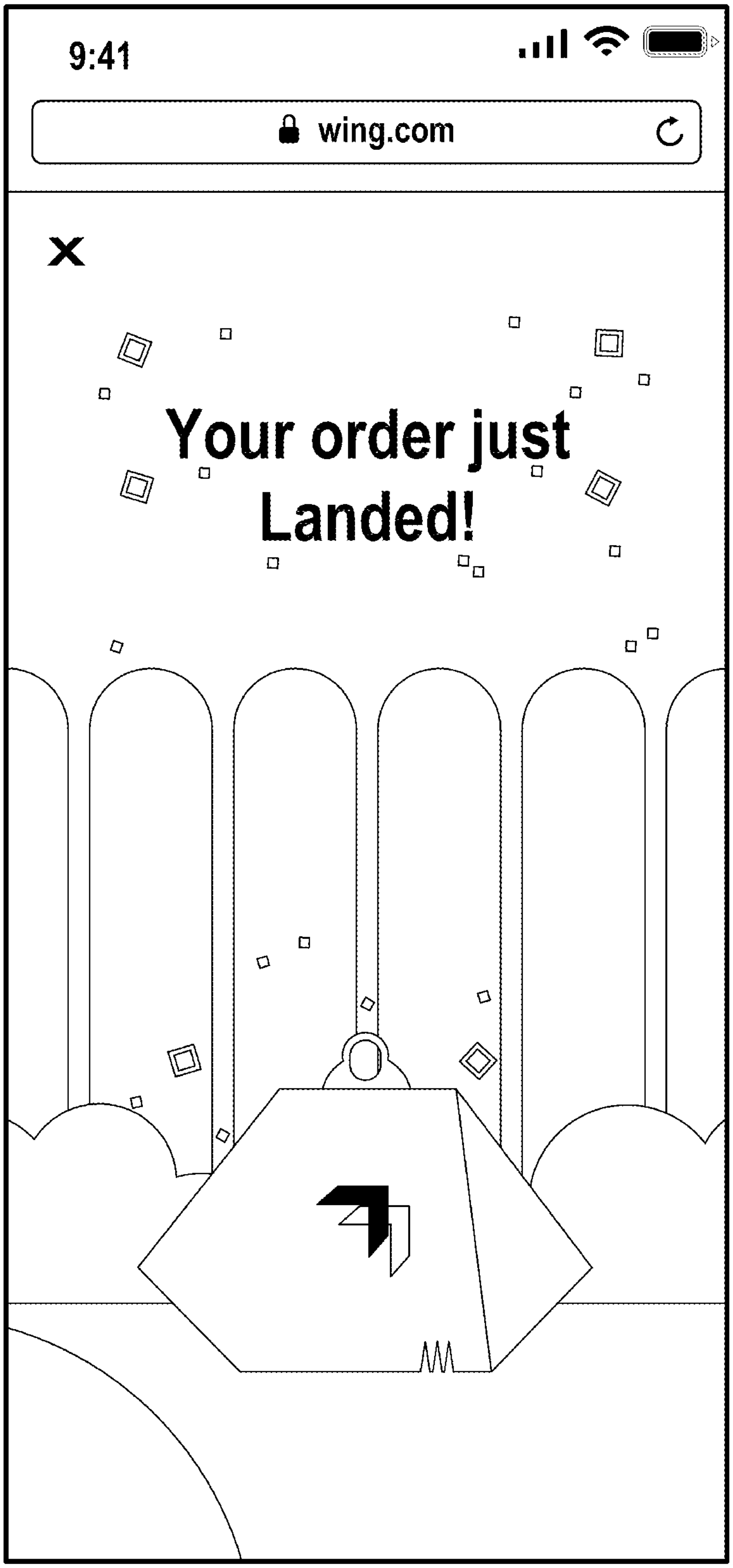
Figure 10F:
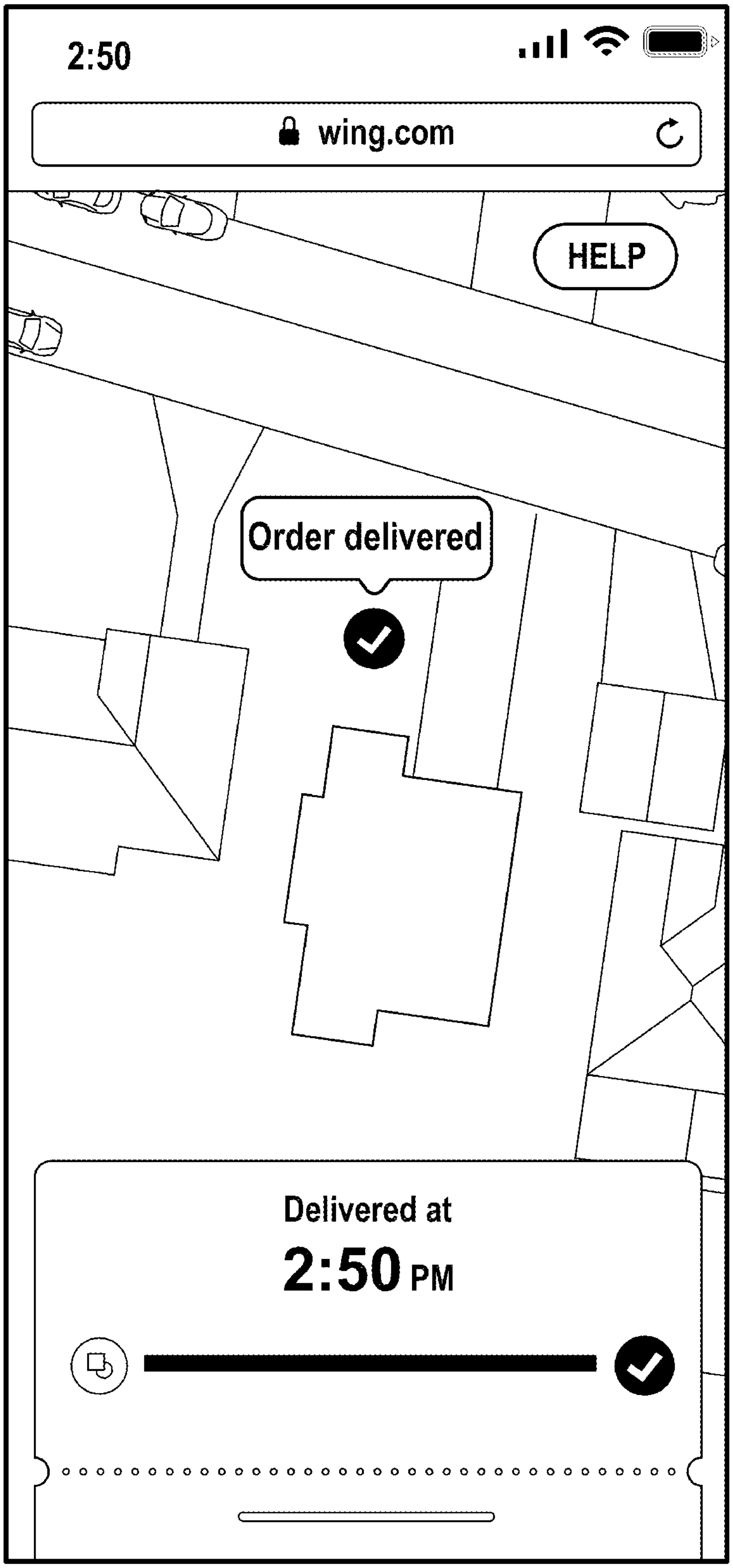

FIG. 10C illustrates a tracking view wherein the UAV 110 is traversing the navigation route. Because live telemetry information is received from the UAV 110, the tracking view allows a precise location of the UAV 110 to be presented on the map. Also, the live telemetry information allows a very detailed countdown timer to be presented (as shown, presenting the predicted minutes and seconds remaining before the UAV 110 arrives). FIG. 10D illustrates a similar view that has zoomed in to show aerial imagery of the delivery location 104, with the position of the dropoff spot to which the UAV 110 will deliver the package being indicated. FIG. 10E illustrates a screen that a live tracking view may present in response to receiving a notification that the delivery is complete, and FIG. 10F illustrates a tracking view that presents the OrderStatus value ("Delivered") along with related information such as when and precisely where the delivery was completed.

The high-level of integration between the systems of the retailer 120 and the UAV provider 122 allows for more seamless user experiences on the part of both the customer 118 and the workers at the retail fulfillment location 112, in that the retailer 120 can build the integrated functionality into its existing workflows and the existing look-and-feel of its retail interface and fulfillment interface by invoking functionality exposed by the UAV provider 122 using its exposed APIs. While these benefits are provided by the API, there can be significant technical hurdles in adapting an existing retail interface and fulfillment interface to fully integrate the functionality of the UAV provider 122 as described in the method 700 illustrated above. In some embodiments, the UAV provider 122 allows a retailer 120 to operate with a lesser amount of integration by reusing interfaces provided by the UAV provider 122 instead of integrating functionality directly into its own interfaces.

Figure 11A:
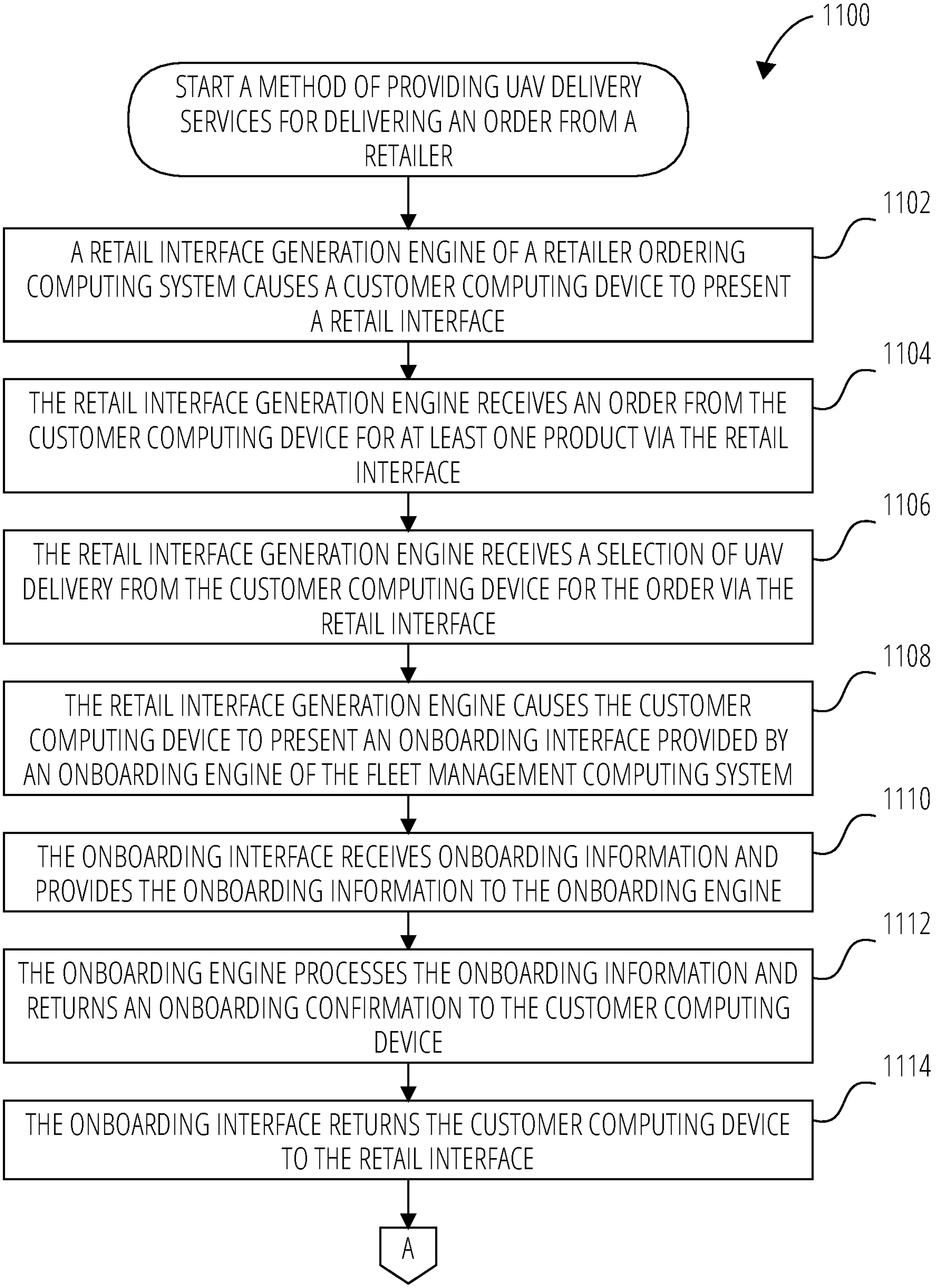
FIG. 11A-FIG. 11C are a flowchart that illustrates a non-limiting example embodiment of another method of providing UAV delivery services for delivering an order from a retailer according to various aspects of the present disclosure.
Figure 11B:
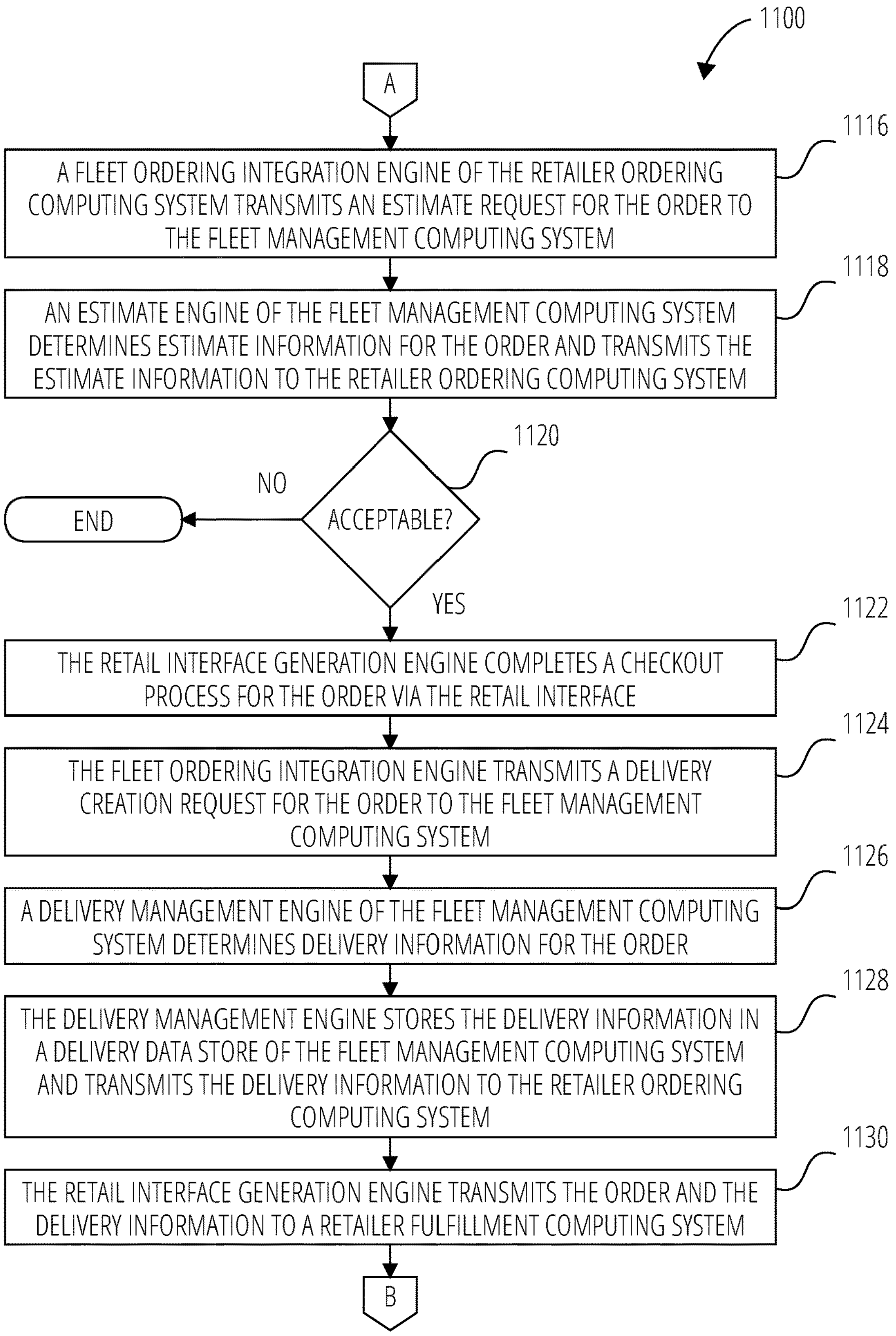
Figure 11C:
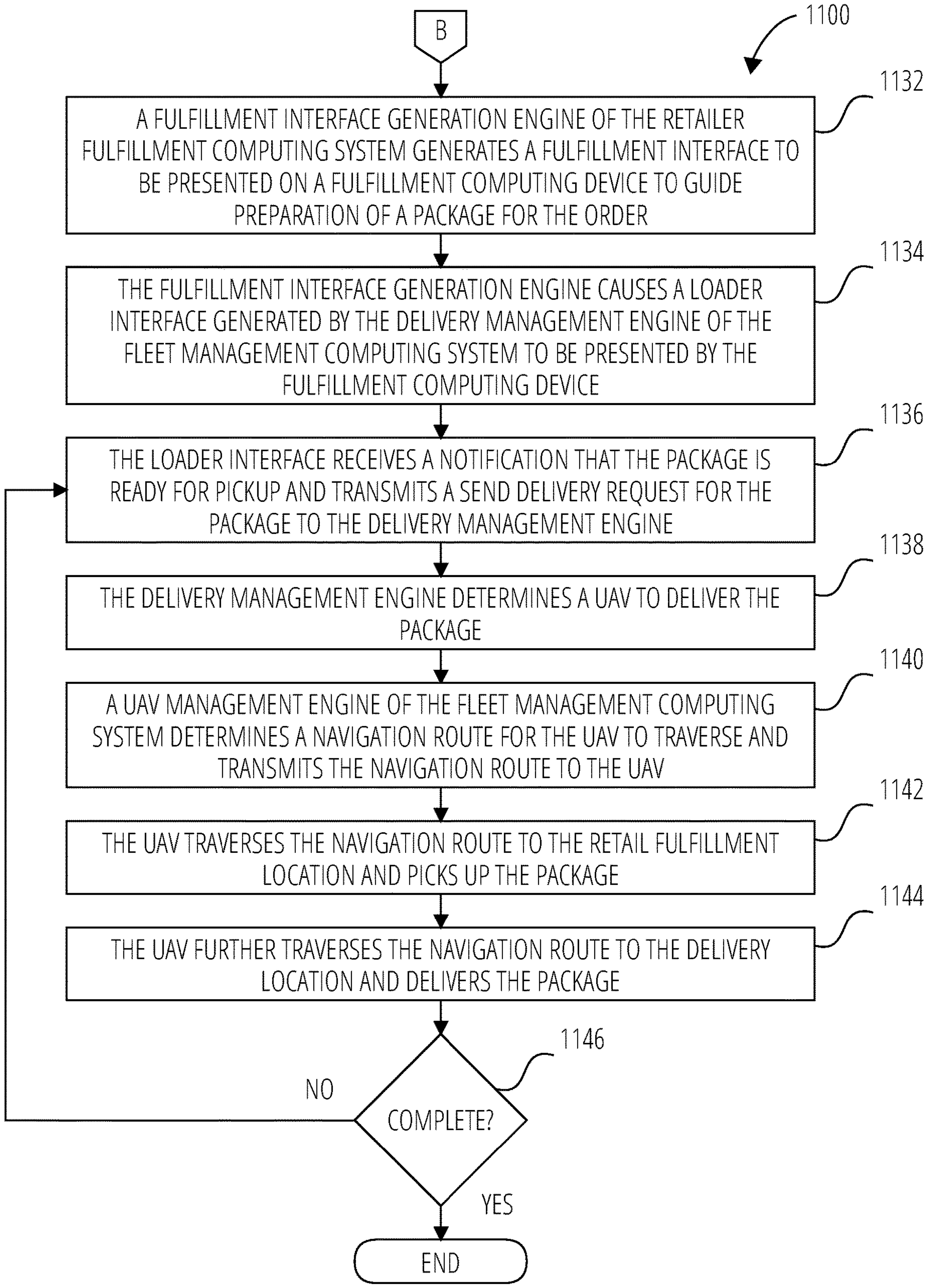

FIG. 11A-FIG. 11C are a flowchart that illustrates a non-limiting example embodiment of another method of providing UAV delivery services for delivering an order from a retailer according to various aspects of the present disclosure. Many actions within the method 1100 are similar to actions described above with respect to the method 700, but the level of integration between the retail interface and the fulfillment interface of the retailer 120 is lesser than that of method 700, and instead user interfaces provided by the UAV provider 122 are used directly to access some functionality. Since many portions of the method 1100 are similar to corresponding portions of method 700, detailed descriptions of those portions are not provided again in this portion of the disclosure for the sake of brevity.

From a start block, the method 1100 proceeds to block 1102, where a retail interface generation engine 410 of a retailer ordering computing system 106 causes a customer computing device 114 to present a retail interface. At block 1104, the retail interface generation engine 410 receives an order from the customer computing device 114 for at least one product via the retail interface, and at block 1106, the retail interface generation engine 410 receives a selection of UAV delivery from the customer computing device 114 for the order via the retail interface.

To this point, the method 1100 is highly similar to the method 700. However, as the method 1100 is now about to access functionality of the UAV provider 122, the next portion of the method 1100 is different from the method 700, because the functionality of the UAV provider 122 is to be accessed without a full integration.

Accordingly, at block 1108 the retail interface generation engine 410 causes the customer computing device 114 to present an onboarding interface provided by an onboarding engine 616 of the fleet management computing system 102. Any suitable development technique may be used by the retail interface generation engine 410 to cause the customer computing device 114 to present the onboarding interface of the fleet management computing system 102. In some embodiments, the retail interface and the onboarding interface provided by the fleet management computing system 102 may be embodied in separate mobile apps, and the the retail interface may launch the onboarding interface using a universal link or custom URL scheme that points to the onboarding interface (if using iOS), using an Intent registered by the onboarding interface (if using Android), or using any other suitable technique. In some embodiments, the retail interface and the onboarding interface may be web interfaces, and the retail interface may cause a popup to be presented that shows the onboarding interface, may redirect the browser to the onboarding interface, or may cause the onboarding interface to be presented using any other suitable technique.

At block 1110, the onboarding interface receives onboarding information and provides the onboarding information to the onboarding engine 616. At block 1112, the onboarding engine 616 processes the onboarding information and returns an onboarding confirmation to the customer computing device 114. Other than being performed using the onboarding interface generated by the UAV provider 122 instead of the retail interface generated by the retailer 120, block 1110 and block 1112 are similar to optional block 722 and optional block 726 of method 700.

The transmission of an onboarding request as described in optional block 724 is omitted from the description of the method 1100, but one will recognize that a similar exchange of information is performed between the onboarding interface and the onboarding engine 616. One will also note that the availability request and detailed availability request are not described in method 1100 as they are in method 700. In some embodiments, the fleet management computing system 102 may perform similar availability checks for the delivery location upon receiving the onboarding information and may cause the onboarding process to fail if UAV delivery is unavailable to the delivery location.

At block 1114, the onboarding interface returns the customer computing device 114 to the retail interface. As with causing the onboarding interface to be presented, any suitable development technique may be used to return the customer computing device 114 to the retail interface, including using a universal link, custom URL scheme, or Intent for the retail interface, causing the popup for the onboarding interface to be closed, redirecting a browser back to the retail interface, or using any other suitable technique.

The method 1100 then proceeds to a continuation terminal ("terminal A"). From terminal A (FIG. 11B), the method 1100 proceeds to block 1116. Though the level of integration between the retailer 120 and the UAV provider 122 is lesser in method 1100 than in method 700, the delivery creation aspects of the method 1100 still use integration between the retailer 120 and the UAV provider 122. Hence, from block 1116 to block 1130, the method 1100 is highly similar to method 700 from block 728 to block 742.

At block 1116, a fleet ordering integration engine 412 of the retailer ordering computing system 106 transmits an estimate request for the order to the fleet management computing system 102. At block 1118, an estimate engine 612 of the fleet management computing system 102 determines estimate information for the order and transmits the estimate information to the retailer ordering computing system 106.

The method 1100 then proceeds to decision block 1120, where a determination is made regarding whether the estimate is acceptable. If the estimate is not acceptable, then the result of decision block 1120 is NO, and the method 1100 proceeds to an end block and terminates. As above, this end block may indicate that a legacy delivery technique is used for the order instead of UAV delivery. Otherwise, if the estimate is acceptable, then the result of decision block 1120 is YES, and the method 1100 proceeds to block 1122.

At block 1122, the retail interface generation engine 410 completes a checkout process for the order via the retail interface. At block 1124, the fleet ordering integration engine 412 transmits a delivery creation request for the order to the fleet management computing system 102. At block 1126, a delivery management engine 618 of the fleet management computing system 102 determines delivery information for the order. At block 1128, the delivery management engine 618 stores the delivery information in a delivery data store 614 of the fleet management computing system 102 and transmits the delivery information to the retailer ordering computing system 106. At block 1130, the retail interface generation engine 410 transmits the order and the delivery information to a retailer fulfillment computing system 108.

Since the actions from block 1116 to block 1130 are highly similar to corresponding blocks in method 700, their description is not repeated again here for the sake of brevity.

The method 1100 then proceeds to a continuation terminal ("terminal B"). From terminal B (FIG. 11C), the method 1100 advances to block 1132, where a fulfillment interface generation engine 510 of the retailer fulfillment computing system 108 generates a fulfillment interface to be presented on a fulfillment computing device to guide preparation of a package for the order. In some embodiments, the fulfillment interface is similar to the fulfillment interface generated at block 744 of method 700, in that it may provide a list of products for a worker to pull and add to a specific package, may guide the worker to the packages within storage, and so on.

One difference between the fulfillment interface of block 1132 and the fulfillment interface of block 744 is that while the fulfillment interface of block 1132 may have an interface element that indicates the packages are ready for pickup, this interface element does not cause a send delivery request to be generated by the fulfillment interface. Instead, at block 1134 the fulfillment interface generation engine 510 causes a loader interface generated by the delivery management engine 618 of the fleet management computing system 102 to be presented by the fulfillment computing device 116. The fulfillment interface generation engine 510 may cause the loader interface to be presented using a technique similar to the techniques described above for making the onboarding interface appear on the fulfillment computing device 116, such as a universal link, a custom URL scheme, an Intent, a popup, a redirect, or any other suitable technique. In some embodiments, the loader interface may present specific instructions for how each package should be positioned at the pickup spot (e.g., a specific autoloader on which each package should be positioned, etc.).

At block 1136, the loader interface receives a notification that the package is ready for pickup and transmits a send delivery request for the package to the delivery management engine 618. The notification may be triggered using a suitable interface element. The send delivery request is similar to the send delivery request transmitted at block 748 of the method 700, but is generated by the loader interface in response to an interaction with the loader interface, as opposed to being generated by the fleet fulfillment integration engine 512 in response to an interaction with the fulfillment interface.

Figure 12A:
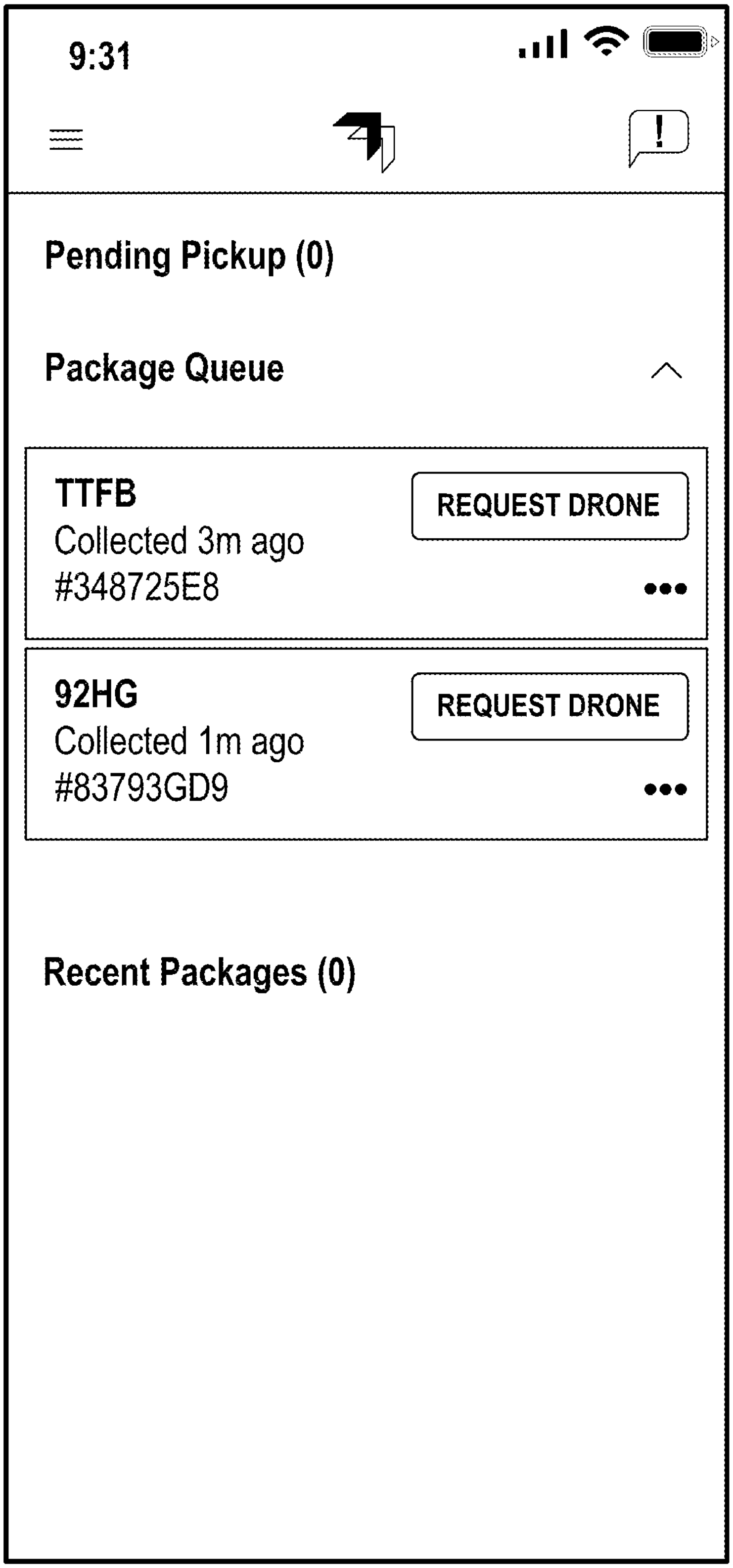
FIG. 12A-FIG. 12C illustrate a non-limiting example embodiment of a loader interface generated by the fleet management computing system and presented on a fulfillment computing device according to various aspects of the present disclosure.
Figure 12B:
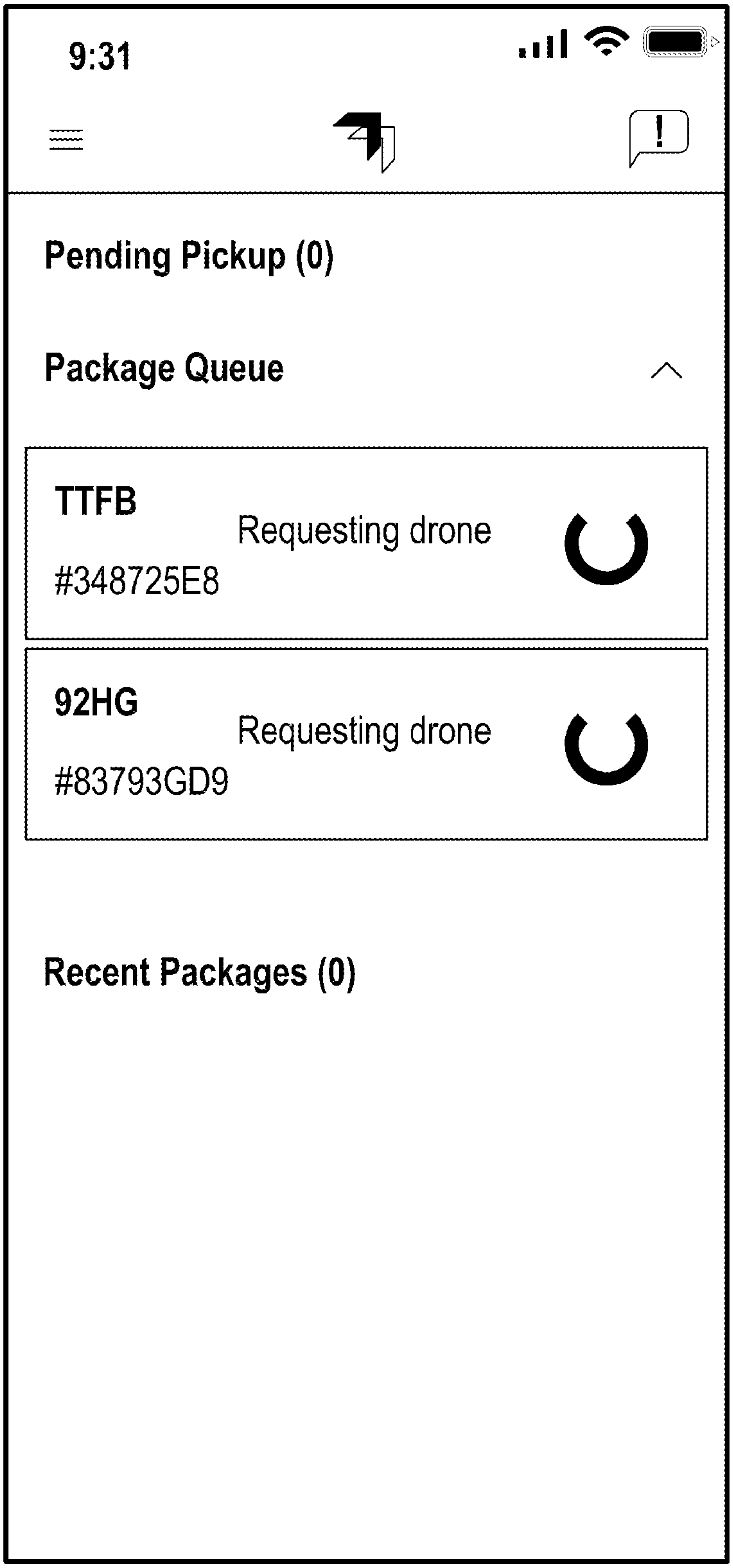
Figure 12C:
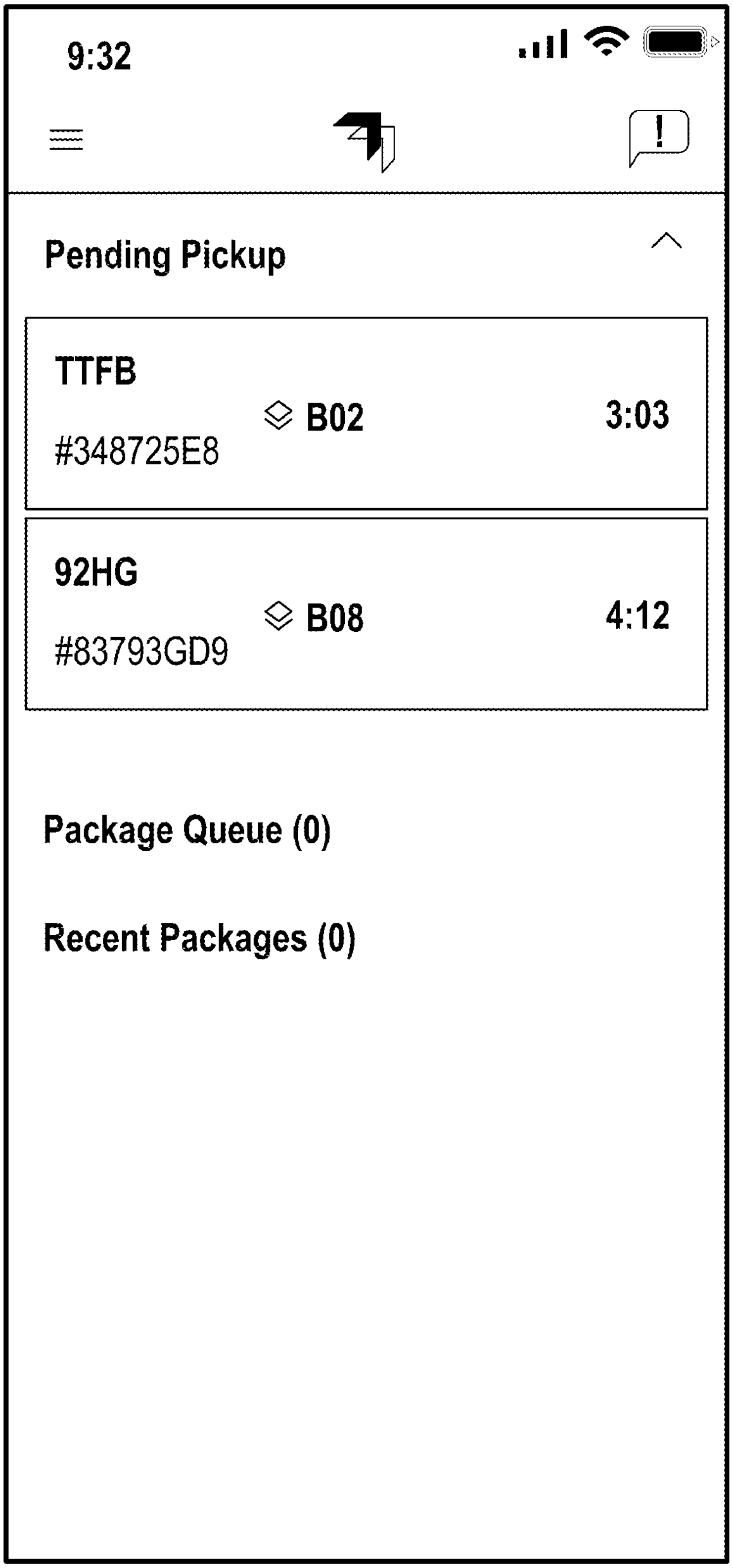

FIG. 12A-FIG. 12C illustrate a non-limiting example embodiment of a loader interface generated by the fleet management computing system 102 and presented on a fulfillment computing device 116 according to various aspects of the present disclosure. In FIG. 12A, three categories of packages are shown: Pending Pickup (currently empty), Package Queue (packages that are being prepared for pickup), and Recent Packages (also currently empty). Each of the packages being prepared by the worker are listed in the Package Queue by their identifiers. When a given package is ready, the worker can actuate the "Request Drone" interface element to cause the send delivery request to be transmitted.

In FIG. 12B, the worker has placed both of the packages, and has actuated the "Request Drone" interface element for both packages. At this point, the delivery management engine 618 has received the send delivery requests, but has not yet determined a UAV 110 to deliver either package. As such, each package remains in the Package Queue section of the loader interface.

In FIG. 12C, the delivery management engine 618 has determined UAVs 110 to deliver each package, the UAVs 110 have been provided with the appropriate navigation routes, and are traversing the navigation routes to the retail fulfillment location 112. As such, the packages have been moved from the "Package Queue" category to the "Pending Pickup" category. As can be seen, the tracking information made available by virtue of the received telemetry allows a down-to-the-second prediction of when each of the UAVs 110 will arrive to be presented in the loader interface.

Returning to FIG. 11C, the remainder of the method 1100 is highly similar to method 700 from block 750 to decision block 758. At block 1138, the delivery management engine 618 receives the send delivery request and determines a UAV 110 to deliver the package. At block 1140, a UAV management engine 620 of the fleet management computing system 102 determines a navigation route for the UAV 110 to traverse and transmits the navigation route to the UAV 110. At block 1142, the UAV 110 traverses the navigation route to the retail fulfillment location 112 and picks up the package. At block 1144, the UAV 110 further traverses the navigation route to the delivery location 104 and delivers the package. The method 1100 then proceeds to decision block 1146, where a determination is made regarding whether all of the packages for the order have been delivered, or whether further packages remain. If further packages remain to be delivered, then the result of decision block 1146 is NO, and the method 1100 returns to block 1136 to process the next package. Otherwise, if all of the packages have been delivered, then the result of block 1136 is YES, and the method 1100 proceeds to an end block and terminates. Since this portion of method 1100 is highly similar to the corresponding portion of method 700, the description is not repeated again here for the sake of brevity.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

EXAMPLES

The numbered paragraphs that follow list non-limiting example embodiments of the disclosure.

Example 1. A non-transitory computer-readable medium having logic stored thereon that, in response to execution by one or more processors of a fleet management computing system, cause the fleet management computing system to perform actions for managing deliveries of orders by a fleet of unmanned aerial vehicles (UAVs) from retail fulfillment locations to delivery locations, the actions comprising: receiving, by the fleet management computing system, a request for delivery of an order from a retailer ordering computing system; transmitting, by the fleet management computing system, one or more package identifiers to be associated with one or more packages for the order; receiving, by the fleet management computing system, a notification that a package of the one or more packages for the order is ready for pickup at a retail fulfillment location; determining, by the fleet management computing system, a navigation route for a UAV to the delivery location via the retail fulfillment location; and transmitting, by the fleet management computing system, the navigation route to the UAV for autonomous navigation of the navigation route to the delivery location via the retail fulfillment location to deliver the package.

Example 2. The computer-readable medium of Example 1, wherein the actions further comprise: receiving, by the fleet management computing system, an onboarding request for a recipient, wherein the onboarding request includes an organization identifier associated with the retailer ordering computing system, a recipient identifier, the delivery location, identifiers of one or more onboarding documents, and one or more onboarding document completion datetimes; and storing, by the fleet management computing system, information from the onboarding request in a recipient data store.

Example 3. The computer-readable medium of Example 2, wherein the identifiers of one or more onboarding documents include identifiers of one or more of a terms of service agreement or a delivery education document.

Example 4. The computer-readable medium of Example 2 or 3, wherein the onboarding request is received from the retailer ordering computing system via an interface generated by the retailer ordering computing system.

Example 5. The computer-readable medium of Example 2 or 3, wherein the onboarding request is received from a customer computing device via an interface generated by the fleet management computing system.

Example 6. The computer-readable medium of any one of Examples 1-5, wherein the actions further comprise: receiving, by the fleet management computing system, an availability request from the retailer ordering computing system, wherein the availability request includes at least the delivery location and the retail fulfillment location; determining, by the fleet management computing system, whether a UAV in the fleet of UAVs can traverse routes to the delivery location via the retail fulfillment location; and transmitting, by the fleet management computing system, an availability response to the retailer ordering computing system indicating whether delivery by the fleet of UAVs is available to the delivery location via the retail fulfillment location.

Example 7. The computer-readable medium of any one of Examples 1-6, wherein the actions further comprise: receiving, by the fleet management computing system, an estimate request for the order from the retailer ordering computing system; determining, by the fleet management computing system, an estimate that includes at least a pickup window and an estimated time of delivery; and transmitting, by the fleet management computing system, the estimate to the retailer ordering computing system.

Example 8. The computer-readable medium of any one of Examples 1-7, wherein receiving the notification that the package of the one or more packages for the order is ready for pickup at the retail fulfillment location includes receiving the notification from a retailer fulfillment computing system, and wherein the notification is generated via a fulfillment interface provided by the retailer fulfillment computing system.

Example 9. The computer-readable medium of any one of Examples 1-8, wherein receiving the notification that the package of the one or more packages for the order is ready for pickup at the retail fulfillment location includes receiving the notification from a fulfillment computing device, and wherein the notification is generated via a loader interface provided by the fleet management computing system.

Example 10. The computer-readable medium of any one of Examples 1-9, wherein the actions further comprise: receiving, by the fleet management computing system, telemetry information from the UAV while the UAV is autonomously navigating the navigation route; receiving, by the fleet management computing system, a tracking request for the order; and in response to the tracking request, transmitting, by the fleet management computing system, tracking information for the order based on the telemetry information.

Example 11. A method of managing deliveries of orders by a fleet of unmanned aerial vehicles (UAVs) from retail fulfillment locations to delivery locations, the method comprising: receiving, by a fleet management computing system, a request for delivery of an order from a retailer ordering computing system; transmitting, by the fleet management computing system, one or more package identifiers to be associated with one or more packages for the order; receiving, by the fleet management computing system, a notification that a package of the one or more packages for the order is ready for pickup at a retail fulfillment location; determining, by the fleet management computing system, a navigation route for a UAV to the delivery location via the retail fulfillment location; and transmitting, by the fleet management computing system, the navigation route to the UAV for autonomous navigation of the navigation route to the delivery location via the retail fulfillment location to deliver the package.

Example 12. The method of Example 11, further comprising: receiving, by the fleet management computing system, an onboarding request for a recipient, wherein the onboarding request includes an organization identifier associated with the retailer ordering computing system, a recipient identifier, the delivery location, identifiers of one or more onboarding documents, and one or more onboarding document completion datetimes; and storing, by the fleet management computing system, information from the onboarding request in a recipient data store.

Example 13. The method of Example 12, wherein the identifiers of one or more onboarding documents include identifiers of one or more of a terms of service agreement or a delivery education document.

Example 14. The method of Example 12 or 13, wherein the onboarding request is received from the retailer ordering computing system via an interface generated by the retailer ordering computing system.

Example 15. The method of Example 12 or 13, wherein the onboarding request is received from a customer computing device via an interface generated by the fleet management computing system.

Example 16. The method of any one of Examples 11-15, further comprising: receiving, by the fleet management computing system, an availability request from the retailer ordering computing system, wherein the availability request includes at least the delivery location and the retail fulfillment location; determining, by the fleet management computing system, whether a UAV in the fleet of UAVs can traverse routes to the delivery location via the retail fulfillment location; and transmitting, by the fleet management computing system, an availability response to the retailer ordering computing system indicating whether delivery by the fleet of UAVs is available to the delivery location via the retail fulfillment location.

Example 17. The method of any one of Examples 11-16, further comprising: receiving, by the fleet management computing system, an estimate request for the order from the retailer ordering computing system; determining, by the fleet management computing system, an estimate that includes at least a pickup window and an estimated time of delivery; and transmitting, by the fleet management computing system, the estimate to the retailer ordering computing system.

Example 18. The method of any one of Examples 11-17, wherein receiving the notification that the package of the one or more packages for the order is ready for pickup at the retail fulfillment location includes receiving the notification from a retailer fulfillment computing system, and wherein the notification is generated via a fulfillment interface provided by the retailer fulfillment computing system.

Example 19. The method of any one of Examples 11-18, wherein receiving the notification that the package of the one or more packages for the order is ready for pickup at the retail fulfillment location includes receiving the notification from a fulfillment computing device, and wherein the notification is generated via a loader interface provided by the fleet management computing system.

Example 20. The method of any one of Examples 11-19, further comprising: receiving, by the fleet management computing system, telemetry information from the UAV while the UAV is autonomously navigating the navigation route; receiving, by the fleet management computing system, a tracking request for the order; and in response to the tracking request, transmitting, by the fleet management computing system, tracking information for the order based on the telemetry information.

Example 21. A computing system configured to perform a method as recited in any one of Examples 11-20.

What is claimed is:

1. A non-transitory computer-readable medium having logic stored thereon that, in response to execution by one or more processors of a fleet management computing system, cause the fleet management computing system to perform actions for managing deliveries of orders by a fleet of unmanned aerial vehicles (UAVs) from retail fulfillment locations to delivery locations, the actions comprising:

receiving, by the fleet management computing system, a request for delivery of an order from a retailer ordering computing system;

transmitting, by the fleet management computing system, one or more package identifiers to be associated with one or more packages for the order;

receiving, by the fleet management computing system, a notification that a package of the one or more packages for the order is ready for pickup at a retail fulfillment location, wherein the notification is received from a retailer fulfillment computing system, and wherein the notification is generated in response to actuation of an interface element of a fulfillment interface generated by the retailer fulfillment computing system;

determining, by the fleet management computing system, a navigation route for a UAV to the delivery location via the retail fulfillment location; and transmitting, by the fleet management computing system, the navigation route to the UAV for autonomous navigation of the navigation route to the delivery location via the retail fulfillment location to deliver the package.

2. The computer-readable medium of claim 1, wherein the actions further comprise:

receiving, by the fleet management computing system, an onboarding request for a recipient, wherein the onboarding request includes an organization identifier associated with the retailer ordering computing system, a recipient identifier, the delivery location, identifiers of one or more onboarding documents, and one or more onboarding document completion datetimes; and storing, by the fleet management computing system, information from the onboarding request in a recipient data store.

3. The computer-readable medium of claim 2, wherein the identifiers of one or more onboarding documents include identifiers of one or more of a terms of service agreement or a delivery education document.

4. The computer-readable medium of claim 2, wherein the onboarding request is received from the retailer ordering computing system via an interface generated by the retailer ordering computing system.

5. The computer-readable medium of claim 2, wherein the onboarding request is received from a customer computing device via an interface generated by the fleet management computing system.

6. The computer-readable medium of claim 1, wherein the actions further comprise:

receiving, by the fleet management computing system, an availability request from the retailer ordering computing system, wherein the availability request includes at least the delivery location and the retail fulfillment location;

determining, by the fleet management computing system, whether a UAV in the fleet of UAVs can traverse routes to the delivery location via the retail fulfillment location; and transmitting, by the fleet management computing system, an availability response to the retailer ordering computing system indicating whether delivery by the fleet of UAVs is available to the delivery location via the retail fulfillment location.

7. The computer-readable medium of claim 1, wherein the actions further comprise:

receiving, by the fleet management computing system, an estimate request for the order from the retailer ordering computing system;

determining, by the fleet management computing system, an estimate that includes at least a pickup window and an estimated time of delivery; and transmitting, by the fleet management computing system, the estimate to the retailer ordering computing system.

8. The computer-readable medium of claim 1, wherein the actions further comprise:

receiving, by the fleet management computing system, telemetry information from the UAV while the UAV is autonomously navigating the navigation route;

receiving, by the fleet management computing system, a tracking request for the order; and in response to the tracking request, transmitting, by the fleet management computing system, tracking information for the order based on the telemetry information.

9. A method of managing deliveries of orders by a fleet of unmanned aerial vehicles (UAVs) from retail fulfillment locations to delivery locations, the method comprising:

receiving, by a fleet management computing system, a request for delivery of an order from a retailer ordering computing system;

transmitting, by the fleet management computing system, one or more package identifiers to be associated with one or more packages for the order;

receiving, by the fleet management computing system, a notification that a package of the one or more packages for the order is ready for pickup at a retail fulfillment location, wherein the notification is received from a fulfillment computing device, and wherein the notification is generated in response to actuation of an interface element of a loader interface presented by the fulfillment computing device and generated by the fleet management computing system;

determining, by the fleet management computing system, a navigation route for a UAV to the delivery location via the retail fulfillment location; and transmitting, by the fleet management computing system, the navigation route to the UAV for autonomous navigation of the navigation route to the delivery location via the retail fulfillment location to deliver the package.

10. The method of claim 9, further comprising:

receiving, by the fleet management computing system, an onboarding request for a recipient, wherein the onboarding request includes an organization identifier associated with the retailer ordering computing system, a recipient identifier, the delivery location, identifiers of one or more onboarding documents, and one or more onboarding document completion datetimes; and storing, by the fleet management computing system, information from the onboarding request in a recipient data store.

11. The method of claim 10, wherein the identifiers of one or more onboarding documents include identifiers of one or more of a terms of service agreement or a delivery education document.

12. The method of claim 10, wherein the onboarding request is received from the retailer ordering computing system via an interface generated by the retailer ordering computing system.

13. The method of claim 10, wherein the onboarding request is received from a customer computing device via an interface generated by the fleet management computing system.

14. The method of claim 9, further comprising:

receiving, by the fleet management computing system, an availability request from the retailer ordering computing system, wherein the availability request includes at least the delivery location and the retail fulfillment location;

determining, by the fleet management computing system, whether a UAV in the fleet of UAVs can traverse routes to the delivery location via the retail fulfillment location; and transmitting, by the fleet management computing system, an availability response to the retailer ordering computing system indicating whether delivery by the fleet of UAVs is available to the delivery location via the retail fulfillment location.

15. The method of claim 9, further comprising:

receiving, by the fleet management computing system, an estimate request for the order from the retailer ordering computing system;

determining, by the fleet management computing system, an estimate that includes at least a pickup window and an estimated time of delivery; and transmitting, by the fleet management computing system, the estimate to the retailer ordering computing system.

16. The method of claim 9, further comprising:

receiving, by the fleet management computing system, telemetry information from the UAV while the UAV is autonomously navigating the navigation route;

receiving, by the fleet management computing system, a tracking request for the order; and in response to the tracking request, transmitting, by the fleet management computing system, tracking information for the order based on the telemetry information.

* * * * *